US007695777B2

(12) United States Patent
Goto et al.

(10) Patent No.: US 7,695,777 B2
(45) Date of Patent: Apr. 13, 2010

(54) CHLOROFLUOROBENZENE LIQUID CRYSTAL COMPOUND, LIQUID CRYSTAL COMPOSITION AND LIQUID CRYSTAL DISPLAY DEVICE

(75) Inventors: Yasuyuki Goto, Tokyo (JP); Teru Shimada, Ichihara (JP); Hiroaki Fujita, Ichihara (JP); Norikatsu Hattori, Ichihara (JP)

(73) Assignees: Chisson Corporation, Osaka (JP); Chisso Petrochemical Corporation, Tokyo (JP)

( * ) Notice: Subject to any disclaimer, the term of this patent is extended or adjusted under 35 U.S.C. 154(b) by 45 days.

(21) Appl. No.: 11/896,765

(22) Filed: Sep. 5, 2007

(65) Prior Publication Data
US 2008/0075891 A1 Mar. 27, 2008

(30) Foreign Application Priority Data
Sep. 6, 2006 (JP) .............................. 2006-242154

(51) Int. Cl.
*C09K 19/34* (2006.01)
*C09K 19/30* (2006.01)
*C09K 19/32* (2006.01)
*C09K 19/12* (2006.01)
*C09K 19/20* (2006.01)
*C07C 25/06* (2006.01)
*C07C 25/13* (2006.01)

(52) U.S. Cl. .............. 428/1.1; 252/299.61; 252/299.62; 252/299.63; 252/299.66; 252/299.67; 570/127; 570/129; 570/130; 570/131; 570/188

(58) Field of Classification Search .................. 428/1.3, 428/1.1; 252/299.61, 299.62, 299.63, 299.66, 252/299.67; 570/127, 129, 185, 130, 131, 570/188
See application file for complete search history.

(56) References Cited

U.S. PATENT DOCUMENTS

| 5,204,019 | A | 4/1993 | Reiffenrath et al. | 252/299.6 |
| 6,056,893 | A | 5/2000 | Reiffenrath et al. | 252/299.6 |
| 6,329,027 | B1 * | 12/2001 | Kondo et al. | 428/1.1 |
| 2006/0198968 | A1 * | 9/2006 | Goto et al. | 428/1.1 |

FOREIGN PATENT DOCUMENTS

| DE | 39 06 040 A1 | 9/1989 |
| DE | 10157670 | 6/2002 |
| EP | 0 364 538 B1 | 4/1990 |
| EP | 0 959 060 A1 | 11/1999 |
| EP | 0982387 A1 | 3/2000 |
| EP | 1333017 A2 | 8/2003 |
| GB | 2078727 A | 1/1982 |
| GB | 2 216 523 A | 10/1989 |
| JP | 02 004723 | 1/1990 |
| JP | 02 004725 | 1/1990 |
| JP | 10 158652 | 6/1998 |
| JP | 10 237075 | 9/1998 |
| JP | 2002 193853 | 7/2002 |
| WO | WO 89/08633 | 9/1989 |
| WO | WO 89/08687 | 9/1989 |
| WO | WO 98/23561 | 6/1998 |

OTHER PUBLICATIONS

European Search Report dated Dec. 21, 2007 in related European Application No. EP 07253202.

* cited by examiner

*Primary Examiner*—Shean C Wu
(74) *Attorney, Agent, or Firm*—Hogan & Hartson LLP

(57) ABSTRACT

A liquid crystal compound selected from a group of compounds represented by formula (a):

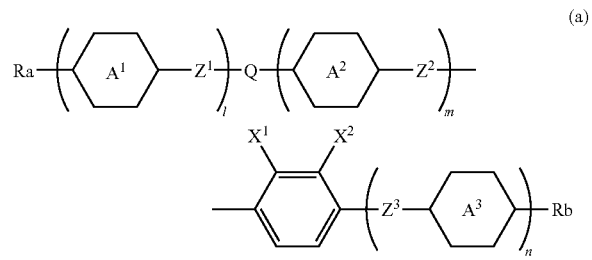

wherein Ra and Rb are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring $A^1$, ring $A^2$ and ring $A^3$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl; $Z^1$, $Z^2$ and $Z^3$ are each independently a single bond, —(CH$_2$)$_2$—, —CH=CH—, —C≡C—, —CH$_2$O, —OCH$_2$—, —COO—, —OCO—, —OCF$_2$—, —CF$_2$O—, —CH$_2$CH$_2$OCF$_2$— or —CF$_2$OCH$_2$CH$_2$—; l, m and n are each independently 0, 1 or 2, provided that l+m+n is 0, 1, 2 or 3; one of $X^1$ and $X^2$ is fluorine, and the other is chlorine; Q is

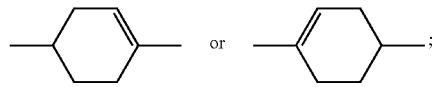

and atoms comprising the compound each may be an isotope thereof.

17 Claims, No Drawings

CHLOROFLUOROBENZENE LIQUID CRYSTAL COMPOUND, LIQUID CRYSTAL COMPOSITION AND LIQUID CRYSTAL DISPLAY DEVICE

CROSS REFERENCE TO RELATED APPLICATIONS

This application claims priority under 35 U.S.C. §119 to Japanese Patent Application No. JP 2006-242154, filed Sep. 6, 2006, which application is expressly incorporated herein by reference in its entirety.

BACKGROUND OF THE INVENTION

1. Field of the Invention

The invention relates to a liquid crystal compound, a liquid crystal composition and a liquid crystal display device. More specifically, it relates to a chlorofluorobenzene derivative, which is a liquid crystal compound, a liquid crystal composition having a nematic phase and containing the compound, and a liquid crystal display device containing the composition.

2. Related Art

A liquid crystal display device, which is represented by a liquid crystal display panel and a liquid crystal display module, utilizes optical anisotropy and dielectric anisotropy of a liquid crystal compound (which is a generic term for a compound having a liquid crystal phase, such as a nematic phase, a smectic phase and so forth, and also for a compound having no liquid crystal phase but being useful as a component of a composition), and as an operation mode of a liquid crystal display device, various modes have been known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (OPS) mode, a vertical alignment (VA) mode, and so forth.

Among these modes, an ECB mode, an IPS mode, a VA mode and so forth are operation modes utilizing vertical orientation property of a liquid crystal molecule. In particular, it has been known that an IPS mode and a VA mode can eliminate a narrow viewing angle, which is a defect of the conventional modes, such as a TN mode and an STN mode.

As a component of a liquid crystal composition having a negative dielectric anisotropy, which can be used in a liquid crystal display device of these modes, various kinds of liquid crystal compounds, in which hydrogen on a benzene ring is replaced by fluorine, have been investigated (as described, for example, in WO 98/23561, JP H10-158652 A/1998, JP H02-4723 A/1990, JP 2002-193853 A, JP H10-237075 A/1998, JP H02-4725 A/1990, WO 89/08633, WO 89/08687 and EP 1333017).

For example, a compound (A) represented by the following structural formula has been investigated (as described in WO 98/23561). A compound, in which hydrogen on a benzene ring is replaced by chlorine and fluorine, represented by the compound (A) does not have a high clearing point and has a high viscosity. The compound is poor in stability to an ultraviolet ray.

As a dopant for a liquid crystal medium used in an electrochemical display, a compound (B), in which hydrogen on a benzene ring is replaced by chlorine and fluorine, and a terminal group has a branched structure, has been disclosed (for example, in JP H10-158652A/1998). The mesophase range where the compound exhibits liquid crystallinity is significantly narrow.

As a compound having cyclohexenylene, in which hydrogen on a benzene ring is replaced by fluorine, a compound (C) and a compound (D) have been reported (as described, for example, in JP H02-4723 A/1990 and JP 2002-193853 A). However, the compound (C) and the compound (D) are poor in compatibility in a low temperature range as compared to the other liquid crystal compounds.

Compounds having cyclohexenylene, in which hydrogen on a benzene ring is replaced by fluorine, have been reported as intermediates in, for example, WO 89/08633, WO 89/08687 and EP 1333017.

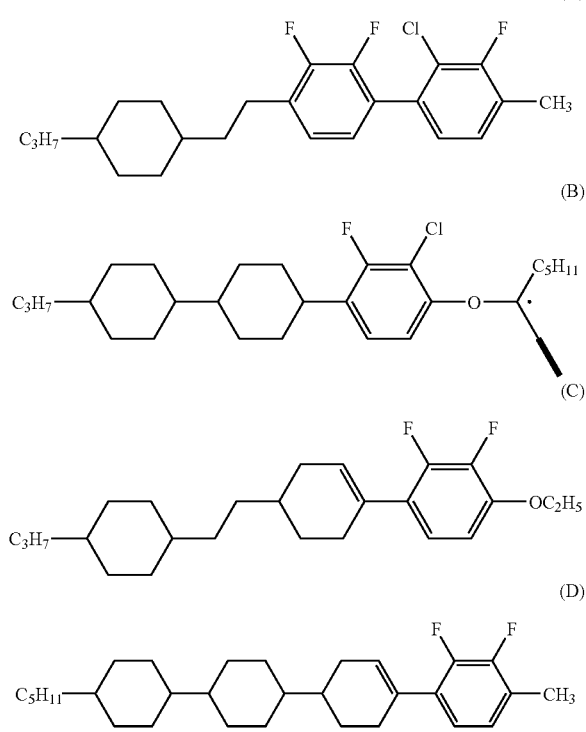

Accordingly, a liquid crystal display device having an operation mode, such as an IPS mode or a VA mode, still has problems as a display device compared to CRT, and for example, need improved response time and contrast, and decreased driving voltage.

The display device driven in an IPS mode or a VA mode is constituted mainly by a liquid crystal composition having a negative dielectric anisotropy, and in order to improve the aforementioned properties, a liquid crystal compound contained in the liquid crystal composition necessarily has the following properties (1) to (8):

(1) The compound is chemically stable and physically stable;

(2) The compound has a high clearing point (transition temperature from a liquid crystal phase to an isotropic phase);

(3) The compound has a low minimum temperature of a liquid crystal phase (such as a nematic phase and a smectic phase), particularly has a low minimum temperature of a nematic phase;

(4) The compound has a low viscosity;

(5) The compound has a suitable optical anisotropy;

(6) The compound has a suitable negative dielectric anisotropy;

(7) The compound has suitable elastic constants $K_{33}$ and $K_{11}$ ($K_{33}$: bend elastic constant, $K_{11}$: splay elastic constant); and (8) The compound is excellent in compatibility with other liquid crystal compounds.

In the case where a composition containing a liquid crystal compound that is chemically and physically stable as in (1) is used in a display device, the voltage holding ratio can be increased.

In the case where a composition containing a liquid crystal compound having a high clearing point or a low minimum temperature of a liquid crystal phase as in (2) and (3) is used, the temperature range of a nematic phase can be enhanced, and a display device can be used in a wide temperature range.

In the case where a composition containing a compound having a small viscosity as in (4) or a large elastic constant $K_{33}$ as in (7) is used in a display device, the response time can be improved. In the case where a composition containing a compound having a suitable optical anisotropy as in (5) is used in a display device, a contrast of the display device can be improved. Liquid crystal compounds having optical anisotropy varying over a wide range are necessary depending on design of a display device. In recent years, there is a tendency that the cell thickness is decreased for improving the response time, and accordingly, a composition having a large optical anisotropy is demanded.

Furthermore, in the case where a liquid crystal compound has a negatively large dielectric anisotropy, a liquid crystal composition containing the compound can have a low threshold voltage, and accordingly, a display device using a composition containing a suitable negative dielectric anisotropy as in (6) can have a low driving voltage and a small electric power consumption. In the case where a composition containing a compound having a suitable elastic constant $K_{33}$ as in (7) is used in a display device, the driving voltage of the display device can be controlled, and the electric power consumption can also be controlled.

A liquid crystal compound is generally used as a composition by mixing with other various liquid crystal compounds for obtaining properties that cannot be exhibited with a sole compound. Accordingly, a liquid crystal compound used in a display device preferably has good compatibility with other liquid crystal compounds as in (8). Furthermore, a display device may be used over a wide temperature range including a temperature below freezing point, and therefore, the compound preferably exhibits good compatibility from a low temperature range.

SUMMARY OF THE INVENTION

The invention includes a liquid crystal compound selected from a group of compounds represented by formula (a):

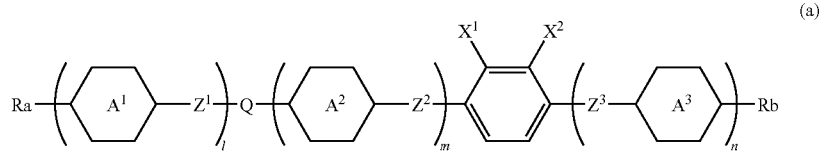

(a)

wherein Ra and Rb are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring $A^1$, ring $A^2$ and ring $A^3$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl; $Z^1$, $Z^2$ and $Z^3$ are each independently a single bond, —(CH$_2$)$_2$—, —CH=CH—, —C≡C—, —CH$_2$O—, —OCH$_2$—, —COO—, —OCO—, —OCF$_2$—, —CF$_2$O—, —CH$_2$CH$_2$OCF$_2$— or —CF$_2$OCH$_2$CH$_2$—; l, m and n are each independently 0, 1 or 2, provided that l+m+n is 0, 1, 2 or 3; one of $X^1$ and $X^2$ is fluorine, and the other is chlorine; Q

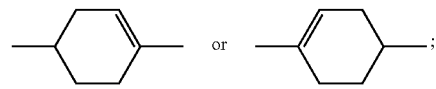

and atoms of the compound each may be an isotope thereof.

The invention also includes a liquid crystal composition that includes the liquid crystal compound and so forth.

The invention also includes a liquid crystal display device that includes the liquid crystal composition and so forth.

DETAILED DESCRIPTION OF THE INVENTION

One of the advantages of the invention is to provide a liquid crystal compound that has stability to heat, light and so forth, exhibits a nematic phase in a wide temperature range, has a small viscosity, a large optical anisotropy and suitable elastic constants $K_{33}$ and $K_{11}$ ($K_{33}$: bend elastic constant, $K_{11}$: splay elastic constant), and has a suitable negative dielectric anisotropy and excellent compatibility with other liquid crystal compounds. In particular, the invention has a large optical anisotropy, a suitable negative dielectric anisotropy and excellent compatibility with other liquid crystal compounds.

Another of the advantages of the invention is to provide such a liquid crystal composition containing the compound that has stability to heat, light and so forth, has a low viscosity, has a suitable negative dielectric anisotropy, has a low threshold voltage, has a high maximum temperature of a nematic phase (high phase transition temperature from a nematic phase to an isotropic phase), and has a low minimum temperature of a nematic phase. In particular, the invention provides a liquid crystal composition that can use the liquid crystal compound of the invention in a wide temperature range and has a suitable negative dielectric anisotropy owing to the compound that has a large optical anisotropy, a suitable negative dielectric anisotropy and excellent compatibility with other liquid crystal compounds.

Still another of the advantages of the invention is to provide a liquid crystal display device containing the composition that has a short response time, has a small electric power consumption and a low driving voltage, has a large contrast, and can be used over a wide temperature range. Accordingly, the liquid crystal display device can be used as a liquid crystal display device of a display mode, such as a PC mode, a TN mode, an STN mode, an ECB mode, an OCB mode, an IPS mode, a VA mode and so forth, and in particular, it can be preferably used as a liquid crystal display device of an IPS mode and a VA mode.

It has been found that a liquid crystal compound having a particular structure, in which the structure has a cyclohexenylene, and hydrogen on a benzene ring is replaced by chlorine and fluorine, has stability to heat, light and so forth, exhibits a nematic phase in a wide temperature range, has a small viscosity, a large optical anisotropy and suitable elastic constants $K_{33}$ and $K_{11}$ ($K_{33}$: bend elastic constant, $K_{11}$: splay elastic constant), and has a suitable negative dielectric anisotropy and excellent compatibility with other liquid crystal compounds, a liquid crystal composition containing the compound has stability to heat, light and so forth, has a low viscosity, has a suitable negative dielectric anisotropy, has a low threshold voltage, has a high maximum temperature of a nematic phase, and has a low minimum temperature of a nematic phase, and a liquid crystal display device containing the composition has a short response time, has a small electric power consumption and a low driving voltage, has a large contrast, and can be used over a wide temperature range.

The invention will be described in detail below. In the following description, all the amounts of the compounds expressed in terms of percentage mean weight percentage (% by weight) based on the total weight of the composition.

The invention includes:

1. A liquid crystal compound selected from a group of compounds represented by formula (a):

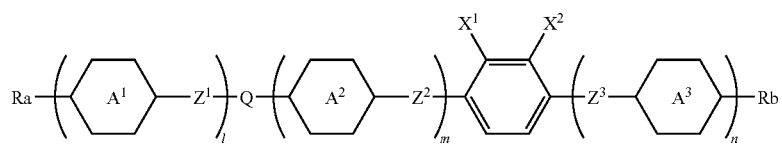

(a)

wherein Ra and Rb are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring $A^1$, ring $A^2$ and ring $A^3$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl; $Z^1$, $Z^2$ and $Z^3$ are each independently a single bond, —(CH$_2$)$_2$—, —CH═C—, —C≡C—, —CH$_2$O—, —OCH$_2$—, —COO—, —OCO—, —OCF$_2$—, —CF$_2$O—, —CH$_2$CH$_2$OCF$_2$— or —CF$_2$OCH$_2$CH$_2$—; l, m and n are each independently 0, 1 or 2, provided that l+m+n is 0, 1, 2 or 3; one of $X^1$ and $X^2$ is fluorine, and the other is chlorine; Q is

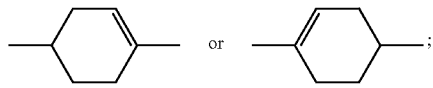

and atoms of the compound each may be an isotope thereof.

2. The liquid crystal compound according to item 1, wherein ring $A^1$, ring $A^2$ and ring $A^3$ are each independently trans-1,4-cyclohexylene or 1,4-phenylene; $Z^1$, $Z^2$ and $Z^3$ are each independently a single bond or —(CH$_2$)$_2$—; and Q is

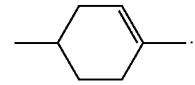

3. A liquid crystal compound selected from a group of compounds represented by formula (a-1):

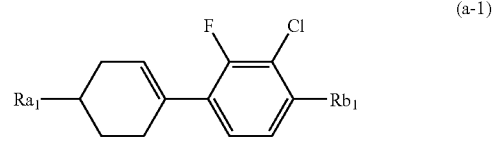

(a-1)

wherein Ra$_1$ is linear alkyl having 1 to 10 carbons or linear alkenyl having 2 to 10 carbons, and Rb$_1$ is linear alkyl having 1 to 10 carbons or linear alkoxy having 1 to 9 carbons.

4. A liquid crystal compound selected from a group of compounds represented by formula (b-1):

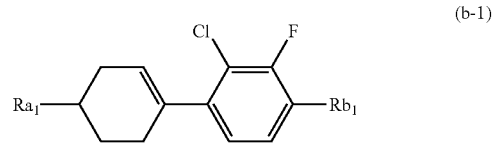

(b-1)

wherein Ra$_1$ is linear alkyl having 1 to 10 carbons or linear alkenyl having 2 to 10 carbons, and Rb$_1$ is linear alkyl having 1 to 10 carbons or linear alkoxy having 1 to 9 carbons.

5. A liquid crystal compound selected from a group of compounds represented by formula (a-2):

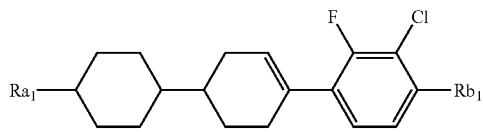

(a-2)

wherein Ra$_1$ is linear alkyl having 1 to 10 carbons or linear alkenyl having 2 to 10 carbons, and Rb$_1$ is linear alkyl having 1 to 10 carbons or linear alkoxy having 1 to 9 carbons.

6. A liquid crystal compound selected from a group of compounds represented by formula (b-2):

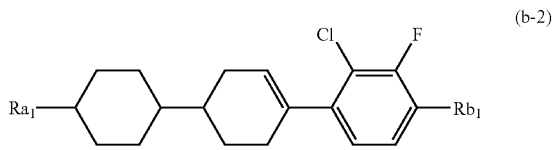

(b-2)

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons.

7. A liquid crystal composition including at least one compound selected from a group of the compounds according to any one of items 1 to 6.

8. A liquid crystal composition having a negative dielectric anisotropy and including two components, wherein the first component is at least one compound selected from a group of the compounds according to any one of items 1 to 6, and the second component is at least one compound selected from a group of compounds represented by formulae (e-1) to (e-3):

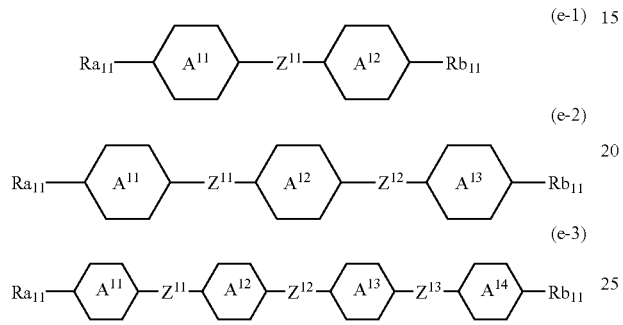

wherein $Ra_{11}$ and $Rb_{11}$ are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring $A^{11}$, ring $A^{12}$, ring $A^{13}$ and ring $A^{14}$ are each independently trans-1,4-cyclohexylene, trans-1,3-dioxane-2,5-diyl, trans-tetrahydropyran-2,5-diyl, 1,4-phenylene, 2-fluoro-1,4-phenylene or pyridine-2,5-diyl; and $Z^{11}$, $Z^{12}$ and $Z^{13}$ are each independently a single bond, $-CH_2-CH_2-$, $-CH=CH-$, $-C\equiv C-$, $-COO-$ or $-CH_2O-$.

9. A liquid crystal composition having a negative dielectric anisotropy and including two components, wherein the first component is at least one compound selected from a group of compounds represented by formulae (a-1), (a-2), (b-1) and (b-2), and the second component is at least one compound selected from a group of compounds represented by formulae (e-1) to (e-3):

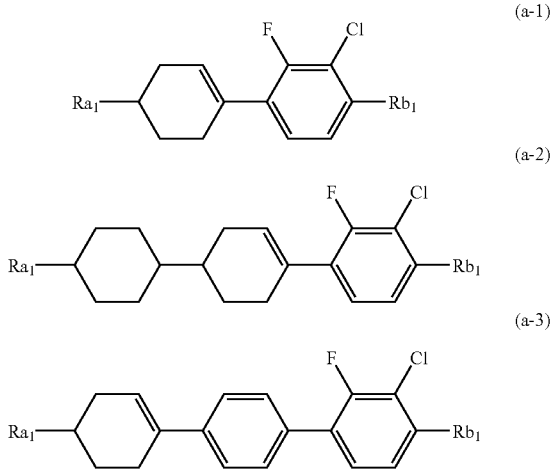

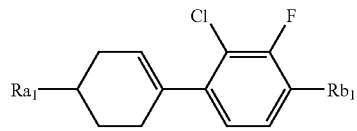

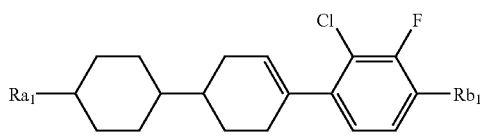

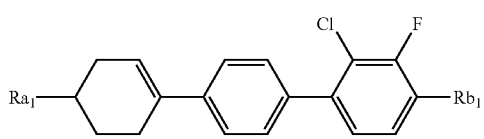

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons,

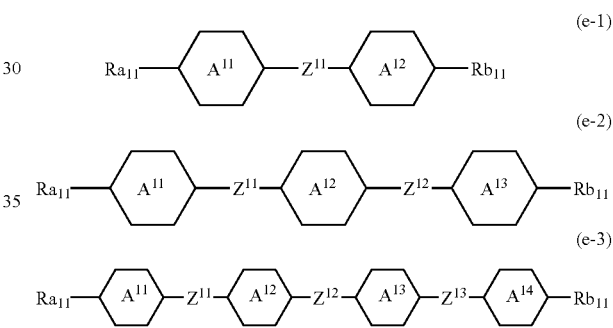

wherein $Ra_{11}$ and $Rb_{11}$ are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring $A^{11}$, ring $A^{12}$, ring $A^{13}$ and ring $A^{14}$ are each independently trans-1,4-cyclohexylene, trans-1,3-dioxane-2,5-diyl, trans-tetrahydropyran-2,5-diyl, 1,4-phenylene, 2-fluoro-1,4-phenylene or pyridine-2,5-diyl; and $Z^{11}$, $Z^{12}$ and $Z^{13}$ are each independently a single bond, $-CH_2-CH_2-$, $-CH=CH-$, $-C\equiv C-$, $-COO-$ or $-CH_2O-$.

10. The liquid crystal composition according to item 8 or 9, wherein the ratio of the first component is from approximately 30 to approximately 85% by weight, and the ratio of the second component is from approximately 15 to approximately 70% by weight, based on the total weight of the liquid crystal composition.

11. The liquid crystal composition according to item 8 or 9, wherein the liquid crystal composition further includes, in addition to the first component and the second component, at least one compound selected from a group of compounds represented by formulae (g-1), (g-2), (g-3) and (g-4) as a third component:

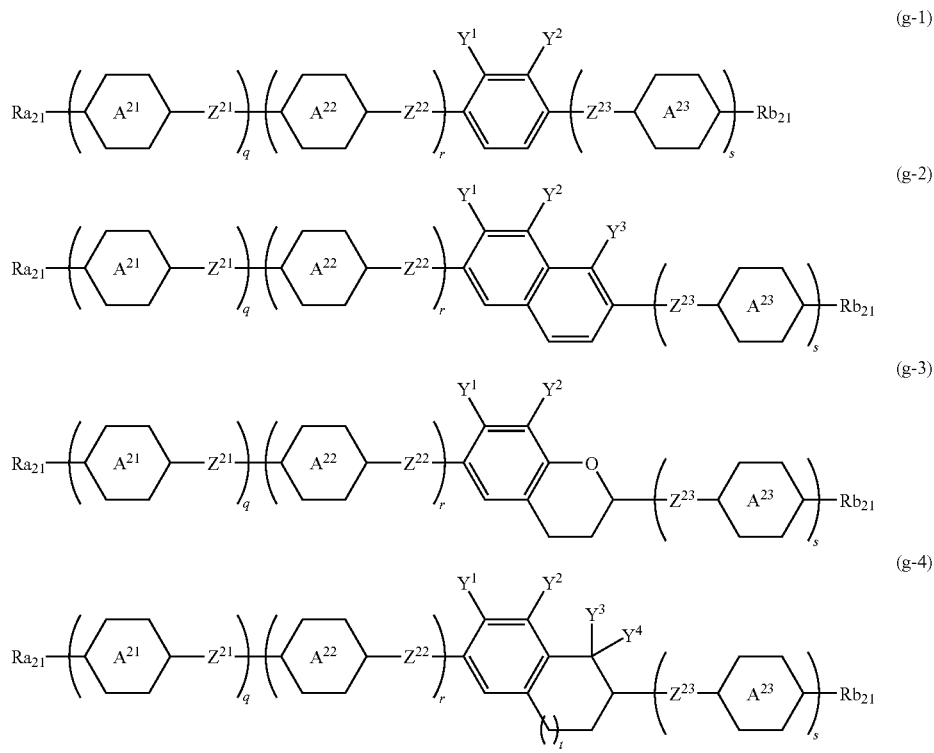

wherein $Ra_{21}$ and $Rb_{21}$ are each independently hydrogen, alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring $A^{21}$, ring $A^{22}$ and ring $A^{23}$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl; $Z^{21}$, $Z^{22}$ and $Z^{23}$ are each independently a single bond, —CH$_2$—CH$_2$—, —CH=CH—, —C≡C—, —OCF$_2$—, —CF$_2$O—, —OCF$_2$CH$_2$CH$_2$—, —CH$_2$CH$_2$CF$_2$O—, —COO—, —OCO—, —OCH$_2$— or —CH$_2$O—; $Y^1$, $Y^2$, $Y^3$ and $Y^4$ are each independently fluorine or chlorine; q, r and s are each independently 0, 1 or 2, provided that q+r+s is 1, 2 or 3; and t is 0, 1 or 2.

12. The liquid crystal composition according to item 11, wherein the third component is at least one compound selected from a group of compounds represented by formulae (h-1), (h-2), (h-3), (h-4) and (h-5):

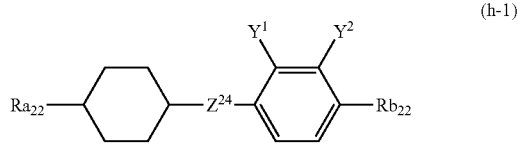
(h-1)

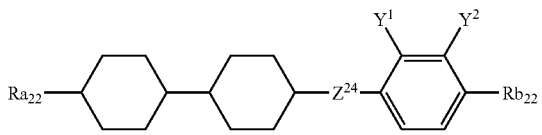
(h-2)

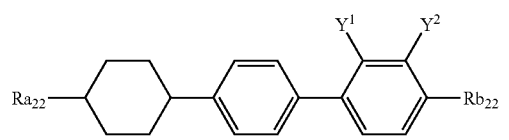
(h-3)

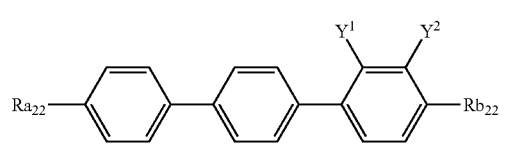
(h-4)

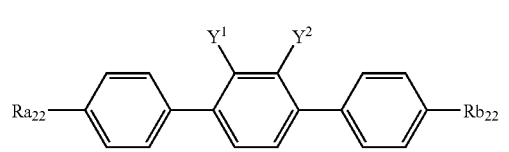
(h-5)

wherein $Ra_{22}$ is linear alkyl having 1 to 8 carbons or linear alkenyl having 2 to 8 carbons; $Rb_{22}$ is linear alkyl having 1 to 8 carbons, linear alkenyl having 2 to 8 carbons or alkoxy having 1 to 7 carbons; $Z^{24}$ is a single bond or —CH$_2$CH$_2$—; and both $Y^1$ and $Y^2$ are fluorine, or one of $Y^1$ and $Y^2$ is fluorine, and the other is chlorine.

13. A liquid crystal composition having a negative dielectric anisotropy and including three components, wherein the first component is at least one compound selected from a group of compounds represented by formulae (a-1) to (a-3) and formulae (b-1) to (b-3), the second component is at least one compound selected from a group of compounds represented by formulae (e-1), (e-2) and (e-3) according to item 8, and the third component is at least one compound selected from a group of compounds represented by formulae (h-1), (h-2), (h-3), (h-4) and (h-5) according to item 12:

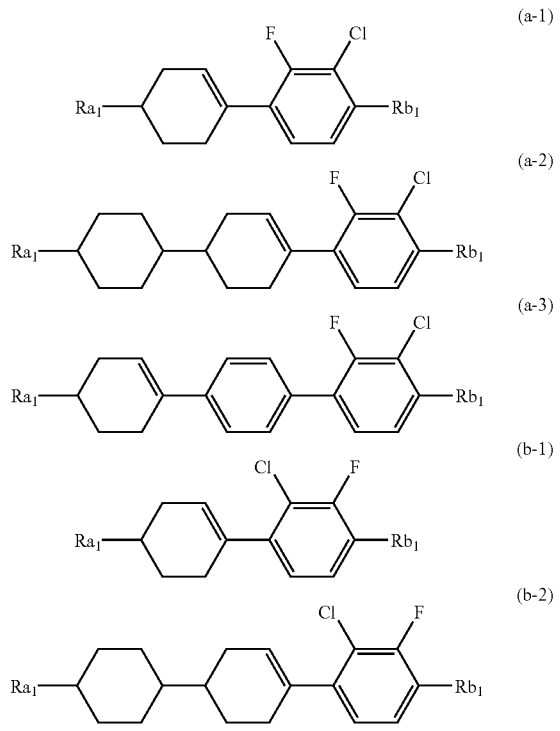

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons.

14. The liquid crystal composition according to any one of items 11 to 13, wherein the ratio of the first component is from approximately 10% to approximately 80% by weight, the ratio of the second component is from approximately 10% to approximately 80% by weight, and the ratio of the third component is from approximately 10% to approximately 80% by weight, based on the total weight of the liquid crystal composition.

15. The liquid crystal composition according to any one of items 7 to 14, wherein the liquid crystal composition further includes an antioxidant and/or an ultraviolet light absorbent.

16. The liquid crystal composition according to item 15, wherein the liquid crystal composition further includes an antioxidant represented by formula (I):

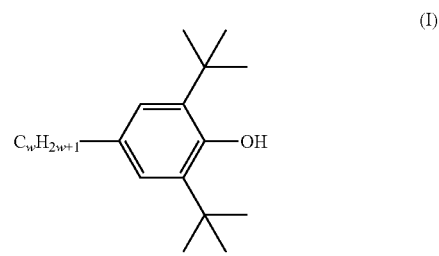

wherein w is an integer of 1 to 15.

17. A liquid display device that includes the liquid crystal composition according to any one of items 7 to 16.

18. The liquid crystal display device according to item 17, wherein the liquid crystal display device has an operation mode of a VA mode or an IPS mode, and has a driving mode of an active matrix mode.

Liquid Crystal Compound (a)

The liquid crystal compound of the invention has a structure represented by formula (a) below. Hereinafter, the compound may be referred to as a liquid crystal compound (a).

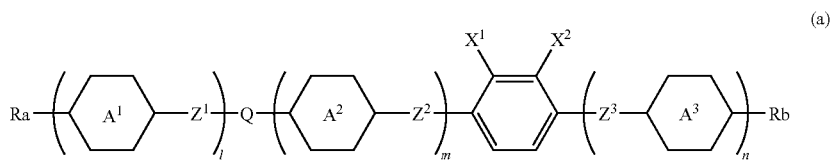

In formula (a), Ra and Rb are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons.

In formula (a), ring $A^1$, ring $A^2$ and ring $A^3$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl.

In formula (a), $Z^1$, $Z^2$ and $Z^3$ are each independently a single bond, —$(CH_2)_2$—, —CH═CH—, —C≡C—, —$CH_2$O—, —O$CH_2$—, —COO—, —OCO—, —O$CF_2$—, —$CF_2$O—, —$CH_2CH_2OCF_2$— or —$CF_2OCH_2CH_2$—.

In formula (a), l, m and n are each independently 0, 1 or 2, provided that l+m+n is 0, 1, 2 or 3.

-continued

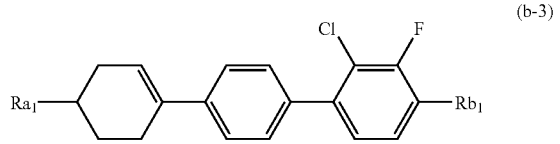

In formula (a), one of $X^1$ and $X^2$ is fluorine, and the other is chlorine.

In formula (a), Q is

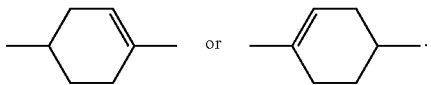

The atoms of the compound each may be an isotope thereof.

The compound (a) has cyclohexenylene and 1,4-phenylene, in which one of hydrogens on the 2- and 3-positions is replaced by fluorine, and the other is replaced by chlorine. Owing to the structure, the compound has a large optical anisotropy, a suitable negative dielectric anisotropy and excellent compatibility with other liquid crystal compounds, and furthermore is excellent in stability to heat and light.

In formula (a), Ra and Rb are the groups mentioned above, and the chain of carbon-carbon bond in the groups is preferably a linear chain. In the case where the chain of carbon-carbon bond is a linear chain, the temperature range of the liquid crystal phase can be enhanced, and the viscosity can be decreased. In the case where one of Ra and Rb is an optically active group, the compound is useful as a chiral dopant, and the addition of the compound to a liquid crystal composition can prevent formation of a reverse twisted domain generated in a liquid crystal display device.

In formula (a), Ra and Rb are the groups mentioned above, and alkenyl in the groups has a preferred steric configuration of —CH═CH— depending on the position of the double bond in alkenyl. In alkenyl having a double bond at an odd number position, such as —CH═CHCH$_3$, —CH═CHC$_2$H$_5$, —CH═CHC$_3$H$_7$, —CH═CHC$_4$H$_9$, —C$_2$H$_4$CH═CHCH$_3$ and —C$_2$H$_4$CH═CHC$_2$H$_5$, the steric configuration is preferably a trans configuration.

In alkenyl having a double bond at an even number position, such as —CH$_2$CH═CHCH$_3$, —CH$_2$CH═CHC$_2$H$_5$ and —CH$_2$CH═CHC$_3$H$_7$, the steric configuration is preferably a cis configuration. An alkenyl compound having the preferred steric configuration has a wide temperature range of a liquid crystal phase, large elastic constants $K_{33}$ and $K_{11}$ ($K_{33}$: bend elastic constant, $K_{11}$: splay elastic constant) and a small viscosity. By adding the liquid crystal compound to a liquid crystal composition, the liquid crystal composition has a high maximum temperature ($T_{NI}$) of a nematic phase.

Specific examples of the alkyl include —CH$_3$, —C$_2$H$_5$, —C$_3$H$_7$, —C$_4$H$_9$, —C$_5$H, —C$_6$H$_{13}$, —C$_7$H$_{15}$, —C$_8$H$_{17}$, —C$_9$H$_{19}$ and —C$_{10}$H$_{21}$.

Specific examples of the alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$ and —OC$_9$H$_{15}$.

Specific examples of the alkoxyalkyl include —CH$_2$OCH$_3$, —CH$_2$OC$_2$H$_5$, —CH$_2$OC$_3$H$_7$, —(CH$_2$)$_2$OCH$_3$, —(CH$_2$)$_2$OC$_2$H$_5$, —(CH$_2$)$_2$OC$_3$H$_7$, —(CH$_2$)$_3$OCH$_3$, —(CH$_2$)$_4$—CH$_3$ and —(CH$_2$)$_5$OCH$_3$.

Specific examples of the alkenyl include —CH═CH$_2$, —CH═CHCH$_3$, —CH$_2$CH═CH$_2$, —CH$_2$CH═CH$_2$, —CH═CHC$_2$H$_5$, —CH$_2$CH═CHCH$_3$, —(CH$_2$)$_2$CH═CH$_2$, —CH═CHC$_3$H$_7$, —CH$_2$CH═CHC$_2$H$_5$, —(CH$_2$)$_2$CH═CHCH$_3$, —(CH$_2$)$_3$CH═CH$_2$, —CH═CHC$_5$H$_{11}$, —(CH$_2$)$_2$CH═CHC$_3$H$_7$ and —(CH$_2$)$_7$CH═CH$_2$.

Specific examples of the alkenyloxy include —OCH$_2$CH═CH$_2$, —OCH$_2$CH═CHCH$_3$, —O(CH$_2$)$_2$CH═CH$_2$ and —OCH$_2$CH═CHC$_2$H$_5$.

Specific examples of alkyl, in which hydrogen is replaced by halogen, include —CH$_2$F, —CHF$_2$, —CF$_3$, —(CH$_2$)$_2$F, —CF$_2$CH$_2$F, —CF$_2$CHF$_2$, —CH$_2$CF$_3$, —CF$_2$CF$_3$, —(CH$_2$)$_3$F, —(CF$_2$)$_2$CF$_3$, —CF$_2$CHFCF$_3$ and —CHFCF$_2$CF$_3$.

Specific examples of alkoxy, in which hydrogen is replaced by halogen, include OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$ and —OCHFCF$_2$CF$_3$.

Specific examples of alkenyl, in which hydrogen is replaced by halogen, include —CH═CHF, —CH═CF$_2$, —CF$_2$═CHF, —CH═CHCH$_2$F, —CH═CHCF$_3$ and —(CH$_2$)$_2$CH═CF$_2$ Among the specific examples for Ra and Rb, preferred examples thereof include —CH$_3$, —C$_2$H$_5$, —C$_3$H$_7$, —C$_4$H$_9$, —C$_5$H$_{11}$, —OCH$_3$, —OC$_2$H$_5$, —OC$_3$H$_7$, —OC$_4$H$_9$, —OC$_5$H$_{11}$, —CH$_2$OCH$_3$, —(CH$_2$)$_2$OCH$_3$, —(CH$_2$)$_3$OCH$_3$, —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$CH═CH$_2$, —CH═CHC$_3$H$_7$, —CH$_2$CH═CHC$_2$H$_5$, —(CH$_2$)$_2$CH═CHCH$_3$, —(CH$_2$)$_3$CH═CH$_2$, —OCH$_2$CH═CH$_2$, —OCH$_2$CH═CHCH$_3$, —OCH$_2$CH═CHC$_2$H$_5$, —CF$_3$, —CHF$_2$, —CH$_2$F, —OCF$_3$, —OCHF$_2$, —OCH$_2$F, —OCF$_2$CF$_3$, —OCF$_2$CHF$_2$, —OCF$_2$CH$_2$F, —OCF$_2$CF$_2$CF$_3$, —OCF$_2$CHFCF$_3$ and —OCHFCF$_2$CF$_3$, more preferred examples thereof include —CH$_3$, —C$_2$H$_5$, —C$_3$H$_7$, —C$_4$H$_9$, —C$_5$H$_{11}$, —OCH$_3$, —OC$_2$H$_5$, —OC$_3$H$_7$, —OC$_4$H$_9$, —OC$_5$H$_{11}$, —CH$_2$OCH$_3$, —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$CH═CH$_2$, —CH═CHC$_3$H$_7$, —CH$_2$CH═CHC$_2$H$_5$, —(CH$_2$)$_2$CH═CHCH$_3$ and —(CH$_2$)$_3$CH═CH$_2$, and further preferred examples thereof include —CH$_3$, —C$_2$H$_5$, —C$_3$H$_7$, —C$_4$H$_9$, —C$_5$H$_1$, —OCH$_3$, —OC$_2$H$_5$, —OC$_3$H$_7$, —OC$_4$H$_9$, —CH═CH$_2$, —CH═CHCH$_3$, —(CH$_2$)$_2$CH═CH$_2$ and —(CH$_2$)$_2$CH═CHCH$_3$.

In formula (a), ring $A^1$, ring $A^2$ and ring $A^3$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl.

Among these, preferred examples thereof include trans-1,4-cyclohexylene, 1,4-phenylene, 2-fluoro-1,4-phenylene and 2,3-difluoro-1,4-phenylene, most preferred examples thereof include trans-1,4-cyclohexylene and 1,4-phenylene.

In particular, in the case where at least two rings among the rings are each trans-1,4-cyclo hexylene, the compound has a small viscosity, and by adding the compound to a liquid crystal composition, the composition has a high maximum temperature ($T_{NI}$) of a nematic phase.

In the case where at least one ring among the rings is 1,4-phenylene, the compound has a large orientation order parameter. In the case where at least two rings among the rings are each 1,4-phenylene, the compound has a large optical anisotropy.

In formula (a), $Z^1$, $Z^2$ and $Z^3$ are each independently a single bond, —(CH$_2$)$_2$—, —CH═CH—, —C≡C—, —CH$_2$O—, —OCH$_2$—, —COO—, —OCO—, —OCF$_2$—, —CF$_2$O—, —CH$_2$CH$_2$OF$_2$— or —CF$_2$OCH$_2$CH$_2$—.

In the case where $Z^1$, $Z^2$ and $Z^3$ are each a bonding group, such as —CH═CH—, the steric configuration with respect to the double bond for the other group is preferably a trans configuration. Owing to the steric configuration, the liquid crystal compound has a wide temperature range of a liquid crystal phase, and by adding the liquid crystal compound to a liquid crystal composition, the composition has a high maximum temperature ($T_{NI}$) of a nematic phase.

Among these groups for $Z^1$, $Z^2$ and $Z^3$, preferred examples thereof include a single bond, —(CH$_2$)$_2$— and —CH=CH—. In the case where $Z^1$, $Z^2$ and $Z^3$ are each a single bond, —(CH$_2$)$_2$— or —CH=CH—, the compound is stable to heat and light, has a high maximum temperature ($T_{NI}$) of a nematic phase, and has a small viscosity. In the case where $Z^1$, $Z^2$ and $Z^3$ are each a single bond or —(CH$_2$)$_2$—, the compound is more stable to heat and light.

In the case where $Z^1$, $Z^2$ and $Z^3$ contain —CH=CH—, the compound has a wide temperature range of a liquid crystal phase, has a large elastic constant ratio $K_{33}/K_{11}$, has a small viscosity, and has a large optical anisotropy ($\Delta n$), and by adding the compound to a liquid crystal composition, the composition has a high maximum temperature ($T_{NI}$) of a nematic phase.

In formula (a), one of $X^1$ and $X^2$ is fluorine, and the other is chlorine. In the case where one of these atoms is fluorine, and the other is chlorine, the compound has high compatibility with other liquid crystal compounds as compared to the case where the atoms are the same halogen atoms, particularly in the case where both $X^1$ and $X^2$ are fluorine. Accordingly, a larger amount of the compound (a) can be added to other liquid crystal compounds, and thus such a liquid crystal composition can be obtained that has a large optical anisotropy ($\Delta n$) and a negatively large dielectric anisotropy ($\Delta \epsilon$).

In the case where $X^1$ is chlorine, and $X^2$ is fluorine, the compound has further high compatibility with other liquid crystal compounds. The liquid crystal compound (a) may contain an isotope, such as $^2$H (deuterium) and $^{13}$C, in an amount larger than the natural abundance since there is no large difference in properties of the compounds.

The properties, such as the dielectric anisotropy ($\Delta \epsilon$), of the liquid crystal compound (a) can be controlled to desired values by appropriately selecting the end groups Ra and Rb, ring $A^1$, ring $A^2$ and ring $A^3$, and the bonding groups $Z^1$, $Z^2$ and $Z^3$, within the aforementioned ranges.

In the liquid crystal compound (a), compounds represented by formulae (a-1) to (a-3) and (b-1) to (b-3) below are preferred.

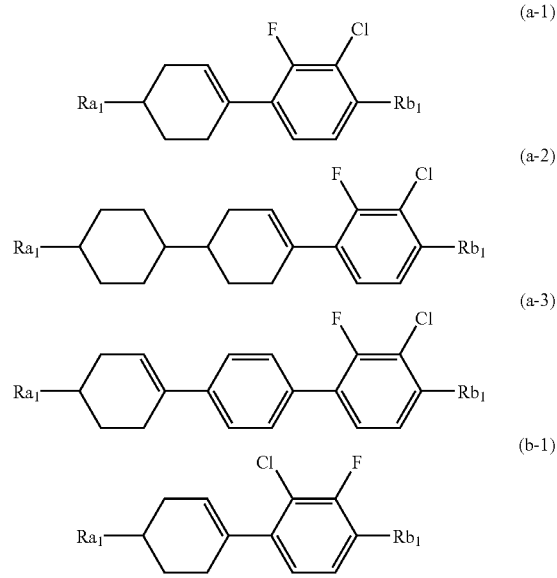

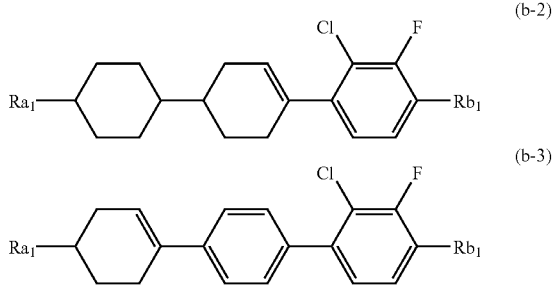

In formulae (a-1) to (a-3) and (b-1) to (b-3), Ra$_1$ is linear alkyl having 1 to 10 carbons or linear alkenyl having 2 to 10 carbons, and Rb$_1$ is linear alkyl having 1 to 10 carbons or linear alkoxy having 1 to 9 carbons.

In the case where the liquid crystal compound (a) is represented by formula (a-1) or (b1), it is preferred since by adding the compound to a liquid crystal composition, the composition is particularly excellent in compatibility and has a negatively large dielectric anisotropy.

In the case where the liquid crystal compound (a) is represented by formula (a-2), it is preferred since by adding the compound to a liquid crystal composition, the composition has excellent compatibility, has a large negative dielectric anisotropy, has a large optical anisotropy, and has a high maximum temperature of a nematic phase.

In the case where the liquid crystal compound (a) is represented by formula (a-3), it is preferred since by adding the compound to a liquid crystal composition, the composition has a large negative dielectric anisotropy, has a further large optical anisotropy, and has a high maximum temperature of a nematic phase.

In the case where the liquid crystal compound (a) is represented by formula (b-2), it is preferred since by adding the compound to a liquid crystal composition, the composition has excellent compatibility, has a large negative dielectric anisotropy, has a large optical anisotropy, and has a high maximum temperature of a nematic phase.

In the case where the liquid crystal compound (a) is represented by formula (b-3), it is preferred since by adding the compound to a liquid crystal composition, the composition has excellent compatibility, has a large negative dielectric anisotropy, has a further large optical anisotropy, and has a high maximum temperature of a nematic phase.

In the case where a liquid crystal compound has a structure represented by the liquid crystal compound (a), the compound has a suitable negative dielectric anisotropy, and has significantly good compatibility with other liquid crystal compounds. Furthermore, the compound has stability to heat, light and so forth, exhibits a nematic phase in a wide temperature range, and has a small viscosity, a large optical anisotropy and a suitable elastic constant ratio $K_{33}/K_{11}$. A liquid crystal composition containing the liquid crystal compound (a) is stable under the condition where a liquid crystal display device is generally used, and the compound does not deposited as crystals (or a smectic phase) even upon storing at a low temperature.

Accordingly, the liquid crystal compound (a) can be preferably used in a liquid crystal composition used in a liquid crystal display device of such a display mode as PC, TN, STN, ECB, OCB, IPS and VA, and can be particularly preferably used in a liquid crystal composition used in a liquid crystal display device of such a display mode as IPA and VA.

Synthesis of Liquid Crystal Compound (a)

The liquid crystal compound (a) can be synthesized by appropriately combining synthesis methods of synthetic organic chemistry. Examples of a method for introducing the target end groups, rings and bonding groups into starting materials are disclosed in such literatures as ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Formation of Bonding Groups $Z^1$, $Z^2$ and $Z^3$

One example of a method for forming the bonding groups $Z^1$, $Z^2$ and $Z^3$ is described. A scheme of forming the bonding group is shown below. In the scheme, $MSG^1$ and $MSG^2$ are each a monovalent organic group. Plural groups of $MSG^1$ (or $MSG^2$) used in the scheme may be the same as or different from each other. The compounds (1A) to (1J) correspond to the liquid crystal compounds (a).

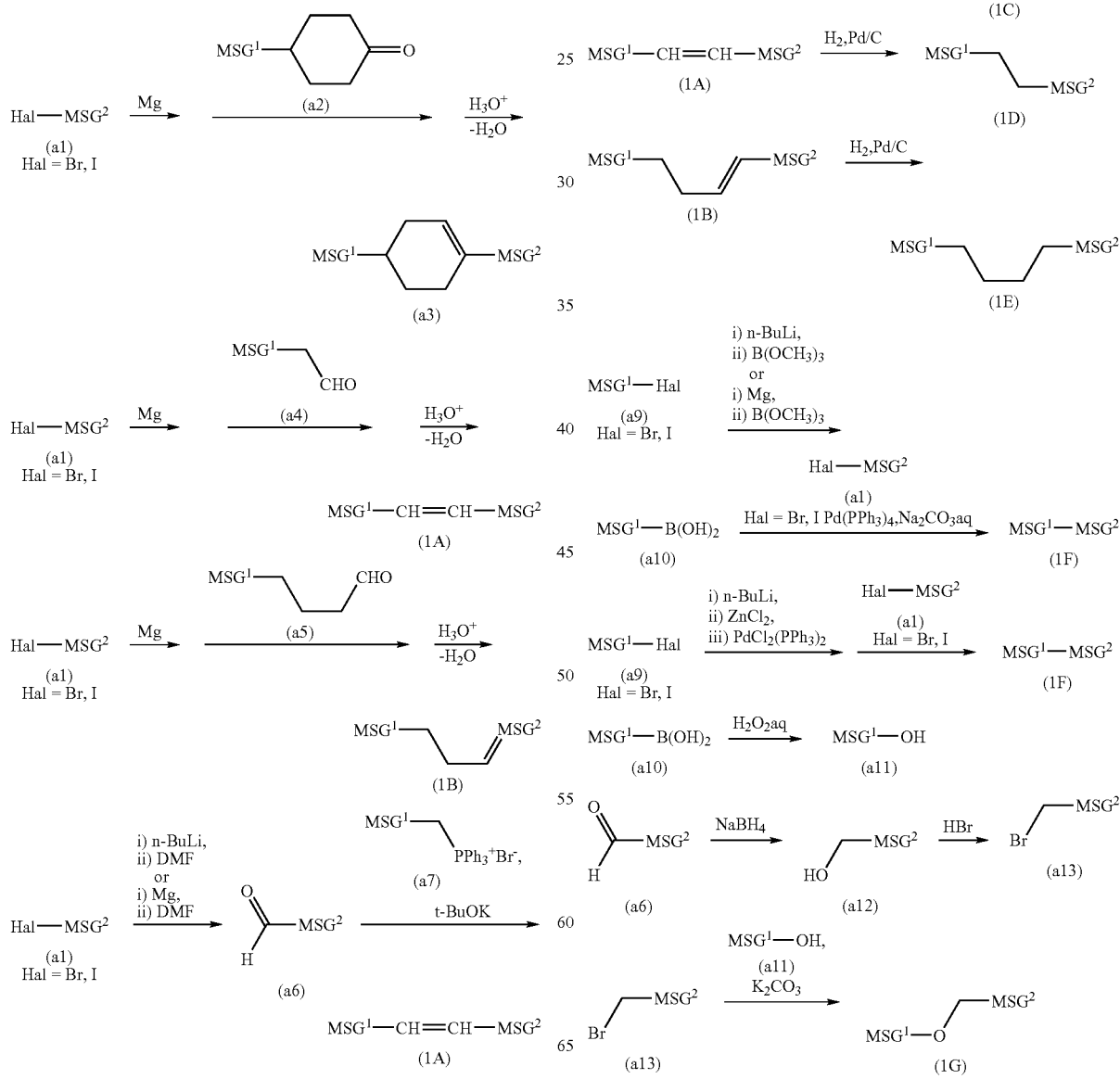

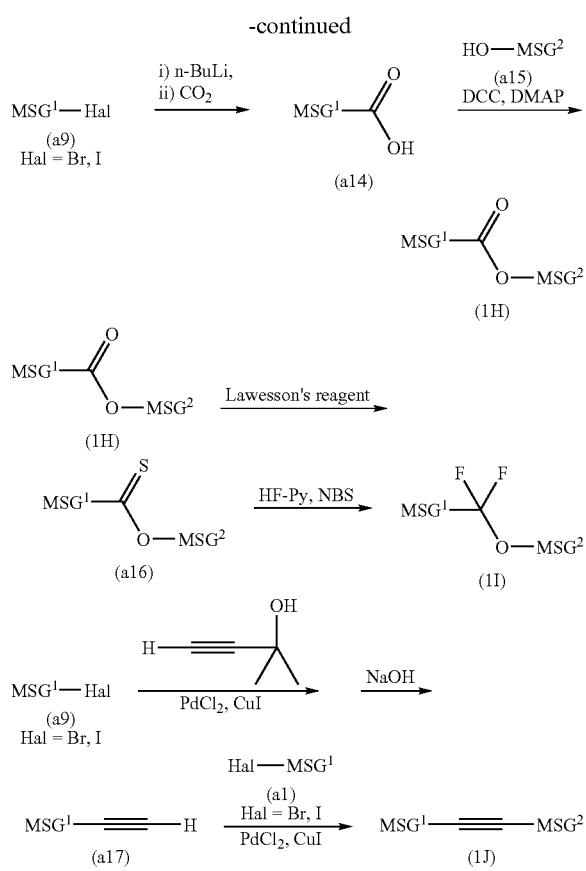

Formation of Double Bond 1

An organic halogen compound (a1) having a monovalent organic group MSG$^2$ and magnesium are reacted with each other to prepare a Grignard reagent. The Grignard reagent thus prepared and an aldehyde derivative (a4) or (a5) are reacted with each other to synthesize a corresponding alcohol derivative. Subsequently, the resulting alcohol derivative is subjected to dehydration by using an acid catalyst, such as p-toluenesulfonic acid, to synthesize a corresponding compound (1A) or (1B) having a double bond.

Formation of Double Bond 2

A compound obtained by treating an organic halogen compound (a1) with butyllithium or magnesium is reacted with a formamide compound, such as N,N-dimethylformamide (DMF), to obtain an aldehyde (a6). The resulting aldehyde (a6) is reacted with phosphonium ylide obtained by treating a phosphonium salt (a7) or (a8) with a base, such as potassium t-butoxide (t-BuOK), to synthesize a corresponding compound (1A) or (1B) having a double bond. In the aforementioned reaction, there are cases where a cis compound is formed depending on the reaction conditions, and therefore, in the case where a trans compound is necessarily obtained, the cis compound is isomerized to the trans compound by a known method.

Formation of Single Bond 1

An organic halogen compound (a1) and magnesium are reacted with each other to prepare a Grignard reagent. The Grignard reagent thus prepared and a cyclohexanone derivative (a2) are reacted with each other to prepare a corresponding alcohol derivative. Subsequently, the resulting alcohol derivative is subjected to dehydration by using an acid catalyst, such as p-toluenesulfonic acid, to synthesize a corresponding compound (a3) having a double bond. The resulting compound (a3) is subjected to hydrogenation in the presence of a catalyst, such as Raney nickel, to synthesize a compound (1C). The cyclohexanone derivative (a2) can be synthesized according, for example, to a method disclosed in JP S59-7122 A/1984.

Formation of Single Bond 2

An organic halogen compound (a9) having a monovalent organic group MSG$^1$ and magnesium or butyllithium are reacted with each other to prepare a Grignard reagent or a lithium salt. The Grignard reagent or the lithium salt thus prepared is reacted with a borate ester, such as trimethyl borate, and hydrolyzed with an acid, such as hydrochloric acid, to synthesize a dihydroxyboran derivative (a10). The dihydroxyboran (a10) and an organic halogen compound (a1) are reacted with each other in the presence of a catalyst, such as a catalyst containing a carbonate salt aqueous solution and tetrakis(triphenylphosphine) palladium (Pd(PPh$_3$)$_4$), to synthesize a compound (1F).

In alternative, an organic halogen compound (a9) is reacted with butyllithium and then reacted with zinc chloride to obtain a compound, and the resulting compound is reacted with a compound (a1) in the presence of a catalyst, such as bistriphenylphosphine dichloropalladium (Pd(PPh$_3$)$_2$Cl$_2$), to synthesize a compound (1F).

Formation of —(CH$_2$)$_2$—

A compound (1A) is hydrogenated in the presence of a catalyst, such as carbon supported palladium (Pd/C), to synthesize a compound (1D).

Formation of —(CH$_2$)$_4$—

A compound (1B) is hydrogenated in the presence of a catalyst, such as Pd/C, to synthesize a compound (1E).

Formation of —CH$_2$O— or —OCH$_2$—

A dihydroxyborane derivative (a10) is oxidized with an oxidizing agent, such as hydrogen peroxide, to obtain an alcohol derivative (a11). Separately, an aldehyde derivative (a6) is reduced with a reducing agent, such as sodium borohydride, to obtain a compound (a12). The resulting compound (a12) is halogenated with hydrobromic acid or the like to obtain an organic halogen compound (a13). The compound (a11) and the compound (a13) thus obtained are reacted with each other in the presence of potassium carbonate or the like to synthesize a compound (1G).

Formation of —COO— and —OCO—

A compound (a9) is reacted with n-butyllithium and then reacted with carbon dioxide to obtain a carboxylic acid (a14). The compound (a14) and a phenol (a15), which is synthesized by the similar method as obtaining the compound (a11), are subjected to dehydration in the presence of DCC (1,3-dicyclohexylcarbodiimide) and DMAP (4-dimethylaminopyridine) to synthesize a compound (1H) having —COO—. A compound having —OCO— can also be synthesized in the same manner.

Formation of —CF$_2$O— and —OCF$_2$—

A compound (1H) is treated with sulfurizing agent, such as Lawesson's reagent, to obtain a compound (a16). The compound (a16) is fluorinated with a hydrogen fluoride pyridine complex and NBS (N-bromosuccinimide) to synthesize a compound having —CF$_2$O— (1I). The reaction is described in M. Kuroboshi, et al., *Chem. Lett.,* 827 (1992). The compound (1I) can also be synthesized by fluorinating the compound (a16) with (diethylamino)sulfate trifluoride (DAST). The reaction is described in W. H. Bunnelle, et al., *J. Org. Chem.,* 55, 768 (1990). A compound having —OCF$_2$— can also be synthesized in the same manner. These bonding groups can also be formed by a method disclosed in Peer. Kirsch, et al., *Anbew. Chem. Int. Ed.,* 40, 1480 (2001).

Formation of —C≡C—

A compound (a9) is reacted with 2-methyl-3-butyne-2-ol in the presence of dichloropalladium and copper halide as a catalyst, and then deprotected under a basic condition to obtain a compound (a17). The compound (a17) is reacted with a compound (a1) in the presence of dichloropalladium and copper halide as a catalyst to synthesize a compound (1J).

Production Method of Liquid Crystal Compound (a)

An example of a production method of the liquid crystal compound (a), i.e., the liquid crystal compound represented by formula (a), is shown below.

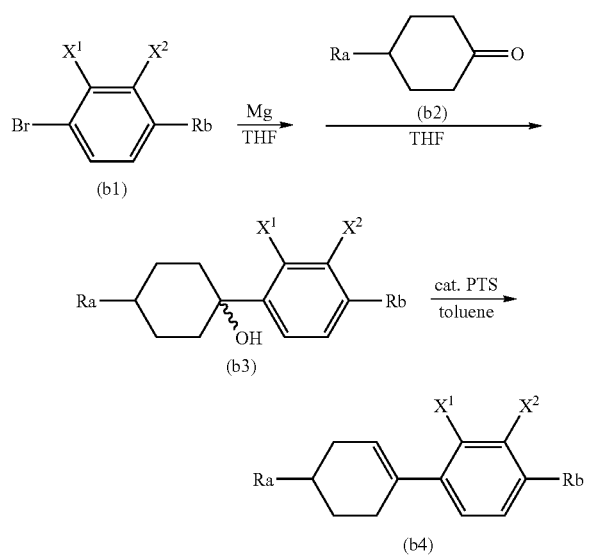

A compound (b1) is reacted with magnesium to prepare a Grignard reagent. The Grignard reagent and a carbonyl derivative (b2) are reacted with each other to obtain an alcohol derivative (b3). The resulting alcohol derivative (b3) is subjected to dehydration in the presence of an acid catalyst, such as p-toluenesulfonic acid (PTS), to produce a liquid crystal compound (b4), which is an example of the liquid crystal compound (a) of the invention.

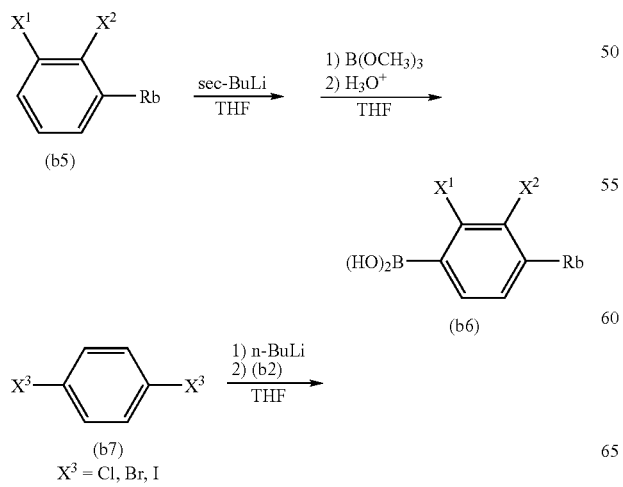

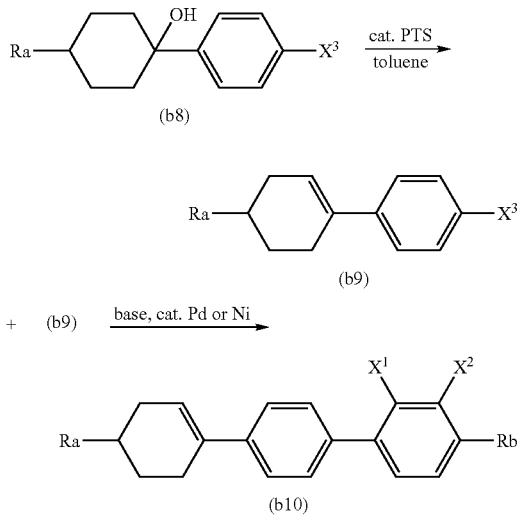

A compound (b5) and sec-butyllithium are reacted with each other to prepare a lithium salt, which is reacted with a borate ester and hydrolyzed in an acidic atmosphere to obtain a dihydroxyborane derivative (b6). Separately, a dihalogen derivative is reacted with n-butyllithium and then reacted with a carbonyl derivative (b2) to synthesize an alcohol derivative (b8). Subsequently, the resulting alcohol derivative (b8) is subjected to dehydration in the presence of an acid catalyst, such as p-toluenesulfonic acid (PTS), to obtain a cyclohexene derivative (b9). The compound (b9) and the dihydroxyborane derivative (b6) are reacted with each other in the presence of a base, such as potassium carbonate or sodium hydroxide, and a catalyst, such as Pd/C, Pd(PPh$_3$)$_4$ or Pd(PPh$_3$)$_2$Cl$_2$, to produce a liquid crystal compound (b10), which is an example of the liquid crystal compound (a) of the invention.

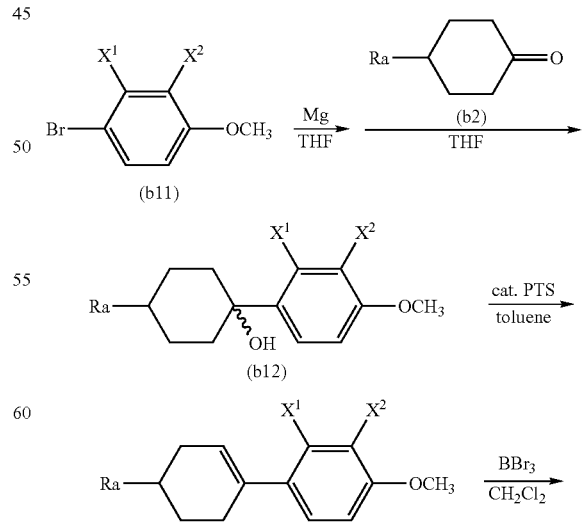

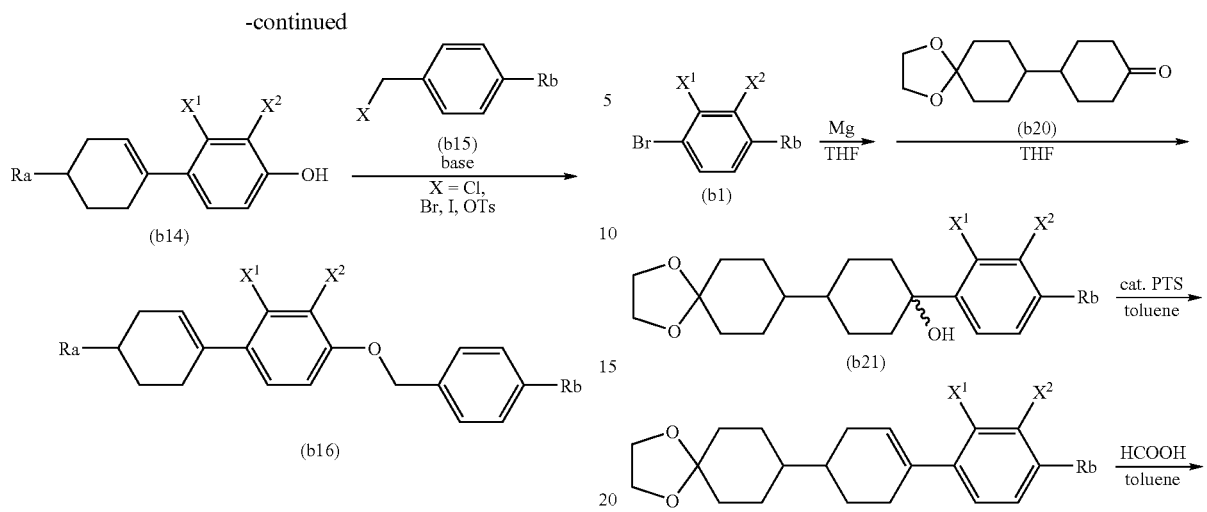

A compound (b11) is reacted with magnesium to prepare a Grignard reagent. The Grignard reagent and a carbonyl derivative (b2) are reacted with each other to obtain an alcohol derivative (b12). The resulting alcohol derivative (b12) is subjected to dehydration in the presence of an acid catalyst, such as p-toluenesulfonic acid (PTS), to obtain a cyclohexene derivative (b13). The compound (b13) is subjected to cleavage reaction with a Lewis acid, such as boron tribromide, to obtain a phenol derivative (b14), and the compound (b14) is etherified with a compound (b15) in the presence of a base, such as potassium carbonate, to produce a liquid crystal compound (b16), which is an example of the liquid crystal compound (a) of the invention.

A compound (b14) is reacted with trifluoromethanesulfonic anhydride in the presence of a base, such as pyridine, to obtain a compound (b17). The compound (b17) is reacted with dihydroxyborane derivative (b18) in the presence of a base, such as potassium carbonate, by using a catalyst, such as Pd(PPh$_3$)$_4$ or Pd/C, to produce a liquid crystal compound (b19), which is an example of the liquid crystal compound (a) of the invention.

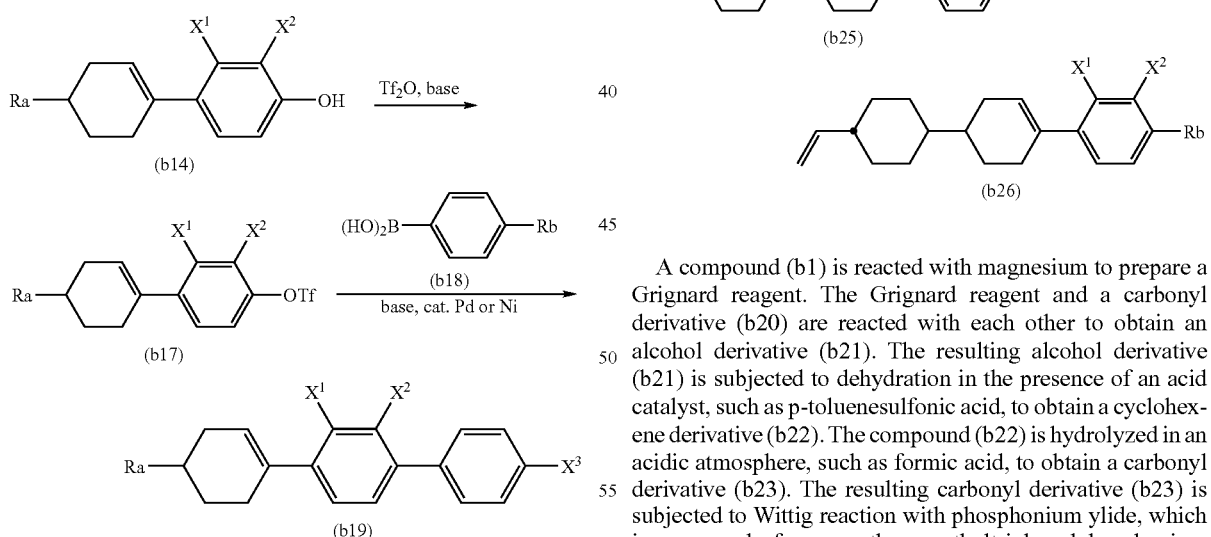

A compound (b1) is reacted with magnesium to prepare a Grignard reagent. The Grignard reagent and a carbonyl derivative (b20) are reacted with each other to obtain an alcohol derivative (b21). The resulting alcohol derivative (b21) is subjected to dehydration in the presence of an acid catalyst, such as p-toluenesulfonic acid, to obtain a cyclohexene derivative (b22). The compound (b22) is hydrolyzed in an acidic atmosphere, such as formic acid, to obtain a carbonyl derivative (b23). The resulting carbonyl derivative (b23) is subjected to Wittig reaction with phosphonium ylide, which is prepared from methoxymethyltriphenylphosphonium chloride and a base, such as potassium t-butoxide (t-BuOK), to obtain an enol ether derivative (b24). The resulting enol ether derivative (b24) is hydrolyzed in an acidic atmosphere, and depending on necessity, is then isomerized in a basic atmosphere, to obtain an aldehyde derivative (b25). The aldehyde derivative (b25) is reacted with phosphonium ylide, which is prepared from methyltriphenylphosphonium bromide and a base, such as t-BuOK, to produce a liquid crystal compound (b26), which is an example of the liquid crystal compound (a) of the invention.

Liquid Crystal Composition

The liquid crystal composition of the invention is described below. The liquid crystal composition includes at least one liquid crystal compound (a), and the liquid crystal composition may include two or more liquid crystal compounds (a) and may be constituted only by the liquid crystal compound (a).

The liquid crystal composition is stable to heat and light, has a low viscosity, has a suitable negative dielectric anisotropy, has a low threshold voltage, has a high maximum temperature of a nematic phase (high phase transition temperature from a nematic phase to an isotropic phase), and has a low minimum temperature of a nematic phase.

Liquid Crystal Composition (1)

The liquid crystal composition of the invention is preferably a composition that includes, in addition to the liquid crystal compound (a) as a first component, at least one compound selected from a group of liquid crystal compounds represented by formulae (e-1) to (e-3) (which may be referred to as the compounds (e-1) to (e-3)) as a second component. The composition may be referred to as a liquid crystal composition (1).

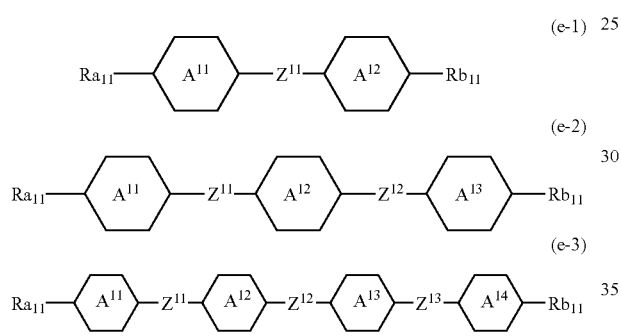

In formulae (e-1) to (e-3), $Ra_{11}$, and $Rb_{11}$ are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons.

In formulae (e-1) to (e-3), ring $A^{11}$, ring $A^{12}$, ring $A^{13}$ and ring $A^{14}$ are each independently trans-1,4-cyclohexylene, trans-1,3-dioxane-2,5-diyl, trans-tetrahydropyran-2,5-diyl, 1,4-phenylene, 2-fluoro-1,4-phenylene or pyridine-2,5-diyl.

In formulae (e-1) to (e-3), $Z^{11}$, $Z^{12}$ and $Z^{13}$ are each independently a single bond, —$CH_2$—$CH_2$—, —CH=CH—, —C≡C—, —COO— or —$CH_2$O—.

By adding the second component to the liquid crystal compound (a), the liquid crystal composition has a small viscosity and a wide range of a nematic phase. For example, the compound (e-1) is a compound that is effective for decreasing the viscosity of a liquid crystal composition including the compound and for increasing the specific resistance of the composition.

The compound (e-2) is a compound that is effective for increasing the maximum temperature of a nematic phase of a liquid crystal composition including the compound and for increasing the specific resistance of the composition. The compound (e-3) is a compound that is effective for increasing the maximum temperature of the nematic phase of a liquid crystal composition including the compound and for increasing the specific resistance of the composition.

In ring $A^{11}$, ring $A^{12}$, ring $A^{13}$ and ring $A^{14}$, in the case where two or more rings are trans-1,4-cyclohexylene, the maximum temperature of the nematic phase of a liquid crystal compound including the compound can be increased, and in the case where two or more rings are 1,4-phenylene, the optical anisotropy of a liquid crystal compound including the compound can be increased.

Preferred examples of the second component include compounds represented by formulae (2-1) to (2-74) below (which may be referred to as compounds (2-1) to (2-74)). In these compounds, $Ra_{11}$ and $R^{11}$ have the same meanings as in the compounds (e-1) to (e-3).

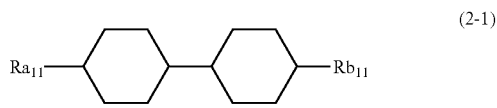

(2-1)

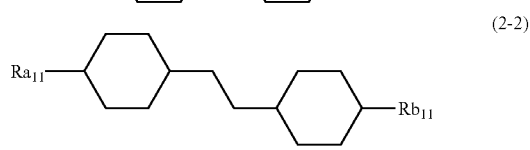

(2-2)

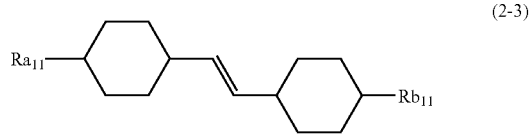

(2-3)

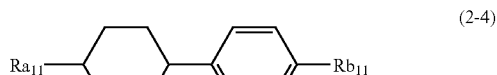

(2-4)

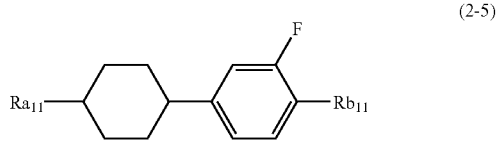

(2-5)

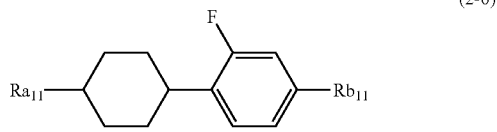

(2-6)

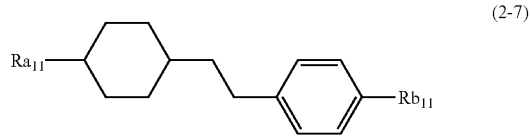

(2-7)

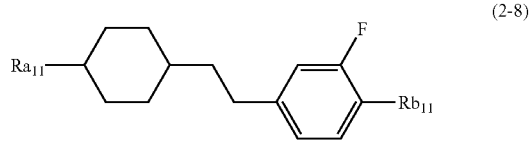

(2-8)

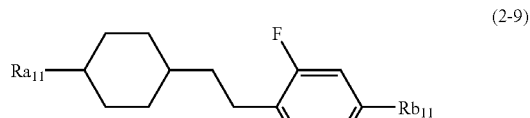

(2-9)

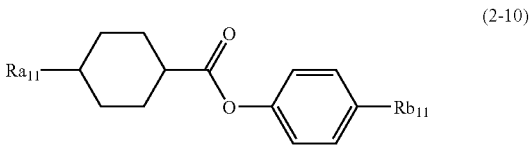

(2-10)

-continued
(2-11)
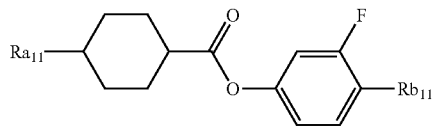
(2-12)
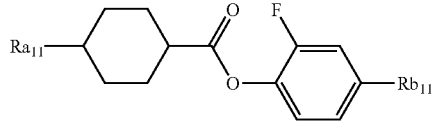
(2-13)
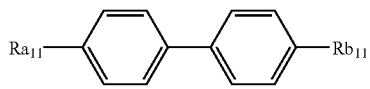
(2-14)
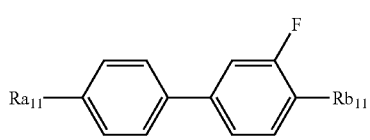
(2-15)
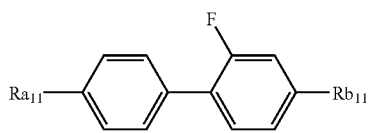
(2-16)
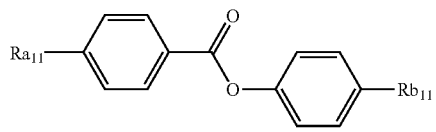
(2-17)
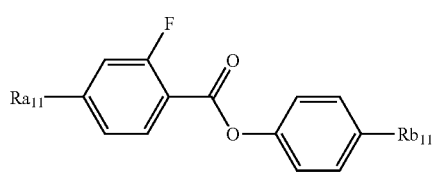
(2-18)
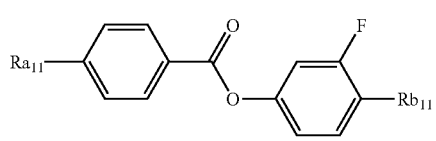
(2-19)
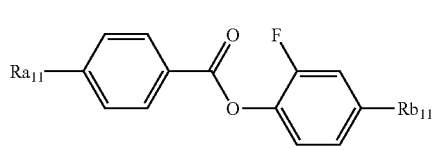
(2-20)
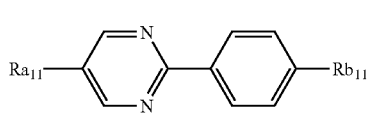
(2-21)
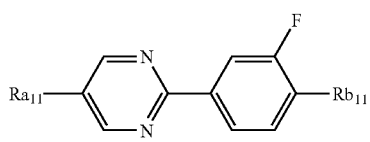
-continued
(2-22)
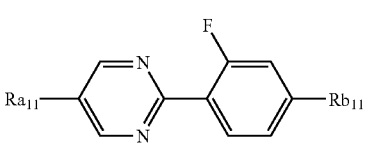
(2-23)
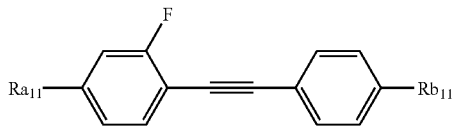
(2-24)
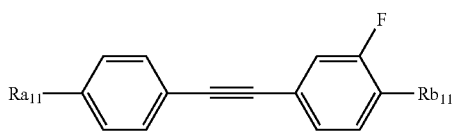
(2-25)
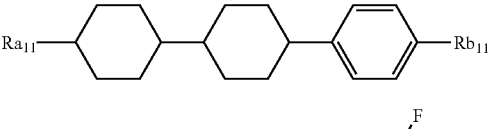
(2-26)
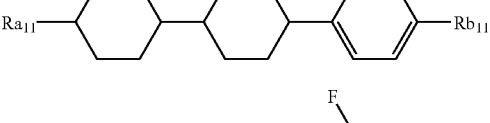
(2-27)
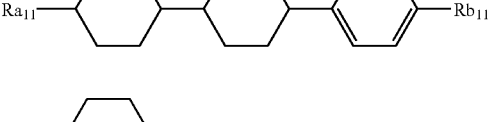
(2-28)
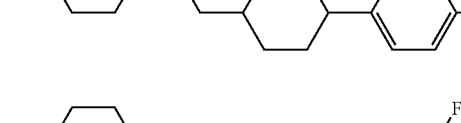
(2-29)
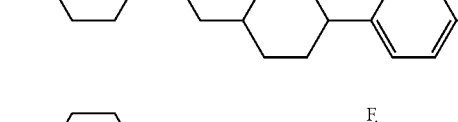
(2-30)
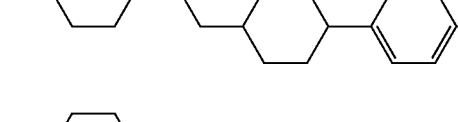
(2-31)
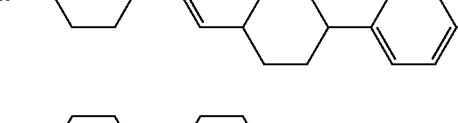
(2-32)
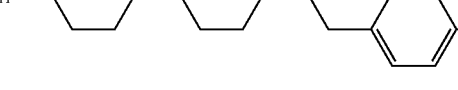

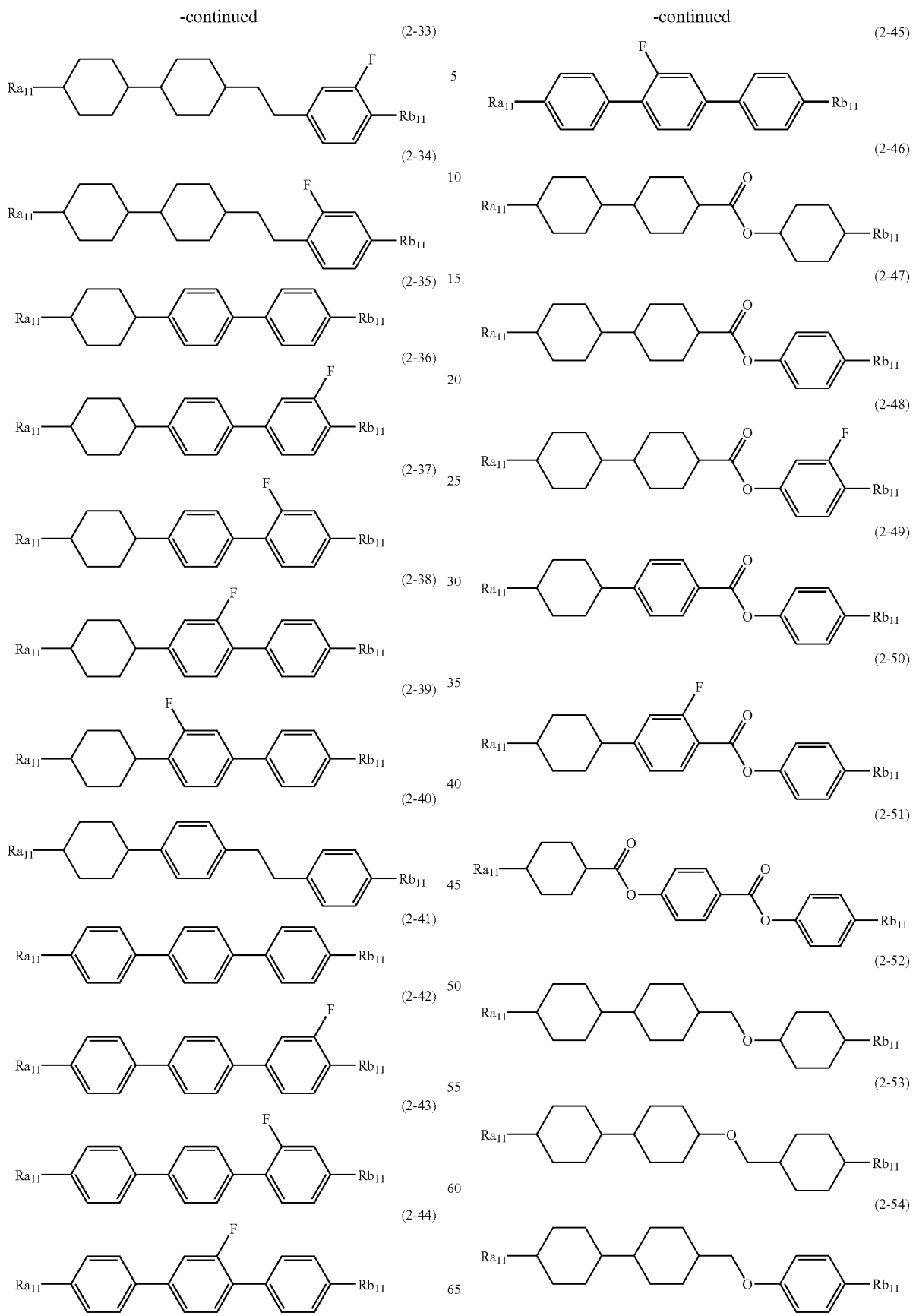

-continued

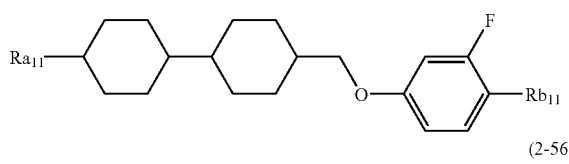
(2-55)

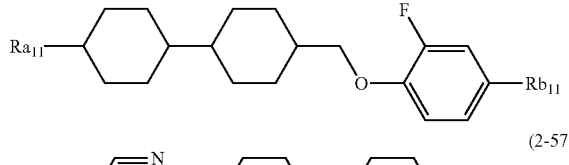
(2-56)

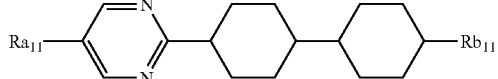
(2-57)

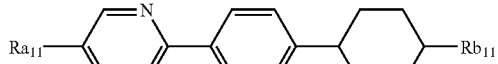
(2-58)

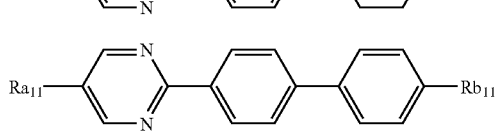
(2-59)

(2-60)

(2-61)

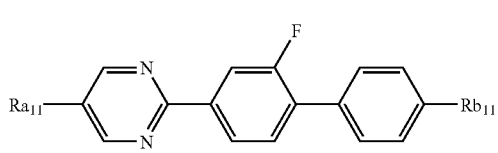
(2-62)

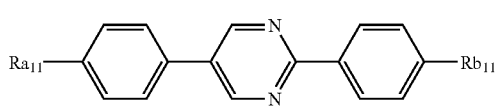
(2-63)

(2-64)

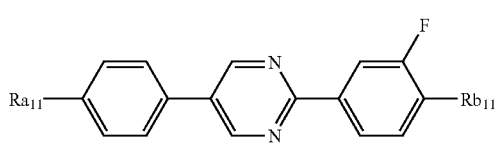
(2-65)

(2-66)

-continued

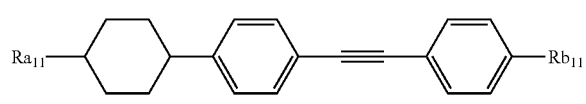
(2-67)

(2-68)

(2-69)

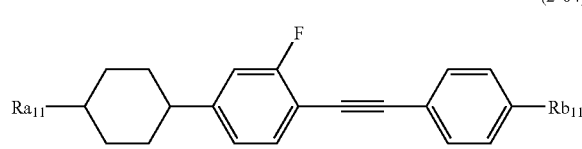
(2-70)

(2-71)

(2-72)

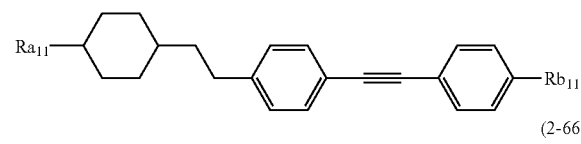
(2-73)

(2-74)

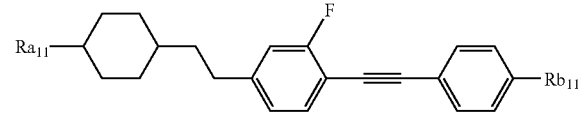

In the case where the second component is the compounds (2-1) to (2-74), such a liquid crystal composition can be prepared that has a further high specific resistance and a wide range of a nematic phase. In the liquid crystal composition (1) of the invention, the content of the second component is not particularly limited and is preferably large from the standpoint of decreasing the viscosity. However, there is a tendency that the threshold voltage of the liquid crystal composition is increased by increasing the content of the second component, and therefore, in the case where the liquid crystal composition of the invention is used in a liquid crystal device of a VA mode, for example, it is more preferred that the content of the second component is in a range of from approximately 15% to approximately 70% by weight based on the total weight of the liquid crystal composition, and the first component is in a range of from approximately 30% to approximately 85% by weight based on the total weight of the liquid crystal composition.

In particular, the liquid crystal composition (1), in which the first component is at least one compound selected from a group of compounds represented by formulae (a-1) to (a-3) and formulae (b-1) to (b3), and the second component is at least one compound selected from a group of compounds represented by formulae (e-1) to (e-3), has a wide range of a nematic phase, a large specific resistance and a small viscosity.

Liquid Crystal Composition (2)

The liquid crystal composition of the invention is preferably a composition that includes, in addition to the first component and the second component, at least one compound selected from a group of liquid crystal compounds represented by formulae (g-1) to (g-4) (which may be referred to as the compounds (g-1) to (g-4)) as a third component. The composition may be referred to as a liquid crystal composition (2).

In formulae (g-1) to (g-4), q, r and s are each independently 0, 1 or 2, provided that q+r+s is 1, 2 or 3, and t is 0, 1 or 2. The liquid crystal composition (2) further including the third component has a negatively large dielectric anisotropy.

The composition also has a wide temperature range of a nematic phase, has a small viscosity, has a large negative dielectric anisotropy, provides a liquid crystal composition having a large specific resistance, and provides a liquid crystal composition being properly balanced among the properties.

The third component is preferably at least one compound selected from a group of compounds represented by formulae

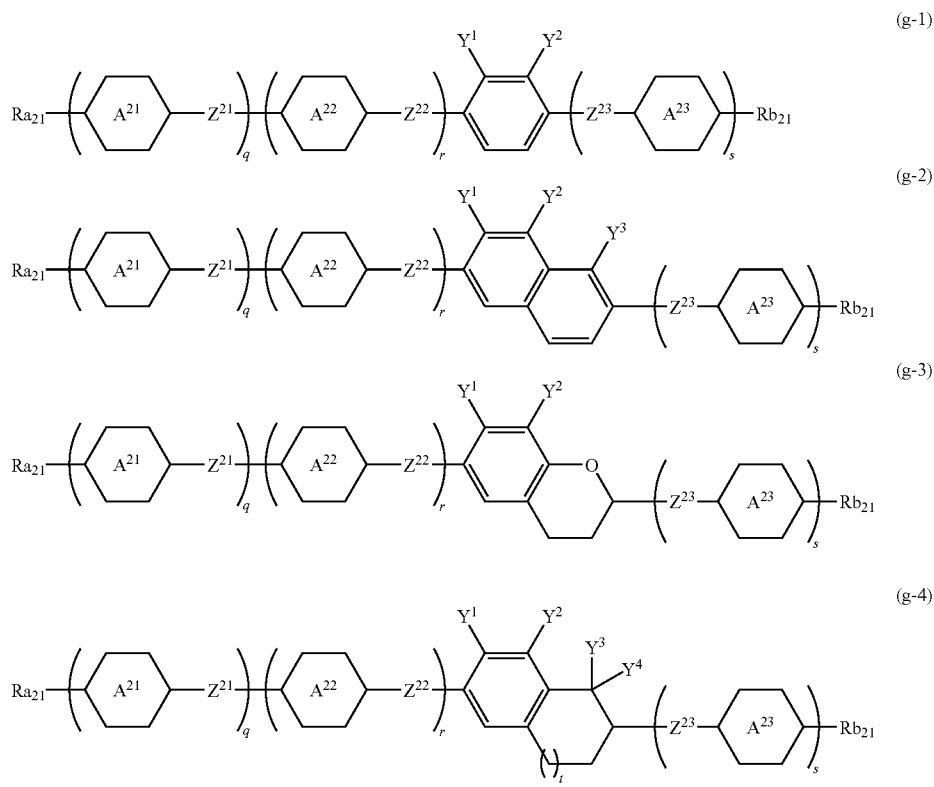

In formulae (g-1) to (g-4), $Ra_{21}$ and $Rb_{21}$ are each independently hydrogen, alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons.

In formulae (g-1) to (g-4), ring $A^{21}$, ring $A^{22}$ and ring $A^{23}$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine-2,5-diyl or pyridazine-2,5-diyl.

In formulae (g-1) to (g-4), $Z^{21}$, $Z^{22}$ and $Z^{23}$ are each independently a single bond, —$CH_2$—$CH_2$—, —CH=CH—, —C≡C—, —$OCF_2$—, —$CF_2O$—, —$OCF_2CH_2CH_2$—, —$CH_2CH_2CF_2O$—, —COO—, —OCO—, —$OCH_2$— or —$CH_2O$—.

In formulae (g-1) to (g-4), $Y^1$, $Y^2$, $Y^3$ and $Y^4$ are each independently fluorine or chlorine.

(h-1) to (h-5) (which may be referred to as compounds (h-1) to (h-5)) from the standpoint of decreasing the viscosity, improving resistance to heat and light, and increasing the maximum temperature of a nematic phase.

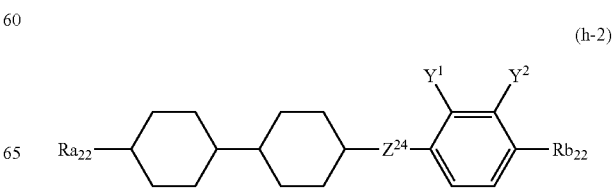

-continued

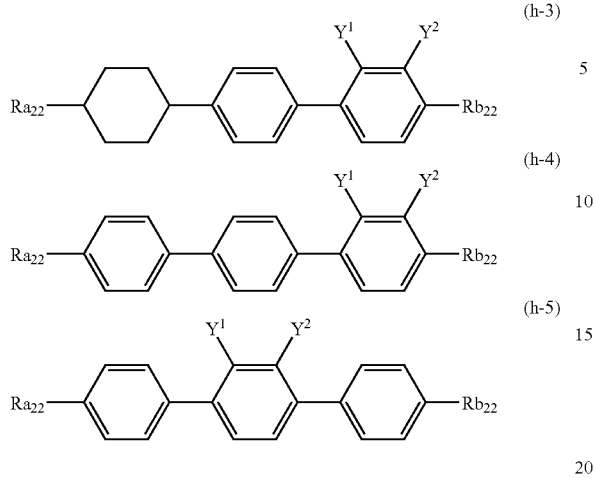

(h-3)

(h-4)

(h-5)

In formulae (h-1) to (h-5), $Ra_{22}$ is linear alkyl having 1 to 8 carbons or linear alkenyl having 2 to 8 carbons, $Rb_{22}$ is linear alkyl having 1 to 8 carbons, linear alkenyl having 2 to 8 carbons or alkoxy having 1 to 7 carbons, and $Z^{24}$ is a single bond or —CH$_2$CH$_2$—.

In formulae (h-1) to (h-5), both $Y^1$ and $Y^2$ are fluorine, or one of $Y^1$ and $Y^2$ is fluorine, and the other is chlorine. For example, a compound having a condensed ring, such as the compounds (g-2) to (g-4), can decrease the threshold voltage of a liquid crystal composition including the compound.

For example, the compounds (h-1) and (h-2) can decrease the threshold voltage of a liquid crystal composition including the compound. The compounds (h-2) and (h-3) can increase the maximum temperature of the nematic phase of a liquid crystal composition including the compound, and can decrease the threshold voltage of the composition.

The compounds (h-4) and (h-5) can increase the maximum temperature of the nematic phase of a liquid crystal composition including the compound, can increase the optical anisotropy of the composition, and can decrease the threshold voltage of the composition.

In the liquid crystal composition (2), particularly, a liquid crystal composition including at least one compound selected from a group of compounds represented by formulae (a-1) to (a-3) and formulae (b-1) to (b-3) as the first component, at least one compound selected from a group of compounds represented by formulae (e-1), (e-2) and (e-3) as the second component, and at least one compound selected from a group of compounds represented by formulae (h-1), (h-2), (h-3), (h-4) and (h-5) as the third component is stable to heat and light, has a wide range of the nematic phase, has a small viscosity, has a negatively large dielectric anisotropy, and has a large specific resistance. The liquid crystal composition is preferred since it is properly balanced among the properties.

Preferred examples of the third component include compounds (3-1) to (3-68) below. In these compounds, $Ra_{22}$ and $Rb_{22}$ have the same meanings as in the compounds (g-1) to (g-5).

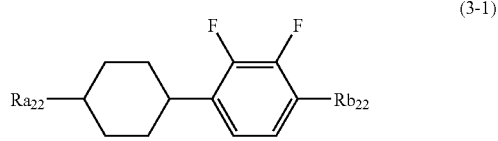

(3-1)

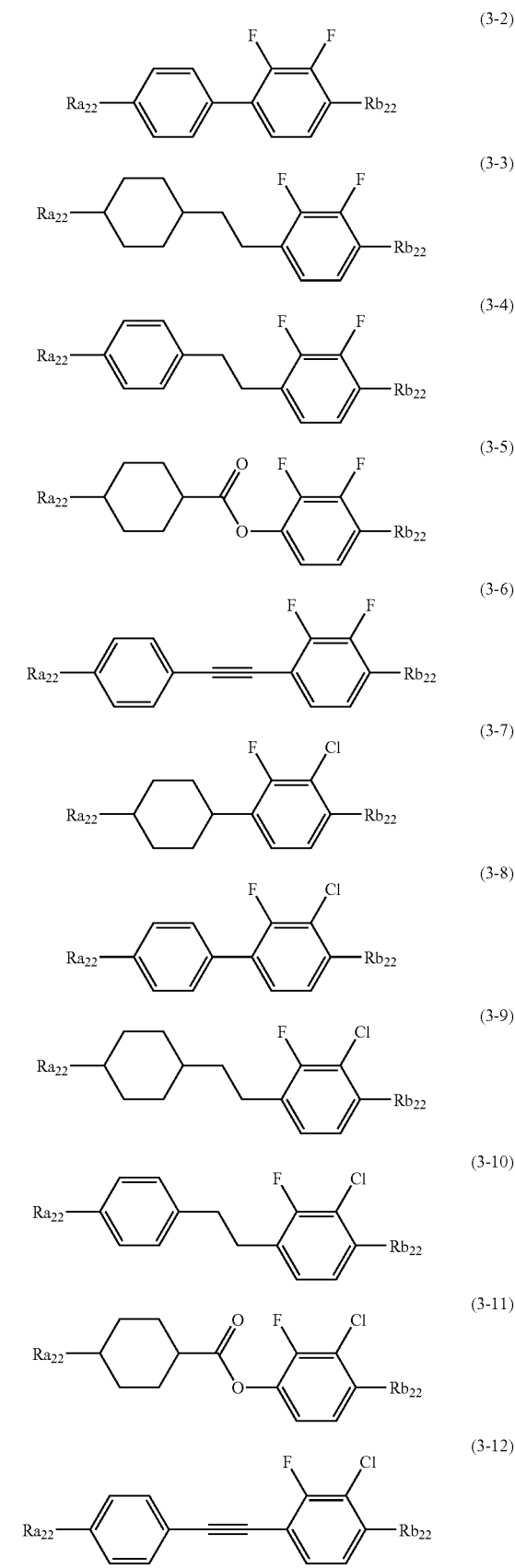

(3-2)

(3-3)

(3-4)

(3-5)

(3-6)

(3-7)

(3-8)

(3-9)

(3-10)

(3-11)

(3-12)

-continued
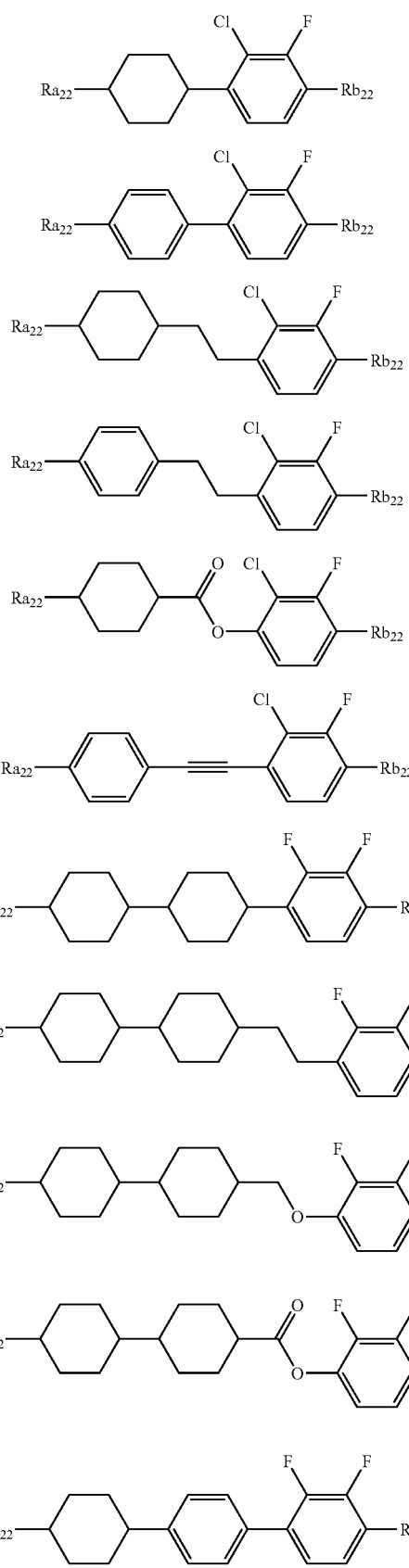
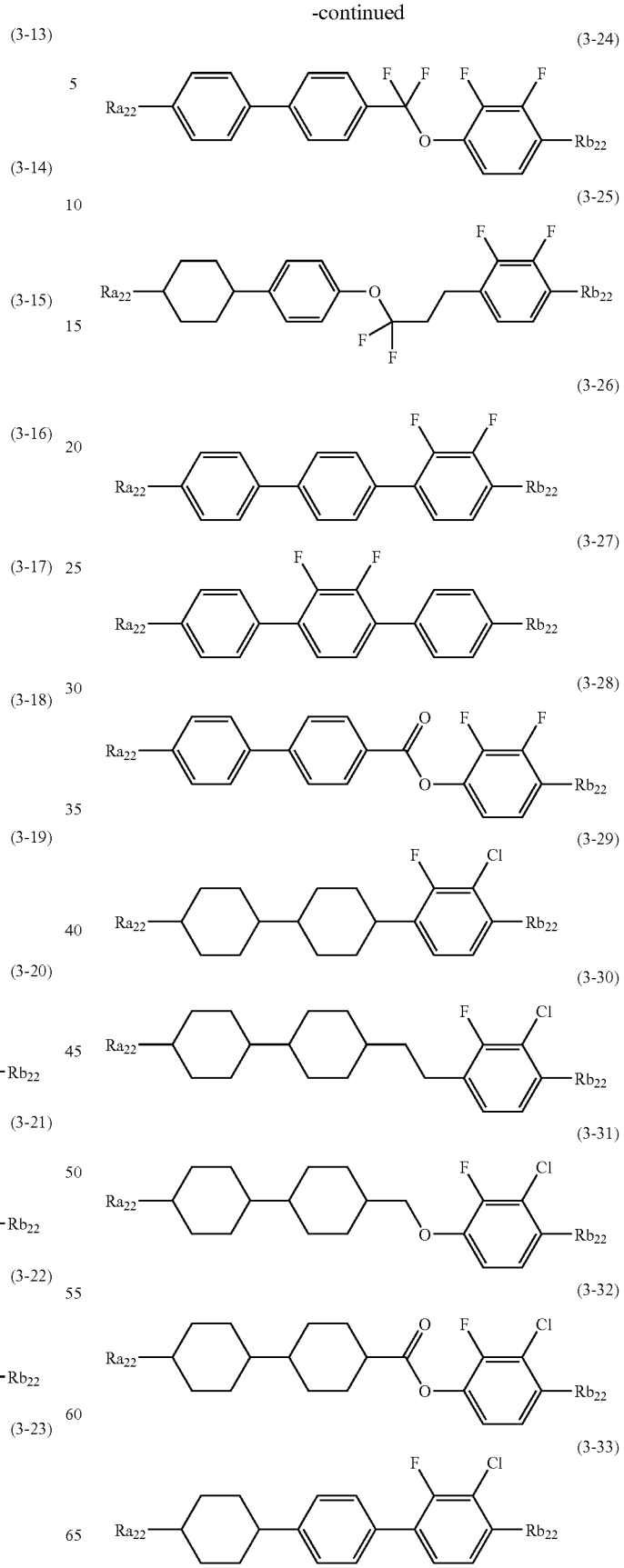

-continued (3-34) (chemical structure)
(3-35) (chemical structure)
(3-36) (chemical structure)
(3-37) (chemical structure)
(3-38) (chemical structure)
(3-39) (chemical structure)
(3-40) (chemical structure)
(3-41) (chemical structure)
(3-42) (chemical structure)
(3-43) (chemical structure)

-continued (3-44) (chemical structure)
(3-45) (chemical structure)
(3-46) (chemical structure)
(3-47) (chemical structure)
(3-48) (chemical structure)
(3-49) (chemical structure)
(3-50) (chemical structure)
(3-51) (chemical structure)
(3-52) (chemical structure)

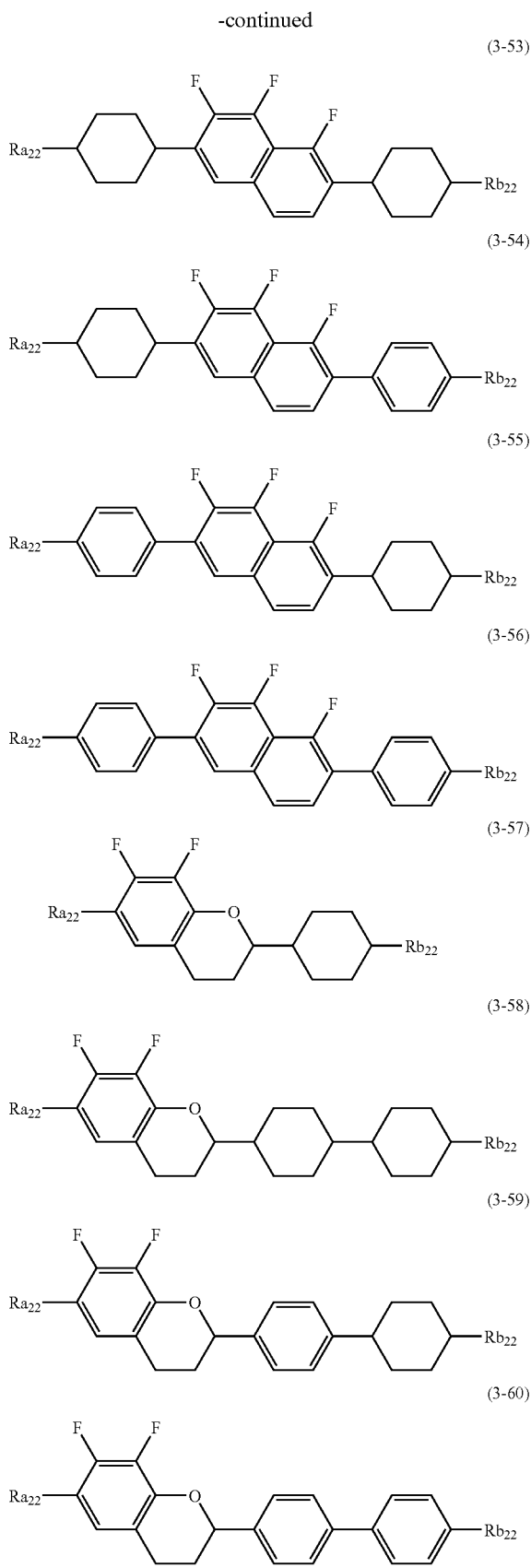
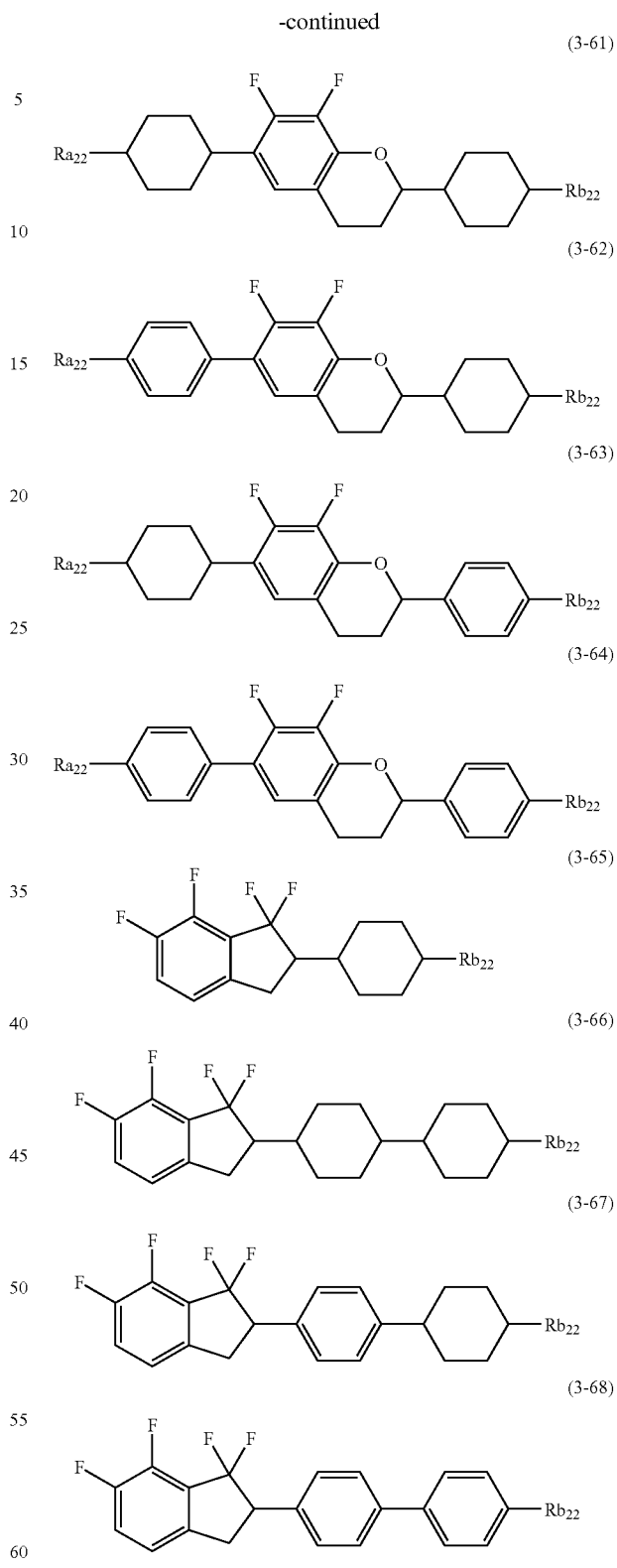
In the liquid crystal composition (2) of the invention, the content of the third component is not particularly limited and is preferably large from the standpoint of preventing the absolute value of the negative dielectric anisotropy from being decreased.

While the contents of the first component, the second component and the third component in the liquid crystal composition (2) are not particularly limited, it is preferred that the content of the liquid crystal compound (a) is in a range of from approximately 10% to approximately 80% by weight, the content of the second component is in a range of from approximately 10% to approximately 80% by weight, and the content of the third component is in a range of from approximately 10% to approximately 80% by weight, based on the total weight of the liquid crystal composition (2), and it is more preferred that the content of the liquid crystal compound (a) is in a range of from approximately 10% to approximately 70% by weight, the content of the second component is in a range of from approximately 10% to approximately 50% by weight, and the content of the third component is in a range of from approximately 20% to approximately 60% by weight, based on the total weight of the liquid crystal composition (2).

In the case where the content of the first component, the second component and the third component in the liquid crystal composition (2) are in the aforementioned ranges, such a liquid crystal composition can be obtained that has a wide temperature range of a nematic phase, has a small viscosity, has a negatively large dielectric anisotropy, has a large specific resistance, and is properly balanced among the properties.

Embodiments of Liquid Crystal Composition

The liquid crystal composition of the invention may include, in addition to the first component and the second and third components optionally added, another liquid crystal compound for the purpose, for example, of further controlling the properties of the liquid crystal composition. The liquid crystal composition of the invention may be used without addition of any other liquid crystal compound than the liquid crystal compounds of the first component and the second and third components optionally added, from the standpoint, for example, of cost.

The liquid crystal composition of the invention may further include an additive, such as an optically active compound, a coloring matter, a defoaming agent, an ultraviolet light absorbent, an antioxidant and so forth.

In the case where an optically active compound is added to the liquid crystal composition of the invention, a helical structure is induced in liquid crystal to provide a twist angle.

In the case where a coloring matter is added to the liquid crystal composition of the invention, the liquid crystal composition can be applied to a liquid crystal display device having a GH (guest host) mode.

In the case where a defoaming agent is added to the liquid crystal composition of the invention, the liquid crystal composition can be prevented from being foamed during transportation of the liquid crystal composition and during process of producing a liquid crystal display device from the liquid crystal composition.

In the case where an ultraviolet light absorbent or an antioxidant is added to the liquid crystal composition of the invention, the liquid crystal composition and a liquid crystal display device including the liquid crystal composition can be prevented from being deteriorated. For example, an antioxidant can suppress the specific resistance from being decreased upon heating the liquid crystal composition, and an ultraviolet light absorbent can suppress the specific resistance from being decreased upon irradiating the liquid crystal composition with light. In the case where an ultraviolet light absorbent and an antioxidant are added to the liquid crystal composition, it is preferred since the problem occurring on heating and the deterioration due to light upon using the liquid crystal display device can be prevented.

Examples of the ultraviolet light absorbent include a benzophenone ultraviolet light absorbent, a benzoate ultraviolet light absorbent and a triazole ultraviolet light absorbent.

Specific examples of the benzophenone ultraviolet light absorbent include 2-hydroxy-4-n-octoxybenzophenone.

Specific examples of the benzoate ultraviolet light absorbent include 2,4-di-t-butylphenyl 3,5-di-t-butyl-4-hydroxybenzoate.

Specific examples of the triazole ultraviolet light absorbent include 2-(2-hydroxy-5-methylphehyl)benzotriazole, 2-(2-hydroxy-3-(3,4,5,6-tetrahydroxyphthalimide-methyl)-5-methylphenyl)benzotriazole and 2-(3-t-butyl-2-hydroxy-5-methylphenyl)-5-chlorobenzotriazole.

Examples of the antioxidant include a phenol antioxidant and an organic sulfur antioxidant. An antioxidant represented by formula (I) below is preferred since it has a high antioxidant activity without changing the properties of the liquid crystal composition.

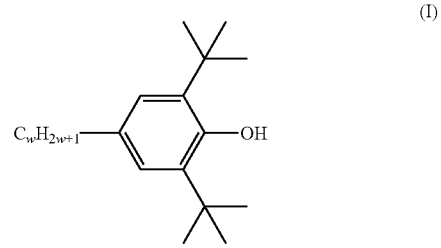

(I)

In formula (I), w is an integer of 1 to 15.

Specific examples of the phenol antioxidant include 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis(6-t-butyl-3-methylphenol), 2,6-di-t-butyl-4-(2-octadecyloxycarbonyl)ethylphenol and pentaerythritol tetrakis (3-(3,5-di-t-butyl-4-hydroxyphenyl)propionate).

Specific examples of the organic sulfur antioxidant include dilauryl 3,3'-thiopropionate, dimyristyl 3,3'-thiopropionate, distearyl 3,3'-thiopropionate, pentaerythritol tetrakis(3-laurylthiopropionate) and 2-mercaptobenzimidazole.

The addition amount of the additive, which is represented by an ultraviolet light absorbent and an antioxidant, may be such an amount that does not impair the advantages of the invention and attains the advantages of addition of the additive.

For example, in the case where the ultraviolet light absorbent or the antioxidant is added, the addition ratio thereof is generally from approximately 10 to approximately 500 ppm, preferably from approximately 30 to approximately 300 ppm, and more preferably from approximately 40 to approximately 200 ppm, based on the total weight of the liquid crystal composition of the invention.

The liquid crystal composition of the invention may include impurities, such as a synthesis raw material, a by-product, a reaction solvent and a synthesis catalyst, which are mixed during the synthesis process of the compounds of the liquid crystal composition and during the preparation process of the liquid crystal composition.

Production Method of Liquid Crystal Composition

The liquid crystal composition of the invention can be produced in the following manner. In the case where compounds as the constitutional components are in a liquid state, the compounds may be mixed and shaken to prepare the composition. In the case where compounds as the constitutional components include solid, the compounds may be mixed and heated to make the solid into a liquid state, followed by shaking, to prepare the composition. The liquid crystal composition of the invention may be produced in any other known methods.

Properties of Liquid Crystal Composition

The liquid crystal composition of the invention can have a maximum temperature of a nematic phase of approximately 70° C. or more and a minimum temperature of a nematic phase of approximately −20° C. or less, and thus has a wide temperature range of a nematic phase. Accordingly, a liquid crystal display device containing the liquid crystal composition can be used in a wide temperature range.

In the liquid crystal composition of the invention, the optical anisotropy can be controlled to a range of approximately 0.08 to approximately 0.14, and further to a range of from approximately 0.05 to approximately 0.18, by appropriately adjusting the formulation and so forth. In the liquid crystal composition of the invention, a liquid crystal composition that generally has a dielectric anisotropy of from approximately −5.0 to approximately −2.0, and preferably from approximately −4.5 to approximately −2.5, can be obtained. A liquid crystal composition within the aforementioned ranges can be preferably used in a liquid crystal display device operated in an IPS mode and a VA mode.

Liquid Crystal Display Device

The liquid crystal composition of the invention can be used not only in a liquid display device operated in an AM mode having an operation mode, such as a PC mode, a TN mode, an STN mode and an OCB mode, but also in a liquid display device operated in a passive matrix (PM) mode having an operation mode, such as a PC mode, a TN mode, an STN mode, an OCB mode, a VA mode and an IPS mode.

The liquid crystal display device of an AM mode and a PM mode can be applied to any liquid crystal display of a reflection type, a transmission type and a semi-transmission type. The liquid crystal display device of the invention can be used as a DS (dynamic scattering) mode device using a liquid crystal composition containing a conductive agent, an NCAP (nematic curvilinear aligned phase) device prepared by microcapsulating the liquid crystal composition, and as a PD (polymer dispersed) device having a three-dimensional network polymer formed in the liquid crystal composition, for example, a PN (polymer network) device.

Among these, the liquid crystal composition of the invention can be preferably used in a liquid crystal display device of an AM mode driven in an operation mode utilizing a liquid crystal composition having a negative dielectric anisotropy, such as a VA mode and an IPS mode, and particularly preferably used in a liquid crystal display device of an AM mode driven in a VA mode, owing to the properties of the composition mentioned above.

In a liquid crystal display device driven in a TN mode, a VA mode and so forth, the direction of the electric field is perpendicular to the liquid crystal layer. In a liquid crystal display device driven in an IPS mode and so forth, the direction of the electric field is in parallel to the liquid crystal layer. A structure of a liquid crystal display device driven in a VA mode is reported in K. Ohmuro, S. Kataoka, T. Sasaki and Y. Koike, SID '97 Digest of Technical Papers, 28, 854 (1997), and a structure of a liquid crystal display device driven in an IPS mode is reported in WO 91/10936 (corresponding to U.S. Pat. No. 5,576,867).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Example of Liquid Crystal Compound (a)

The invention will be described in more detail with reference to examples below, but the invention is not construed as being limited to the examples. All occurrences of "%" are by weight unless otherwise indicated.

The resulting compounds are identified by magnetic nuclear resonance spectra obtained by $^1$H-NMR analysis, gas chromatograms obtained by gas chromatography (GC) analysis, and so forth, as described below.

$^1$H-NMR Analysis

A DRX-500 (produced by Bruker Biospin Co., Ltd.) was used for measurement. A sample produced in the examples and so forth was dissolved in a deuterated solvent capable of dissolving the sample, such as $CDCl_3$, and the measurement was carried out at room temperature and 500 MHz with an accumulated number of 24. In the description of the resulting nuclear resonance spectra, s means a singlet, d means a doublet, t means a triplet, q means a quartet, and m means a multiplet. Tetramethylsilane (TMS) was used as a standard substance indicating zero point of chemical shift 6.

GC Analysis

A Gas Chromatograph Model GC-14B made by Shimadzu was used for measurement. A Capillary column CBP1-M25-025 (length: 25 m, bore: 0.32 mm, film thickness: 0.25 μm, dimethylpolysiloxane as stationary phase, no polarity) produced by Shimadzu Corp. was used as a column. Helium was used as a carrier gas and adjusted to a flow rate of 1 mL/minute. The temperature of a sample vaporizing chamber was 280° C., and the temperature of the detector (FID) was 300° C.

The sample was dissolved in toluene to prepare a 1% by weight solution, and 1 μL of the resulting solution was injected into the sample vaporizing chamber. Chromatopac Model C-R6A, produced by Shimadzu Corp., or an equivalent thereof was used as a recorder. The gas chromatogram obtained showed a retention time of a peak and a peak area corresponding to the component compound.

Solvents for diluting the sample may also be chloroform, hexane, and so forth. The following capillary columns may also be used: a capillary column DB-1, produced by Agilent Technologies Inc. (length: 30 m, bore: 0.32 mm, film thickness: 0.25 μm), a capillary column HP-1, produced by Agilent Technologies Inc. (length: 30 m, bore: 0.32 mm, film thickness: 0.25 μm), a capillary column Rtx-1, produced by Restek Corporation (length: 30 m, bore: 0.32 mm, film thickness: 0.25 μm), and a capillary column BP-1, produced by SGE International Pty. Ltd. (length: 30 m, bore: 0.32 mm, film thickness: 0.25 μm).

An area ratio of each peak in the gas chromatogram corresponds to a ratio of the component compound. In general, the percentages by weight of the component compounds of the analyzed sample are not completely identical to the percentages by area of the peaks of the analyzed sample. According to the invention, however, the percentages by weight of the component compounds of the analyzed sample substantially correspond to the percentages by area of the peaks of the analyzed sample because the correction coefficient is substantially 1 when the aforementioned columns are used in the invention because there is no significant difference in correction efficient of component compounds. In order to obtain accurately compositional ratios of liquid crystal compounds in a liquid crystal composition, an internal reference method in gas chromatogram is used. The liquid crystal compound (sample to be measured) and a liquid crystal compound as a reference (reference substance), which have been weighed accurately to prescribed amounts, are simultaneously measured by gas chromatography, and a relative intensity of an area ratio of a peak of the sample to be measured and a peak of the reference substance is calculated in advance. The compositional ratios of the liquid crystal compounds in the liquid crystal composition can be accurately obtained by correcting by using the relative intensity of the peak areas of the component compounds with respect to the reference substance.

Sample of Liquid Crystal Compound for Measuring Characteristics

A sample of the liquid crystal compound for measuring characteristics includes two cases, i.e., the case where the compound itself is used as a sample, and the case where the compound is mixed with base mixtures to prepare a sample.

In the later case where a sample is prepared by mixing the compound with base mixtures, the measurement is carried out in the following manner. A sample was produced by mixing 15% by weight of the compound and 85% by weight of base mixtures. A value of characteristics of the compound was calculated by extrapolating from a value obtained by measurement. Extrapolated Value=(100×(measured value of sample)−(percentage by weight of base mixtures)×(value measured for base mixtures))/(percentage by weight of liquid crystal compound).

In the case where a smectic phase or crystals were deposited at 25° C. at this ratio of the liquid crystal compound and the base mixtures, the ratio of the compound and the base mixtures was changed step by step in the order of (10% by weight/90% by weight), (5% by weight/95% by weight), (1% by weight/99% by weight), respectively. The value of characteristics of the sample was measured at a ratio where a smectic phase or crystals were not deposited at 25° C., and an extrapolated value was obtained by the aforementioned equation, which was designated as a value of characteristics of the liquid crystal compound.

While there are various kinds of base mixtures for the aforementioned measurement, the compositions of the base mixtures (i-i) and the base mixtures (i-ii) were as follows, for example.

Base mixtures (i-i):

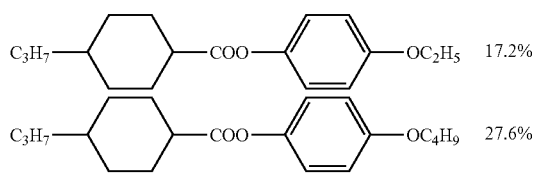

Base mixtures (i-ii):

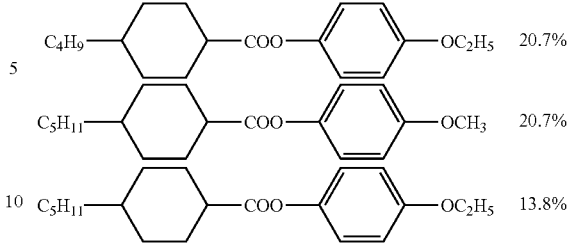

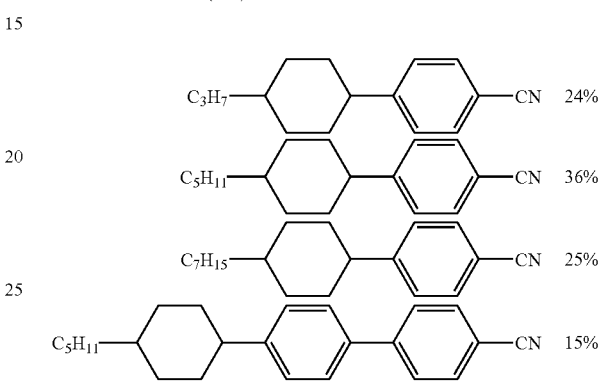

As a sample for measuring a value of characteristics of a liquid crystal composition, the liquid crystal composition itself was used.

Measurement Method of Characteristics of Liquid Crystal Compound

Measurement of the characteristics was carried out according to the following methods. Most methods are described in the Standard of Electric Industries Association of Japan, EIAJ ED-2521A or those with some modifications. A TFT was not attached to a TN device or a VA device used for measurement.

Among the measured values, the values obtained with the liquid crystal compound itself as a sample and the values obtained with the liquid crystal composition itself as a sample were described as experimental data. In the case where the values were obtained with the mixture of the compound with the base mixtures, the extrapolated values were described as experimental data.

Phase Structure and Phase Transition Temperature (° C.): The measurement was carried out in the methods (1) and (2) below.

(1) A compound was placed on a hot plate (Hot Stage Model FP-52, produced by Mettler Co., Ltd.) in a melting point apparatus equipped with a polarizing microscope, and while heating at the rate of 3° C. per minute, the state of the phase and the changes thereof were observed with the polarizing microscope to determine the kind of the phase.

(2) A sample was heated and cooled at a rate of 3° C. per minute by using a scanning calorimeter, DSC-7 System or Diamond DSC System, produced by Perkin-Elmer, Inc., whereby a starting point of an endothermic peak or an exothermic peak associated with phase change of the sample was obtained by extrapolation (on set) to determine phase transition temperature.

In the following description, a crystal is denoted by "C." In the case where a crystal is distinguished into two crystals, they are denoted by "$C_1$" and "$C_2$," respectively. A smectic phase is denoted by "S," and a nematic phase is denoted by "N." A liquid (isotropic phase) is denoted by "I." In the case where a smectic phase is distinguished into a smectic B phase and a smectic A phase, they are denoted by "$S_B$" and "$S_A$," respectively. The expression of the phase transition temperature, "C 50.0 N 100.0 I," for example, means that the transition temperature of from a crystal to a nematic phase (CN) is 50.0° C., and the transition temperature of from a nematic phase to a liquid (N1) is 100.0° C. The other expressions are applied with the same rule.

Maximum Temperature of Nematic Phase ($T_{NI}$; ° C.): A sample (a liquid crystal composition or a mixture of a liquid crystal compound and the base mixtures) was placed on a hot plate (Hot Stage Model FP-52, produced by Mettler Co., Ltd.) in a melting point apparatus equipped with a polarizing microscope, and while heating at the rate of 1° C. per minute, was observed with the polarizing microscope. A temperature where a part of the sample was changed from a nematic phase to an isotropic liquid was designated as a maximum temperature of a nematic phase. The maximum temperature of a nematic phase may be abbreviated to "a maximum temperature" in some cases.

Low Temperature Compatibility: Samples were prepared by mixing the base mixtures and a liquid crystal compound to make a ratio of the liquid crystal compound of 20% by weight, 15% by weight, 10% by weight, 5% by weight, 3% by weight and 1% by weight, respectively, and then placed in glass bottles. The glass bottles were stored in a freezer at −10° C. or −20° C. for a prescribed period of time, and then were observed as to whether or not a crystal or a smectic phase was deposited.

Viscosity (η; measured at 20° C.; mPa·s): The viscosity was measured by means of an E-type viscometer.

Rotation Viscosity (γ1; measured at 25° C.; mPa·s): The rotation viscosity was measured according to the method disclosed in M. Imai, et al., *Molecular Crystals and Liquid Crystals*, vol. 259, 37 (1995). A sample (a liquid crystal composition or a mixture of a liquid crystal compound and the base mixtures) was placed in a VA device having a cell gap between two glass plates of 20 μm. The VA device was impressed with a voltage in a range of from 30 V to 50 V stepwise by 1 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. The rotation viscosity was obtained from the measured values and the calculating equation (8) in the literature by M. Imai, et al., p. 40. As the dielectric anisotropy necessary for the calculation, the value measured by the measuring method of dielectric anisotropy described below.

Optical Anisotropy (refractive index anisotropy; Δn; measured at 25° C.): Measurement was carried out with an Abbe refractometer mounting a polarizing plate on an ocular using light having a wavelength of 589 nm at a temperature of 25° C. The surface of a main prism was rubbed in one direction, and then a sample (a liquid crystal composition or a mixture of a liquid crystal compound and the base mixtures) was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy (Δn) was calculated from the equation: Δn=n∥−n⊥.

Dielectric Anisotropy (Δ∈, measured at 25° C.): The dielectric anisotropy was measured in the following manner. A solution of octadecyltriethoxysilane (0.16 mL) and ethanol (20 mL) was coated on a glass substrate having been well cleaned. The glass substrate was spun with a spinner and then heated to 150° C. for 1 hour. A VA device having a distance (cell gap) of 20 μm was fabricated with two sheets of the glass substrates. A polyimide oriented film was prepared on a glass substrate in the similar manner. The oriented film of the glass substrate was rubbed, and a TN device having a distance between two glass substrates of 9 μm and a twist angle of 80° was fabricated. A sample (a liquid crystal composition or a mixture of a liquid crystal compound and the base mixtures) was put in the VA device, which was then impressed with a voltage of 0.5 V (1 kHz, sine wave) to measure a dielectric constant (∈∥) in the major axis direction of the liquid crystal molecule. A sample (a liquid crystal composition or a mixture of a liquid crystal compound and the base mixtures) was put in the TN device, which was then impressed with a voltage of 0.5 V (1 kHz, sine wave) to measure a dielectric constant (∈⊥) in the minor axis direction of the liquid crystal molecule.

The dielectric anisotropy was calculated from the equation: Δ∈=∈∥−∈⊥.

Ultraviolet Current (Juv: measured at 25° C., μA): Glass substrates having silicon dioxide obliquely deposited thereon were prepared. A sample was put in a cell of the resulting two sheets of the glass substrates having a cell gap of 10 μm to fabricate a TN device. The TN device was irradiated with ultraviolet light of 12 mW/cm² for 20 minutes (the distance between the light source and the irradiated body was 20 cm). The ultraviolet current was measured by impressing rectangular waves of 3 V and 32 Hz. The ultraviolet light irradiation test is an accelerating test used as a test corresponding to a light resistance test of a TN device.

Example 1

Synthesis of 2-chloro-1-ethoxy-3-fluoro-4-(4-penthylcyclohexa-1-enyl)benzene (No. 23)

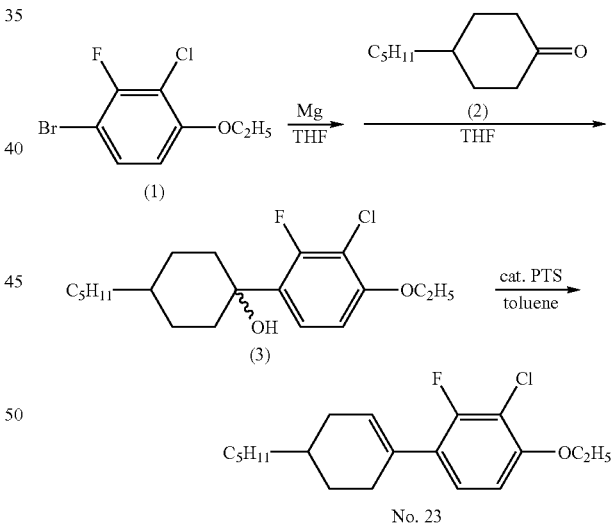

No. 23

First Step 2.9 g of well dried magnesium and 20 mL of THF were placed in a reactor under nitrogen atmosphere, and heated to 43° C. 30.0 g of 1-bromo-3-chloro-4-ethoxy-2-fluoro benzene (1) dissolved in 80 mL of THF was slowly added dropwise thereto at a temperature range of from 38 to 46° C., followed by stirring for 90 minutes. Thereafter, 19.0 g of 4-pentylcyclo hexanone dissolved in 20 mL of THF was slowly added dropwise thereto at a temperature range of from 38 to 44° C., followed by stirring for 60 minutes. After cooling the resulting reaction mixture to 30° C., the reaction mixture was mixed with 100 mL of 3N hydrochloric acid and 100 mL of toluene in a vessel and separated into an organic layer and an aqueous layer by standing still, so as to attain extraction. The resulting organic layer was fractionated and washed with water, a 2N sodium hydroxide aqueous solution, a saturated sodium bicarbonate aqueous solution and water, followed by drying over anhydrous magnesium sulfate. Thereafter, the solvent was removed by distillation under reduced pressure to obtain 39.5 g of 1-(3-chloro-4-ethoxy-2-fluorophenyl)-4-pentylcyclohexanol (3). The resulting compound (3) was a yellow oily matter.

Second Step 39.5 g of the compound (3), 0.4 g of p-toluenesulfonic acid and 120 mL of toluene were mixed, and the mixture was refluxed under heating for 2 hours while water distilled out was removed. After cooling the resulting reaction mixture to 30° C., 200 mL of water and 100 mL of toluene were added to and mixed with the reaction mixture, which was separated into an organic layer and an aqueous layer by standing still, so as to attain extraction to the organic layer. The resulting organic layer was fractionated and washed with a 2N sodium hydroxide aqueous solution, a saturated sodium bicarbonate aqueous solution and water, followed by drying over anhydrous magnesium sulfate. Thereafter, the solvent was removed by distillation under reduced pressure to obtain a residue. The resulting residue was purified by silica gel column chromatography using heptane as eluent, and then further purified by recrystallization from Solmix A-11 (produced by Japan Alcohol Trading Co., Ltd.) to obtain 21.5 g of 2-chloro-1-ethoxy-3-fluoro-4-(4-pentylcyclohexa-1-enyl) benzene (No. 23). The yield based on the compound (2) was 58.7%.

The transition temperature (° C.) of the resulting compound (No. 23) was C 24.8 (N 10.9) I.

The chemical shift δ (ppm) in $^1$H-NMR analysis was as follows, and thus the resulting compound was identified as 2-chloro-1-ethoxy-3-fluoro-4-(4-pentylcyclohexa-1-enyl) benzene. The solvent for measurement was $CDCl_3$. Chemical shift δ (ppm): 7.04 (t, 1H), 6.64 (dd, 1H), 5.85 (t, 1H), 4.09 (q, 2H), 2.43-2.27 (m, 3H), 1.87-1.77 (m, 2H), 1.61-1.55 (m, 1H), 1.46 (t, 3H), 1.37-1.25 (m, 9H), 0.90 (t, 3H).

Example 2

Synthesis of 4-(3-chloro-4-ethoxy-2-fluorophenyl)-trans-4'-propylbicyclohexyl-3-ene (No. 74)

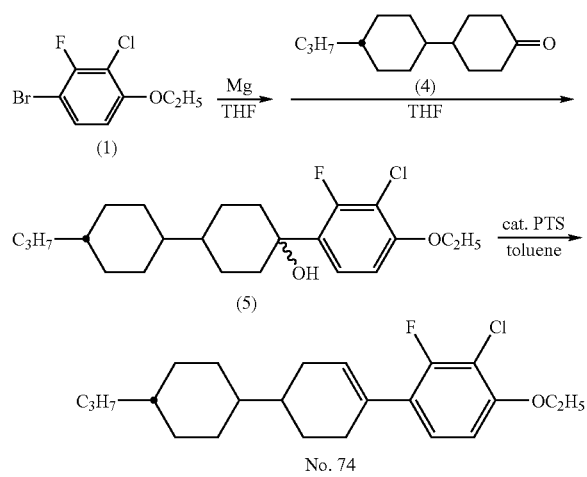

First Step 2.6 g of well dried magnesium and 20 mL of THF were placed in a reactor under nitrogen atmosphere, and heated to 40° C. 26.6 g of the compound (1) dissolved in 80 mL of THF was slowly added dropwise thereto at a temperature range of from 30 to 45° C., followed by stirring for 30 minutes. Thereafter, 22.2 g of 4'-propylbicyclohexyl-4-one (4) dissolved in 40 mL of THF was slowly added dropwise thereto at a temperature range of from 30 to 50° C., followed by stirring for 60 minutes. After cooling the resulting reaction mixture to 25° C., the reaction mixture was mixed with 100 mL of 3N hydrochloric acid and 100 mL of toluene in a vessel and separated into an organic layer and an aqueous layer by standing still, so as to attain extraction. The resulting organic layer was fractionated and washed with water, a 2N sodium hydroxide aqueous solution, a saturated sodium bicarbonate aqueous solution and water, followed by drying over anhydrous magnesium sulfate. Thereafter, the solvent was removed by distillation under reduced pressure to obtain 45.8 g of 4-(3-chloro-4-ethoxy-2-fluorophenyl)-trans-4'-propylbicyclohexyl-4-ol (5). The resulting compound (5) was a yellow solid matter.

Second Step 45.8 g of the compound (5), 0.5 g of p-toluenesulfonic acid and 150 mL of toluene were mixed, and the mixture was refluxed under heating for 1 hour while water distilled out was removed. After cooling the resulting reaction mixture to 25° C., 200 mL of water and 100 mL of toluene were added to and mixed with the reaction mixture, which was separated into an organic layer and an aqueous layer by standing still, so as to attain extraction to the organic layer. The resulting organic layer was fractionated and washed with a 2N sodium hydroxide aqueous solution, a saturated sodium bicarbonate aqueous solution and water, followed by drying over anhydrous magnesium sulfate. Thereafter, the solvent was distilled off under reduced pressure to obtain a residue. The resulting residue was purified by silica gel column chromatography using a mixed solvent of heptane and toluene (heptane/toluene=4/1 by volume) as eluent, and then further purified by recrystallization from a mixed solvent of heptane and ethanol (heptane/ethanol=2/1 by volume) to obtain 28.5 g of 4-(3-chloro-4-ethoxy-2-fluorophenyl)-trans-4'-propylbicyclohexyl-3-ene (No. 74). The yield based on the compound (4) was 68.4%.

The transition temperature (° C.) of the resulting compound (No. 74) was $C_1$ 69.4 $C_2$ 81.8 $C_3$ 89.4 $S_A$ 122.1 N 160.8 I.

The chemical shift δ (ppm) in $^1$H-NMR analysis was as follows, and thus the resulting compound was identified as 4-(3-chloro-4-ethoxy-2-fluorophenyl)-trans-4'-propylbicyclohexyl-3-ene. The solvent for measurement was $CDCl_3$. Chemical shift δ (ppm): 7.04 (t, 1H), 6.64 (dd, 1H), 5.87 (t, 1H), 4.09 (q, 2H), 2.38-2.34 (m, 3H), 1.96-1.74 (m, 6H), 1.47-0.86 (m, 18H).

Example 3

Synthesis of 2-chloro-4-ethoxy-3-fluoro-1-(4-(2-(trans-4-propylcyclohexyl)-2-ethyl)-cyclohexa-1-enyl)benzene (No. 103)

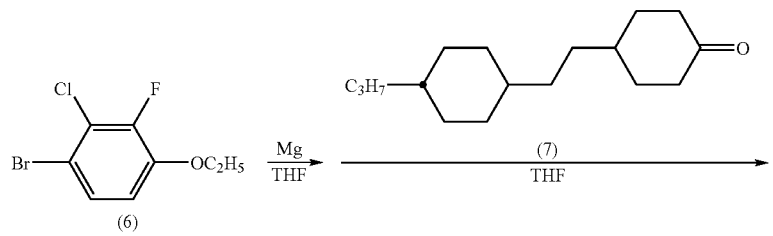

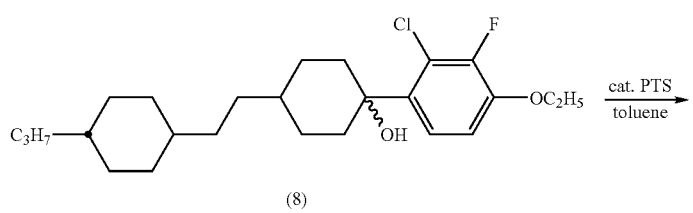

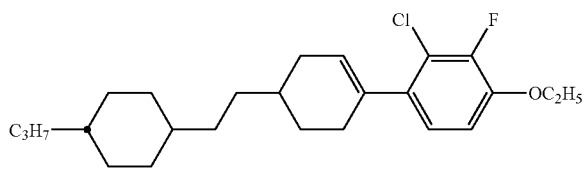

First Step 1.0 g of well dried magnesium and 30 mL of THF were placed in a reactor under nitrogen atmosphere, and heated to 43° C. 10.0 g of 1-bromo-2-chloro-4-ethoxy-3-fluorobenzene (6) dissolved in 20 mL of THF was slowly added dropwise thereto at a temperature range of from 43 to 51° C., followed by stirring for 30 minutes. Thereafter, 21.2 g of 4-(2-(trans-4-propylcyclohexyl)ethyl)cyclohexanone (7) dissolved in 20 mL of THF was slowly added dropwise thereto at a temperature range of from 50 to 55° C., followed by stirring for 30 minutes. After cooling the resulting reaction mixture to 25° C., the reaction mixture was mixed with 100 mL of 3N hydrochloric acid and 100 mL of toluene in a vessel and separated into an organic layer and an aqueous layer by standing still, so as to attain extraction to the organic layer. The resulting organic layer was fractionated and washed with water, a 2N sodium hydroxide aqueous solution, a saturated sodium bicarbonate aqueous solution and water, followed by drying over anhydrous magnesium sulfate. Thereafter, the solvent was removed by distillation under reduced pressure to obtain 16.4 g of 1-(2-chloro-4-ethoxy-3-fluorophenyl)-4-(2-(trans-4-propylcyclohexyl)ethyl)cyclohexanol (8). The resulting compound (8) was a yellow solid matter.

Second Step 16.4 g of the compound (8), 0.2 g of p-toluenesulfonic acid and 80 mL of toluene were mixed, and the mixture was refluxed under heating for 2 hours while water distilled out was removed. After cooling the resulting reaction mixture to 25° C., 200 mL of water and 200 mL of toluene were added to and mixed with the reaction mixture, which was separated into an organic layer and an aqueous layer by standing still, so as to attain extraction to the organic layer. The resulting organic layer was fractionated and washed with a 2N sodium hydroxide aqueous solution, a saturated sodium bicarbonate aqueous solution and water, followed by drying over anhydrous magnesium sulfate. Thereafter, the solvent was distilled off under reduced pressure to obtain a residue. The resulting residue was purified by silica gel column chromatography using a mixed solvent of heptane and toluene (heptane/toluene=4/1 by volume) as eluent, and then further purified by recrystallization from a mixed solvent of heptane and ethanol (heptane/ethanol=2/1 by volume) to obtain 6.2 g of 2-chloro-4-ethoxy-3-fluoro-1-(4-(2-(trans-4-propylcyclohexyl)-2-ethyl)-cyclohexa-1-enyl)benzene (No. 103). The yield based on the compound (7) was 42.4%.

The transition temperature (° C.) of the resulting compound (No. 103) was $C_1$ 58.7 $C_2$ 63.3 N 102.2 I.

The chemical shift δ (ppm) in $^1$H-NMR analysis was as follows, and thus the resulting compound was identified as 2-chloro-4-ethoxy-3-fluoro-1-(4-(2-(trans-4-propylcyclohexyl)-2-ethyl)-cyclohexa-1-enyl)-benzene. The solvent for measurement was $CDCl_3$. Chemical shift δ (ppm): 6.85 (dd, 1H), 6.79 (t, 1H), 5.62 (t, 1H), 4.09 (q, 2H), 2.28-2.17 (m, 3H), 1.73 (m, 6H), 1.44 (t, 3H), 1.32-1.13 (m, 12H), 0.88-0.86 (m, 7H).

Example 4

Synthesis of 4-(3-chloro-2-fluoro-4-methylphenyl)-trans-4"-pentyl-[1,1';4',1"]tercyclohexan-3-ene (No. 177)

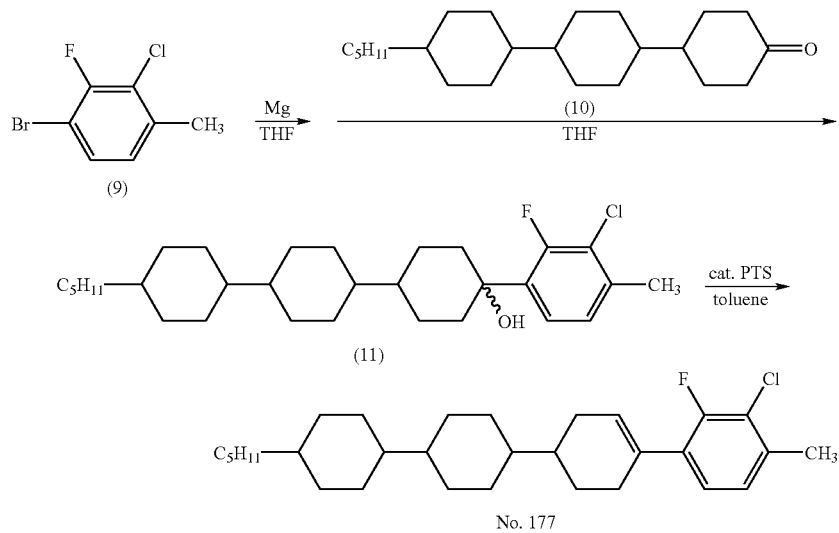

First Step 1.1 g of well dried magnesium and 20 mL of THF were placed in a reactor under nitrogen atmosphere, and heated to 53° C. 9.3 g of 1-bromo-3-chloro-2-fluoro-4-methylbenzene (9) dissolved in 20 mL of THF was added dropwise thereto at a temperature range of from 52 to 62° C. over 60 minutes, followed by stirring for 30 minutes. Thereafter, 10.0 g of trans-4-pentyl-[1,1';4',1"]tercyclohexan-4"-one (10) dissolved in 50 mL of THF was added dropwise thereto at a temperature range of from 53 to 59° C. over 30 minutes, followed by stirring for 30 minutes. After cooling the resulting reaction mixture to 25° C., the reaction mixture was mixed with 100 mL of 3N hydrochloric acid and 200 mL of toluene in a vessel and separated into an organic layer and an aqueous layer by standing still, so as to attain extraction to the organic layer. The resulting organic layer was fractionated and washed with water, a 2N sodium hydroxide aqueous solution, a saturated sodium bicarbonate aqueous solution and water, followed by drying over anhydrous magnesium sulfate. Thereafter, the solvent was removed by distillation under reduced pressure to obtain 20.0 g of 4-(3-chloro-2-fluoro-4-methylphenyl)-trans-4"-pentyl-[1,1';4',1"]tercyclohexan-4-ol (11). The resulting compound (11) was a yellow solid matter.

Second Step 20.0 g of the compound (11), 0.2 g of p-toluenesulfonic acid and 100 mL of toluene were mixed, and the mixture was refluxed under heating for 2 hours while water distilled out was removed. After cooling the resulting reaction mixture to 30° C., 200 mL of water and 100 mL of toluene were added to and mixed with the reaction mixture, which was separated into an organic layer and an aqueous layer by standing still, so as to attain extraction to the organic layer. The resulting organic layer was fractionated and washed with a 2N sodium hydroxide aqueous solution, a saturated sodium bicarbonate aqueous solution and water, followed by drying over anhydrous magnesium sulfate. After filtering off magnesium sulfate, the resulting filtrate was developed by silica gel column chromatography. The resulting eluate was concentrated under reduced pressure, and the resulting residue was purified by recrystallization from a mixed solvent of toluene and ethanol (toluene/ethanol=5/1 by volume) to obtain 9.7 g of 4-(3-chloro-2-fluoro-4-methylphenyl)-trans-4"-pentyl-[1,1';4', 1"]tercyclohexan-3-ene (No. 177). The yield based on the compound (10) was 70.3%.

The transition temperature (IC) of the resulting compound (No. 177) was C 105.4 $S_A$ 252.2 N 268.3 I.

The chemical shift δ (ppm) in $^1$H-NMR analysis was as follows, and thus the resulting compound was identified as 4-(3-chloro-2-fluoro-4-methylphenyl)-trans-4"-pentyl-[1,1'; 4',1"]tercyclohexan-3-ene. The solvent for measurement was CDCl$_3$. Chemical shift δ (ppm): 7.00 (t, 1H), 6.93 (dd, 1H), 5.90 (t, 1H), 2.36-2.31 (m, 5H), 2.23 (dt, 1H), 1.96-1.69 (m, 10H), 1.42-1.201 (m, 8H), 1.16-1.11 (m, 4H), 1.05-0.80 (m, 13H).

Example 5

Synthesis of 3-chloro-4-ethoxy-2-fluoro-4'-(4-propylcyclohexa-1-enyl)biphenyl (No. 130)

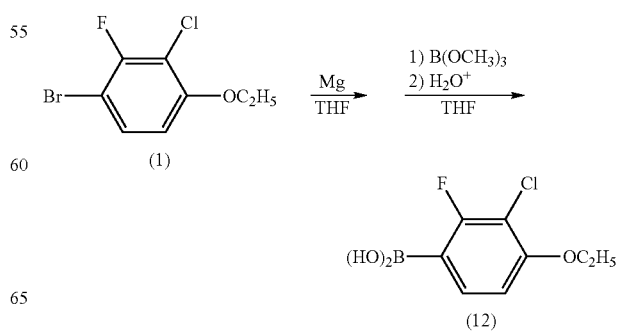

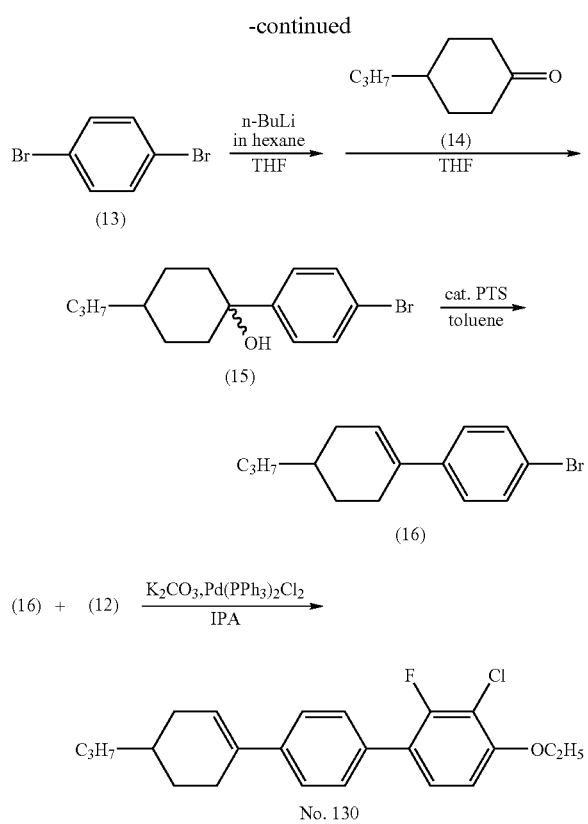

First Step 4.79 g of well dried magnesium and 50 mL of THF were placed in a reactor under nitrogen atmosphere, and heated to 50° C. 50.0 g of the compound (1) dissolved in 200 mL of THF was added dropwise thereto at a temperature range of from 43 to 48° C. over 60 minutes, followed by stirring for 60 minutes. The reaction mixture was cooled to 25° C. Thereafter, the resulting reaction mixture was added dropwise to a solution of 24.6 g of trimethyl borate and 100 mL of THF having been cooled to −50° C. in a nitrogen atmosphere at a temperature range of from −60 to −40° C. over 60 minutes. The reaction mixture was warmed to 0° C. and then put in 400 mL of 3N hydrochloric acid at 0° C. 700 mL of ethyl acetate was added to and mixed with the resulting solution, and separated into an organic layer and an aqueous layer by standing still, so as to attain extraction to the organic layer. The resulting organic layer was fractionated and washed with a saturated sodium bicarbonate aqueous solution and water, followed by drying over anhydrous magnesium sulfate. Thereafter, the solvent was removed by distillation under reduced pressure to obtain a residue. The residue was recrystallized from heptane. The recrystallization operation was again repeated to obtain 35.9 g of 3-chloro-4-ethoxy-2-fluorophenylboronic acid (12). The resulting compound (12) was a pale yellow solid matter.

Second Step 37.7 g of 1,4-dibromobenzene (13) and 300 mL of THF were placed in a reactor under nitrogen atmosphere and stirred at −69° C. 100 mL of a 1.6M n-BuLi hexane solution was added dropwise thereto at a temperature range of from −69 to −62° C. over 1 hour, and then further stirred at −70° C. for 1 hour. 22.4 g of 4-propylcyclohexanone (14) dissolved in 20 mL of THF was slowly added dropwise to the reaction solution at a temperature range of from −70 to −60° C. After gradually warming the reaction solution to 0° C., the reaction solution was slowly poured into 1,000 mL of water and extracted with 500 mL of toluene. The resulting organic layer was washed with 1N hydrochloric acid, a saturated sodium bicarbonate aqueous solution and water, followed by drying over anhydrous magnesium sulfate. Thereafter, the solvent was removed by distillation under reduced pressure to obtain 50.1 g of 1-(4-bromophenyl)-4-propylcyclohexanol (15). The resulting compound (15) was a yellow oily matter.

Third Step 50.1 g of the compound (15), 0.5 g of p-toluenesulfonic acid and 200 mL of toluene were mixed, and the mixture was refluxed under heating for 3 hours while water distilled out was removed. After cooling the resulting reaction mixture to 30° C., 200 mL of water and 100 mL of toluene were added to and mixed with the reaction mixture, which was separated into an organic layer and an aqueous layer by standing still, so as to attain extraction to the organic layer. The resulting organic layer was fractionated and washed with a 2N sodium hydroxide aqueous solution, a saturated sodium bicarbonate aqueous solution and water, followed by drying over anhydrous magnesium sulfate. Thereafter, the solvent was removed by distillation under reduced pressure to obtain a residue. The resulting residue was purified by silica gel column chromatography using heptane as eluent, and then further purified by recrystallization from Solmix A-11 to obtain 27.2 g of 1-bromo-4-(4-propylcyclohexa-1-enyl)benzene (16).

Fourth Step 6.0 g of the compound (16), 5.5 g of the compound (12), 5.9 g of potassium carbonate and 0.13 g of Pd(PPh$_3$)$_2$Cl$_2$ were added to a reactor having 60 mL of IPA placed therein under nitrogen atmosphere. The mixture was stirred under refluxing and heating for 3 hours. After cooling the reaction mixture to 25° C., 200 mL of toluene and 200 mL of water were added thereto, and the resulting toluene solution was washed with a 2N sodium hydroxide aqueous solution, a saturated sodium bicarbonate aqueous solution and water. Thereafter, the solvent was removed by distillation to obtain a residue. The resulting residue was purified by recrystallization from a mixed solvent of toluene and ethyl acetate (toluene/ethyl acetate=1/1 by volume). The resulting crystals were purified by silica gel column chromatography using toluene as eluent, and then further purified by recrystallization from a mixed solvent of heptane and ethanol (heptane/ethanol=5/1 by volume) to obtain 5.9 g of 3-chloro-4-ethoxy-2-fluoro-4'-(4-propylcyclohexa-1-enyl)biphenyl (No. 130). The resulting compound (No. 130) was colorless crystals. The yield based on the compound (13) was 45.0%.

The transition temperature (° C.) of the resulting compound (No. 130) was C 100.1 N 162.2 I.

The chemical shift δ (ppm) in $^1$H-NMR analysis was as follows, and thus the resulting compound was identified as 3-chloro-4-ethoxy-2-fluoro-4'-(4-propylcyclohexa-1-enyl) biphenyl. The solvent for measurement was CDCl$_3$. Chemical shift δ (ppm): 7.44 (s, 4H), 7.25 (t, 1H), 6.77 (dd, 1H), 6.17 (m, 1H), 4.14 (q, 2H), 2.47 (m, 2H), 2.33 (dt, 1H), 1.92 (m, 1H), 1.87-1.81 (m, 1H), 1.59 (m, 1H), 1.49 (t, 3H), 1.43-1.27 (m, 5H), 0.93 (t, 3H).

Example 6

Synthesis of 2-chloro-1-ethoxy-3-fluoro-4-(4-vinyl-cyclohexa-1-enyl)benzene (No. 286)

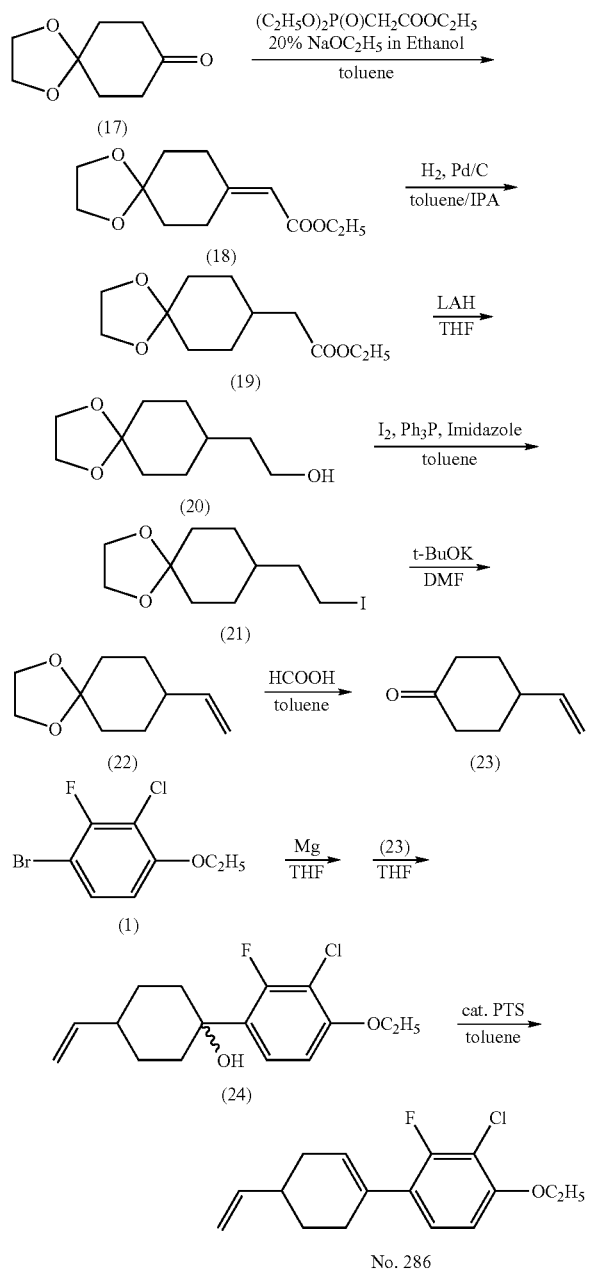

First Step 200.0 g of 1,4-dioxaspiro[4,5]decan-8-one (17), 301.4 g of ethyl diethylphosphonoacetate and 1,000 mL of toluene were added to a reactor under nitrogen atmosphere, and stirred at 5° C. under cooling with ice. 457.5 g of a 20% sodium ethoxide ethanol solution was added dropwise thereto at a temperature range of from 5 to 11° C. over 2 hours, followed by further stirring at 10° C. for 3 hours. Thereafter, the reaction mixture was poured into and mixed with 2,000 mL of water at 0° C. The mixture was separated into an organic layer and an aqueous layer by standing still, so as to attain extraction to the organic layer. The resulting organic layer was fractionated and washed with water, followed by drying over anhydrous magnesium sulfate. Thereafter, the solvent was removed by distillation under reduced pressure to obtain a residue. The resulting residue was purified by silica gel column chromatography using heptane as eluent, and the solvent was distilled off under reduced pressure to obtain 267.3 g of (1,4-dioxaspiro[4,5]deca-8-ylidene)acetic acid ethyl ester (18) as a pale yellow liquid.

Second Step 267.3 g of the compound (18), 5.0 g of Pd/C, 500 mL of isopropyl alcohol (IPA) and 500 mL of toluene were added to a reactor, and stirred under hydrogen atmosphere for 24 hours. After confirming that the reaction had been completed by GC analysis, Pd/C was filtered off, and the solvent was removed by distillation under reduced pressure to obtain a residue. The resulting residue was purified by silica gel column chromatography using heptane as eluent, and the solvent was distilled off under reduced pressure to obtain 255.2 g of (1,4-dioxaspiro[4,5]deca-8-yl)acetic acid ethyl ester (19) as a colorless liquid.

Third Step 20.0 g of lithium aluminum hydride (LAH) and 800 mL of THF were added to a reactor under nitrogen atmosphere, and stirred at 3° C. under cooling with ice. 190.0 g of the compound (19) dissolved in 200 mL of THF was added dropwise thereto at a temperature range of from 0 to 7° C. over 2 hours, followed by further stirring at 0° C. for 3 hours. After confirming that the reaction had been completed by GC analysis, a mixture of 60 mL of THF and 60 mL of acetone was added dropwise thereto at 0° C. over 30 minutes, and 100 mL of a 2N sodium hydroxide aqueous solution was further added dropwise thereto at 10° C. over 30 minutes. A white solid matter thus deposited was filtered off, and 300 mL of toluene and 1,000 mL of brine were added to and mixed with the filtrate. The mixture was separated into an organic layer and an aqueous layer by standing still, so as to attain extraction to the organic layer. The resulting organic layer was fractionated and washed with a saline solution, followed by drying over anhydrous magnesium sulfate. Thereafter, the solvent was removed by distillation under reduced pressure to obtain 152.7 g of 2-(1,4-dioxaspiro[4,5]deca-8-yl)ethanol (20) as a colorless liquid.

Fourth Step 150.0 g of the compound (20), 274.3 g of triphenylphosphine (Ph₃P), 71.3 g of imidazole and 900 mL of toluene were added to a reactor under nitrogen atmosphere, and stirred at 3° C. under cooling with ice. 255.5 g of iodine was added thereto by dividing into 10 portions at a temperature range of from 3 to 10° C. over 2 hours, followed by further stirring at 0° C. for 3 hours. After confirming that the reaction had been completed by GC analysis, a reddish brown solid matter thus deposited was filtered off, and the filtrate was concentrated. 400 mL of heptane was added to the resulting residue, a pale yellow solid matter thus deposited was filtered off, and the filtrate was concentrated to obtain a residue. The residue was purified by silica gel column chromatography using toluene as eluent, and the solvent was removed by distillation under reduced pressure to obtain 223.9 g of 8-(2-iodoethyl)-1,4-dioxaspiro[4,5]decane (21) as a colorless transparent liquid.

Fifth Step 233.0 g of the compound (21) and 800 mL of DMF were added to a reactor under nitrogen atmosphere, and stirred at 3° C. under cooling with ice. 92.9 g of potassium t-butoxide (t-BuOK) was added thereto by dividing into 10 portions at a temperature range of from 3 to 10° C. over 2 hours, followed by further stirring at 0° C. for 3 hours. After confirming that the reaction had been completed by GC analysis, the reaction mixture was poured into and mixed with a mixture of 1,500 mL of heptane and 1,500 mL of water at 0° C. The mixture was separated into an organic layer and an aqueous layer by standing still, so as to attain extraction to the organic layer. The resulting organic layer was fractionated and washed with water, followed by drying over anhydrous magnesium sulfate. The resulting organic layer was purified by silica gel column chromatography using heptane as eluent, and the solvent was removed by distillation under reduced pressure. The resulting residue was distilled under reduced pressure to obtain 103.3 g of 8-vinyl-1,4-dioxaspiro[4,5]decane (22) as a colorless transparent liquid.

Sixth Step 103.3 g of the compound (22), 86.5 g of 98% formic acid and 200 mL of toluene were added to a reactor under nitrogen atmosphere, and stirred under refluxing and heating for 2 hours. After confirming that the reaction had been completed by GC analysis, the reaction mixture was poured into and mixed with 500 mL of brine at 0° C. The mixture was separated into an organic layer and an aqueous layer by standing still, so as to attain extraction to the organic layer. The resulting organic layer was fractionated and washed with brine, followed by drying over anhydrous magnesium sulfate, and the solvent was removed by distillation under reduced pressure. The resulting residue was distilled under reduced pressure to obtain 66.7 g of 4-vinylcyclohexanone (23) as a colorless transparent liquid.

Seventh Step 1.5 g of well dried magnesium and 30 mL of THF were placed in a reactor under nitrogen atmosphere, and heated to 40° C. 15.3 g of the compound (1) dissolved in 30 mL of THF was slowly added dropwise thereto at a temperature range of from 35 to 49° C., followed by stirring for 30 minutes. Thereafter, 5.0 g of the compound (23) dissolved in 5 mL of THF was slowly added dropwise thereto at a temperature range of from 30 to 40° C., followed by stirring for 30 minutes. After cooling the resulting reaction mixture to 25° C., the reaction mixture was poured into and mixed with a mixture of 100 mL of 1N hydrochloric acid and 100 mL of toluene. The mixture was separated into an organic layer and an aqueous layer by standing still, so as to attain extraction to the organic layer. The resulting organic layer was fractionated and washed with water, a 2N sodium hydroxide aqueous solution, a saturated sodium bicarbonate aqueous solution and water, followed by drying over anhydrous magnesium sulfate. Thereafter, the solvent was removed by distillation under reduced pressure to obtain 16.0 g of 1-(3-chloro-4-ethoxy-2-fluorophenyl)-4-vinylcyclohexanol (24) as a yellow liquid.

Eighth Step 16.0 g of the compound (24), 0.3 g of p-toluenesulfonic acid and 80 mL of toluene were mixed, and the mixture was refluxed under heating for 1 hour while water distilled out was removed. After cooling the resulting reaction mixture to 25° C., 100 mL of water and 100 mL of toluene were added to and mixed with the reaction mixture. Thereafter, the mixture was separated into an organic layer and an aqueous layer by standing still, so as to attain extraction to the organic layer. The resulting organic layer was fractionated and washed with a 2N sodium hydroxide aqueous solution, a saturated sodium bicarbonate aqueous solution and water, followed by drying over anhydrous magnesium sulfate. Thereafter, the solvent was removed by distillation under reduced pressure to obtain a residue. The resulting residue was purified by silica gel column chromatography using a mixed solvent of heptane and toluene (heptane/toluene=2/1 by volume) as eluent, and then further purified by recrystallization from ethanol to obtain 5.11 g of 2-chloro-1-ethoxy-3-fluoro-4-(4-vinylcyclohexa-1-enyl)benzene (No. 286) in white color. The yield based on the compound (23) was 45.2%.

The transition temperature (° C.) of the resulting compound (No. 286) was $C_1$ 14.5 $C_2$ 29.4 I.

The chemical shift δ (ppm) in $^1$H-NMR analysis was as follows, and thus the resulting compound was identified as 2-chloro-1-ethoxy-3-fluoro-4-(4-vinylcyclohexa-1-enyl) benzene. The solvent for measurement was $CDCl_3$. Chemical shift δ (ppm): 7.04 (t, 1H), 6.64 (dd, 1H), 5.90-5.83 (m, 2H), 5.05 (dt, 1H), 4.97 (dt, 1H), 4.10 (q, 2H), 2.48-2.27 (m, 4H), 2.06-2.00 (m, 1H), 1.93-1.88 (m, 1H), 1.56-1.49 (m, 1H), 1.42 (t, 3H).

Example 7

Compounds (No. 1) to (No. 476) can be synthesized in the similar method as the synthesis methods described in Examples 1 to 6. The compounds disclosed below include the compounds obtained in Examples 1 to 6. The data attached to the compounds are those measured in the methods described above. The values of transition temperature are values obtained by measuring the compounds themselves, and the values of maximum temperature ($T_{NI}$), dielectric anisotropy (Δ∈) and optical anisotropy (Δn) are extrapolated values obtained by converting measured values of samples mixed with the base mixtures (i-i) according to the aforementioned extrapolation method.

| No. |   |
|-----|---|
| 1   | 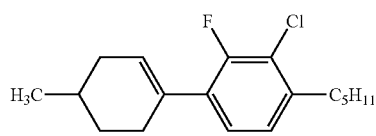 |
| 2   | 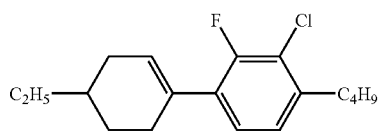 |

| No. | |
|---|---|
| 3 | 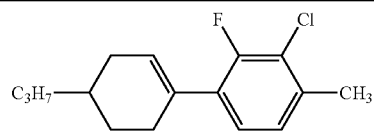 |
| 4 | 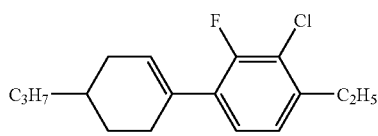 |
| 5 | 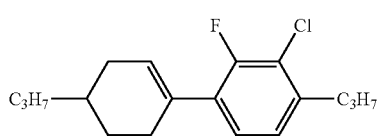 |
| 6 | 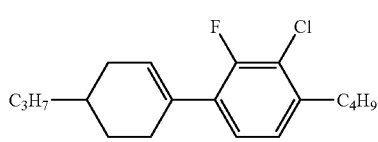 |
| 7 | 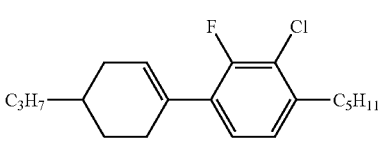 |
| 8 | 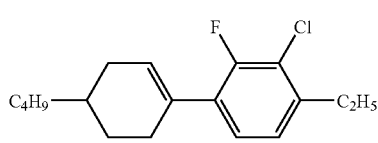 |
| 9 | 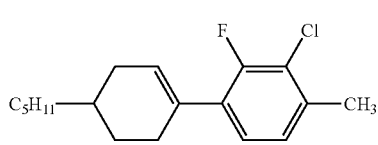 |
| 10 | 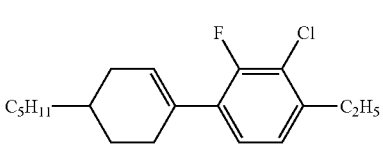 |
| 11 | 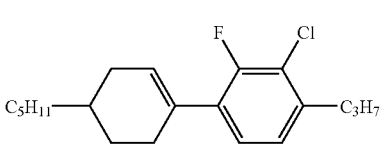 |
| 12 | 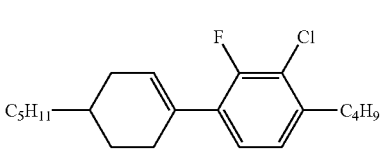 |
| 13 | 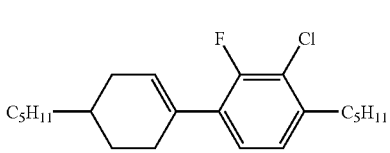 |

-continued
| No. | |
|---|---|
| 14 | 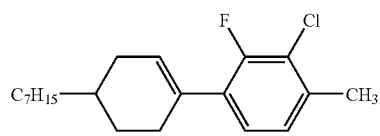 |
| 15 | 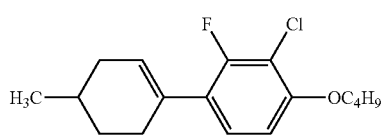 |
| 16 | 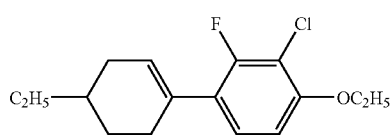 |
| 17 | 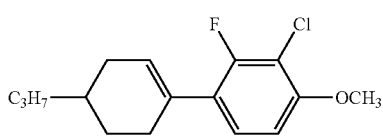 |
| | C 63.4 I  $T_{NI}$: −34.1° C.  Δε: −5.8  Δn: 0.065 |
| 18 | 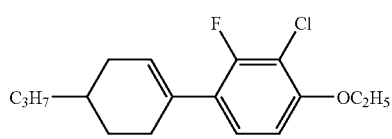 |
| | C 46.5 I  $T_{NI}$: −1.4° C.  Δε: −5.3  Δn: 0.087 |
| 19 | 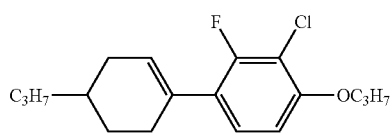 |
| 20 | 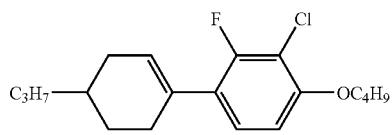 |
| 21 | 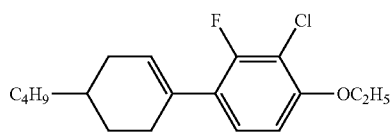 |
| 22 | 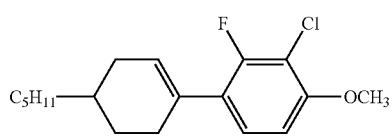 |
| 23 | 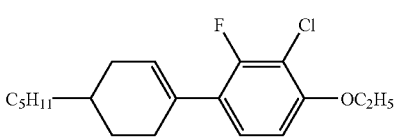 |
| | C 24.8 (N 10.94) I  $T_{NI}$: 10.6° C.  Δε: −5.4  Δn: 0.079 |

-continued
| No. | |
|---|---|
| 24 | 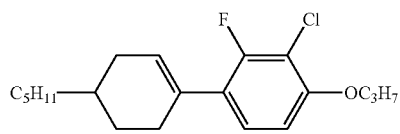 |
| 25 | 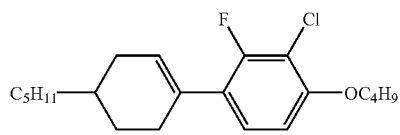 |
| 26 | 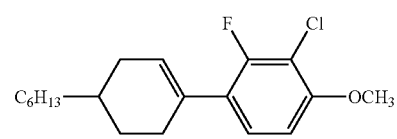 |
| 27 | 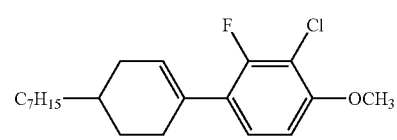 |
| 28 | 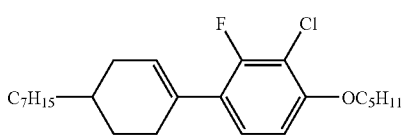 |
| 29 | 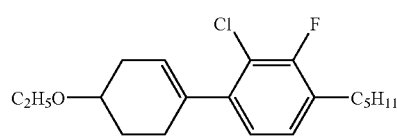 |
| 30 | 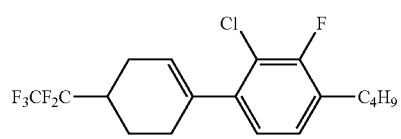 |
| 31 | 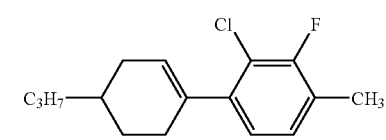 |
| 32 | 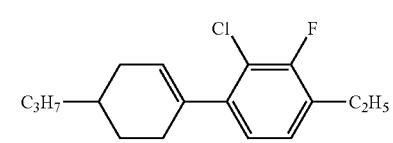 |
| 33 | 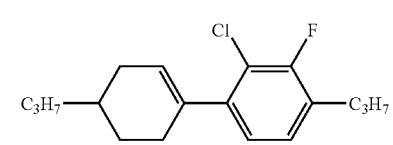 |
| 34 | 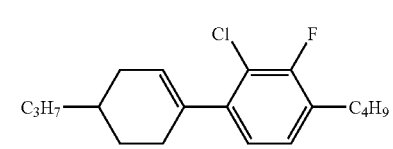 |

| No. | |
|---|---|
| 35 | 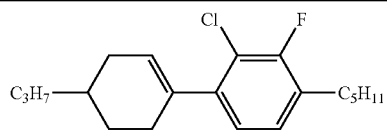 |
| 36 | 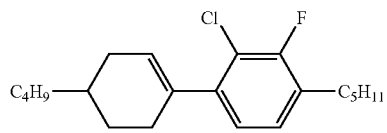 |
| 37 | 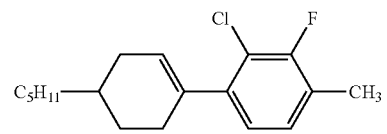 |
| 38 | 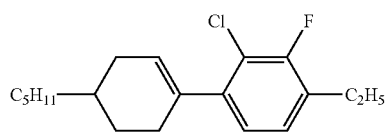 |
| 39 | 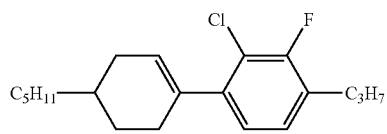 |
| 40 | 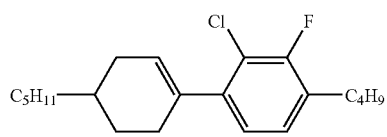 |
| 41 | 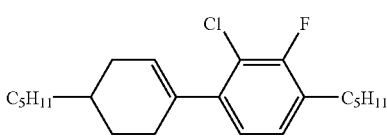 |
| 42 | 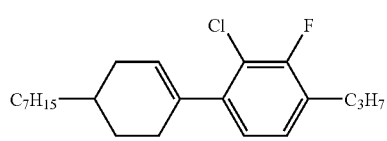 |
| 43 | 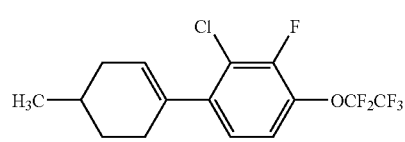 |
| 44 | 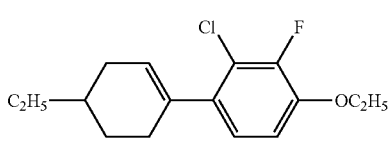 |
| 45 | 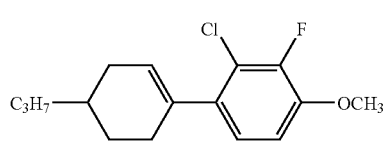 |

-continued
| No. | |
|---|---|
| 46 | 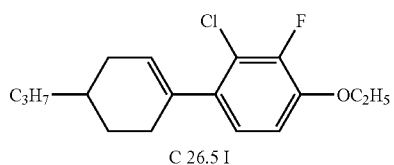 C 26.5 I |
| 47 | 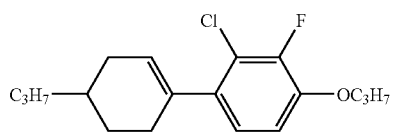 |
| 48 | 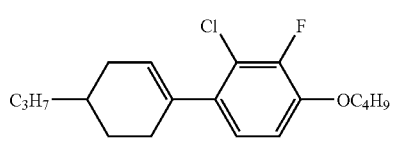 |
| 49 | 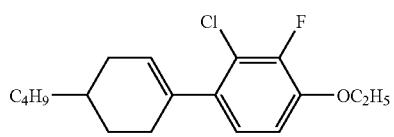 |
| 50 | 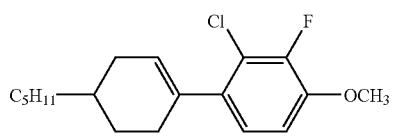 |
| 51 | 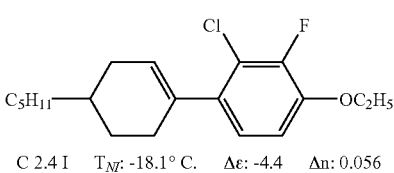 C 2.4 I  $T_{NI}$: −18.1° C.  $\Delta\varepsilon$: −4.4  $\Delta n$: 0.056 |
| 52 | 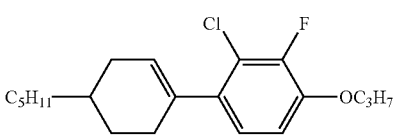 |
| 53 | 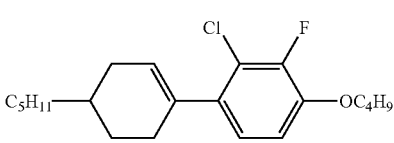 |
| 54 | 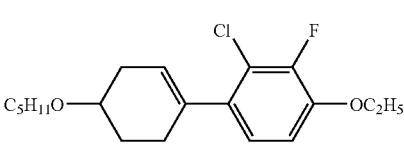 |
| 55 | 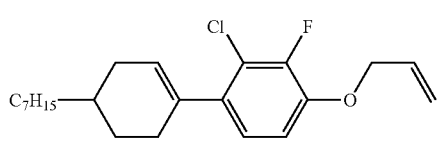 |

-continued
| No. | |
|---|---|
| 56 | 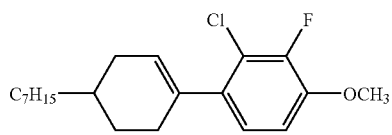 |
| 57 | 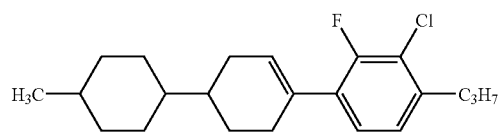 |
| 58 | 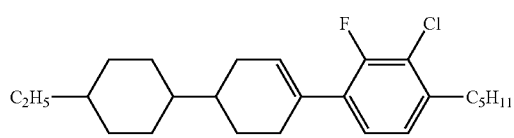 |
| 59 | 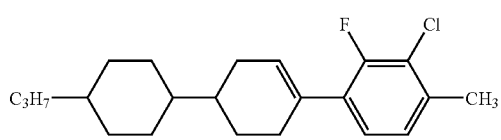 |
| 60 | 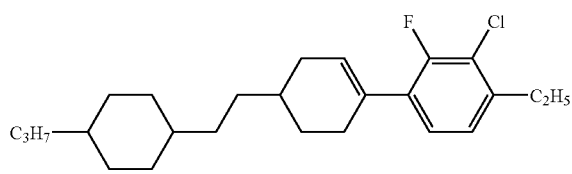 |
| 61 | 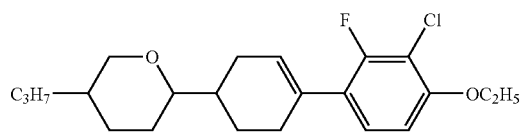 |
| 62 | 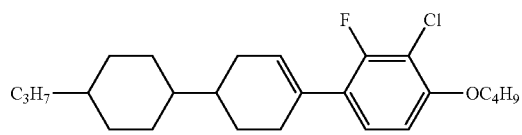 |
| 63 | 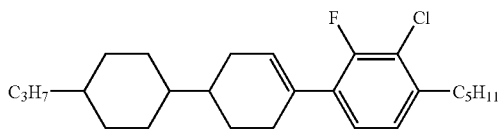 |
| 64 | 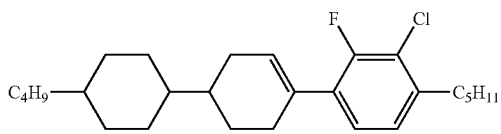 |
| 65 | 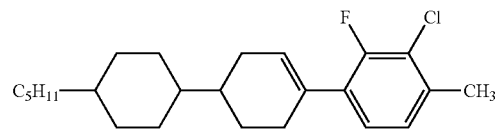 |
| 66 | 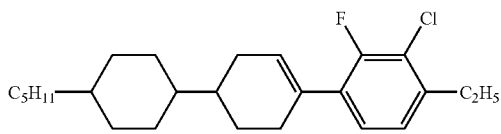 |

| No. | |
|---|---|
| 67 | 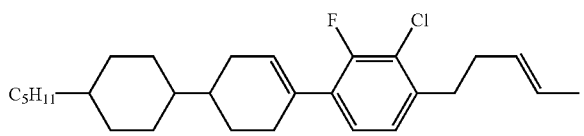 |
| 68 | 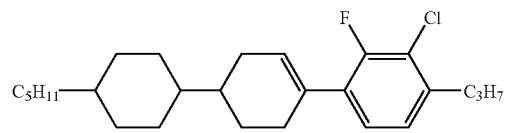 |
| 69 | 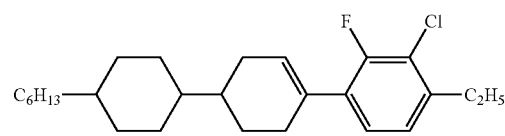 |
| 70 | 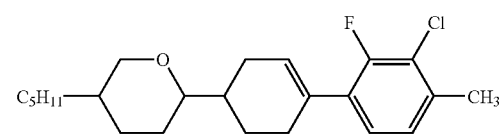 |
| 71 | 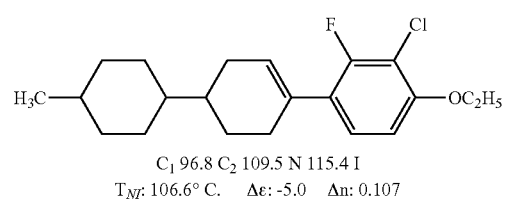<br>$C_1$ 96.8 $C_2$ 109.5 N 115.4 I<br>$T_{NI}$: 106.6° C.  $\Delta\varepsilon$: -5.0  $\Delta n$: 0.107 |
| 72 | 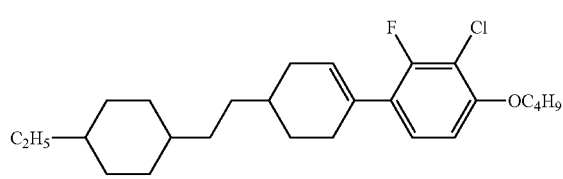 |
| 73 | 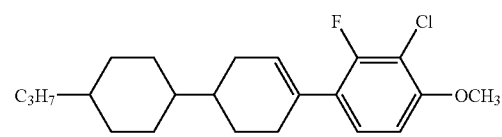 |
| 74 | 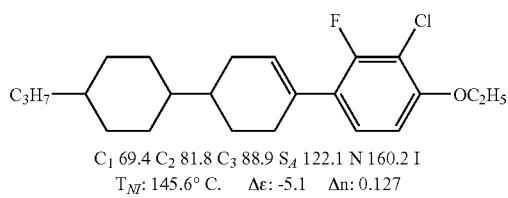<br>$C_1$ 69.4 $C_2$ 81.8 $C_3$ 88.9 $S_4$ 122.1 N 160.2 I<br>$T_{NI}$: 145.6° C.  $\Delta\varepsilon$: -5.1  $\Delta n$: 0.127 |
| 75 | 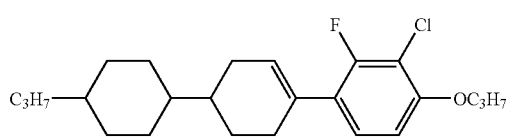 |

| No. | |
|---|---|
| 76 | 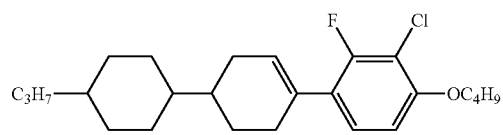 |
| 77 | 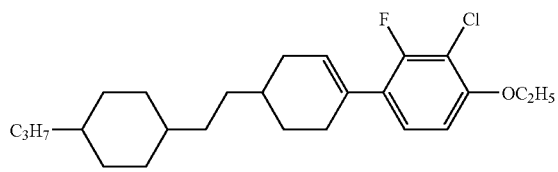 |
| 78 | 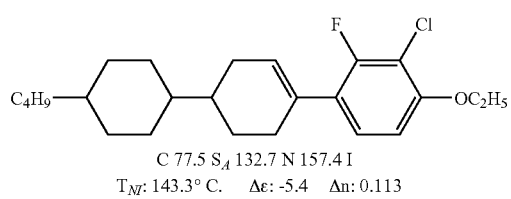<br>C 77.5 S$_A$ 132.7 N 157.4 I<br>T$_{NI}$: 143.3° C.   Δε: -5.4   Δn: 0.113 |
| 79 | 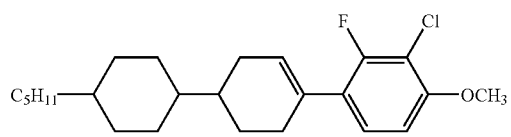 |
| 80 | 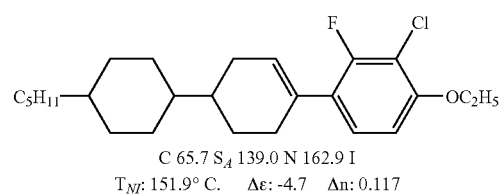<br>C 65.7 S$_A$ 139.0 N 162.9 I<br>T$_{NI}$: 151.9° C.   Δε: -4.7   Δn: 0.117 |
| 81 | 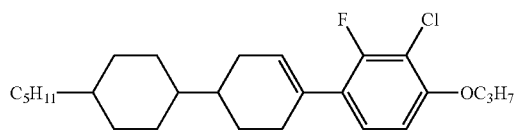 |
| 82 | 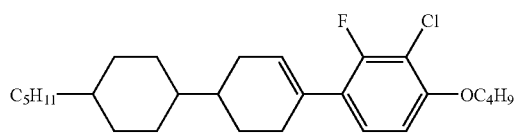 |
| 83 | 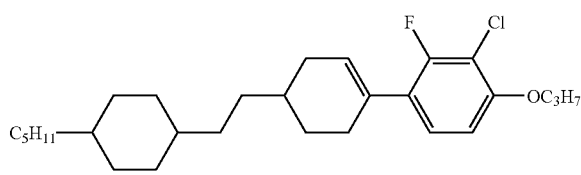 |
| 84 | 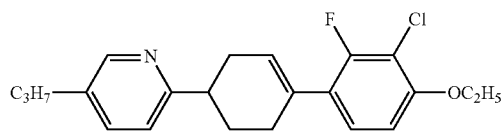 |

-continued
| No. | |
|---|---|
| 85 | 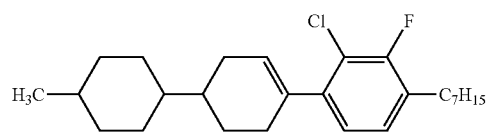 |
| 86 | 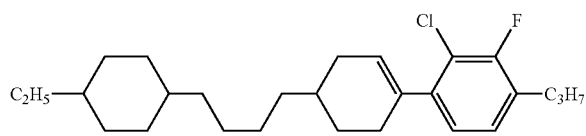 |
| 87 | 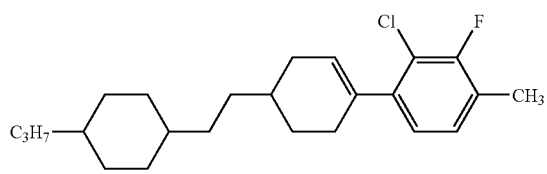 |
| 88 | 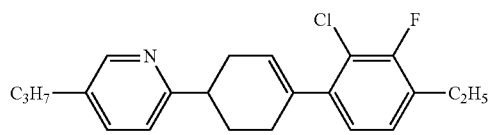 |
| 89 | 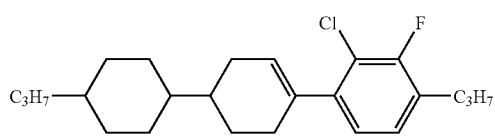 |
| 90 | 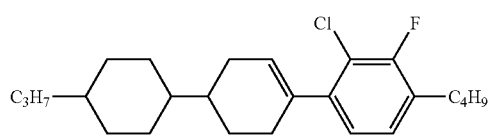 |
| 91 | 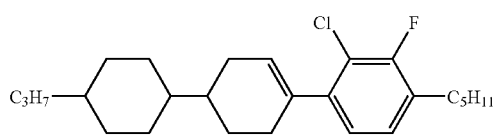 |
| 92 | 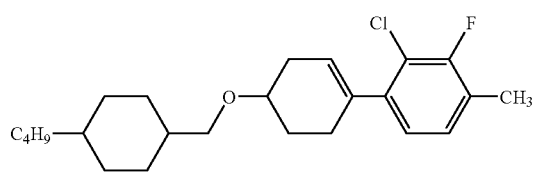 |
| 93 | 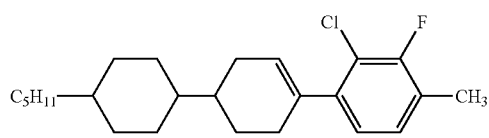 |
| 94 | 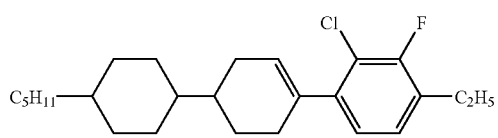 |

-continued
| No. | |
|---|---|
| 95 | 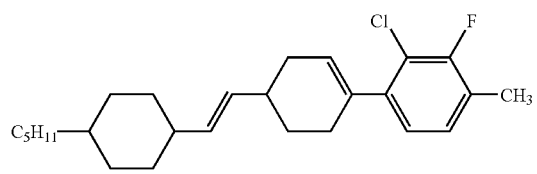 |
| 96 | 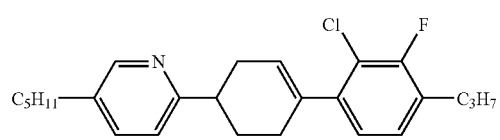 |
| 97 | 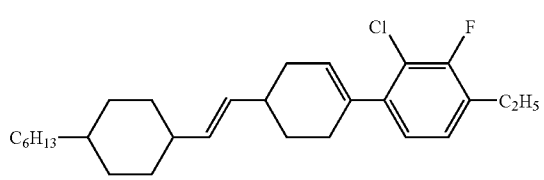 |
| 98 | 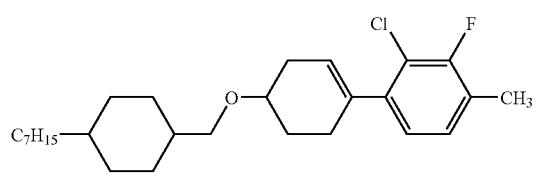 |
| 99 | 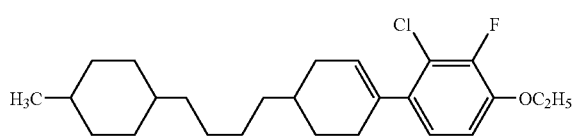 |
| 100 | 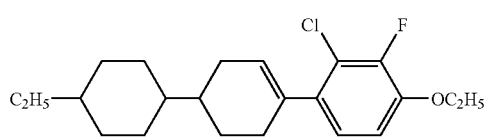 |
| 101 | 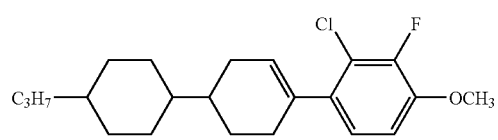 |
| 102 | 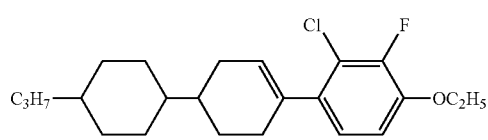<br>C 71.1 N 130.3 I<br>$T_{NI}$: 121.3° C.  $\Delta\epsilon$: -4.9  $\Delta n$: 0.108 |
| 103 | 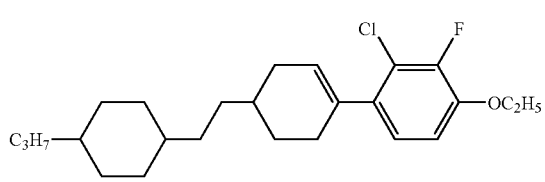<br>$C_1$ 58.7 $C_2$ 63.3 N 102.2 I<br>$T_{NI}$: 98.6° C.  $\Delta\epsilon$: -4.3  $\Delta n$: 0.098 |

-continued
| No. |
|---|
| 104 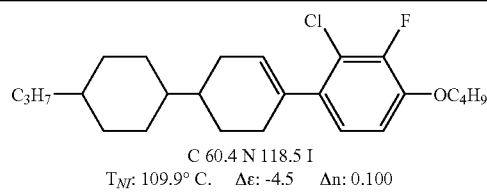
C 60.4 N 118.5 I
$T_{NI}$: 109.9° C.  Δε: -4.5  Δn: 0.100 |
| 105 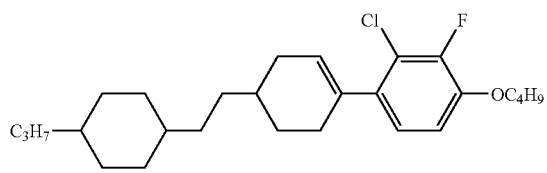 |
| 106 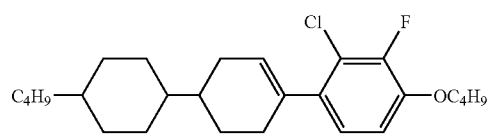 |
| 107 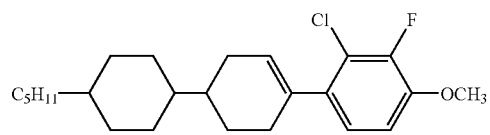 |
| 108 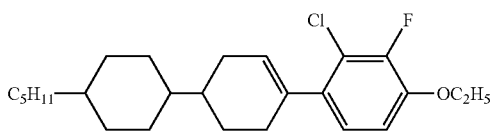 |
| 109 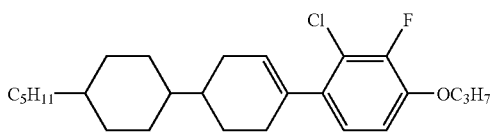 |
| 110 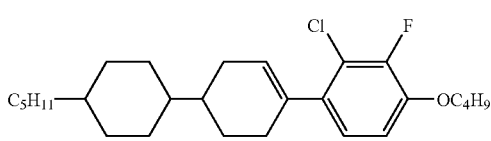 |
| 111 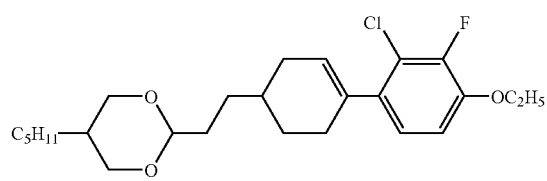 |
| 112 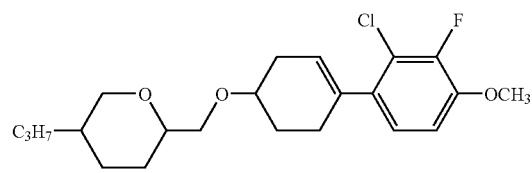 |
| 113 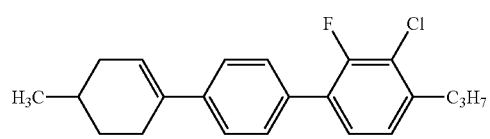 |

| No. | |
|---|---|
| 114 | 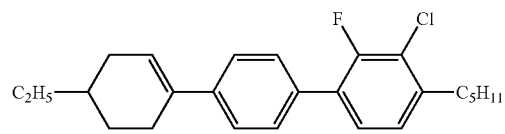 |
| 115 | 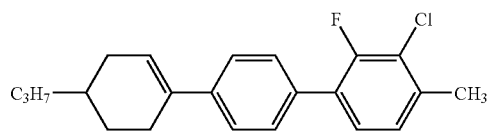 |
| 116 | 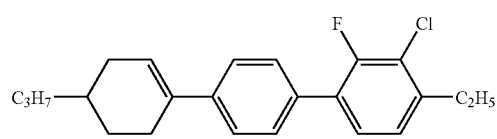 |
| 117 | 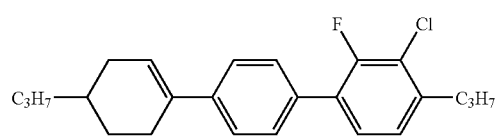 |
| 118 | 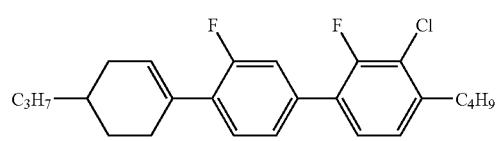 |
| 119 | 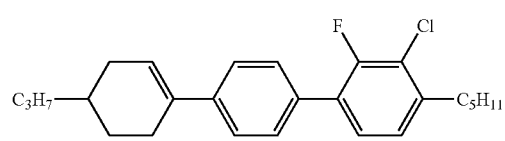 |
| 120 | 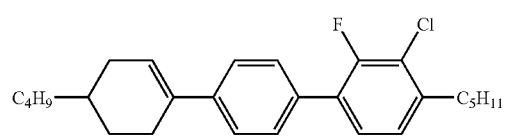 |
| 121 | 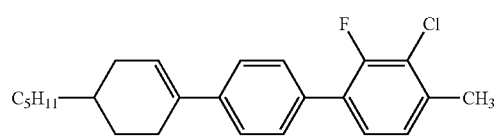 |
| 122 | 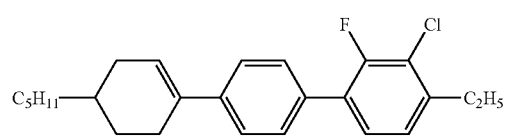 |
| 123 | 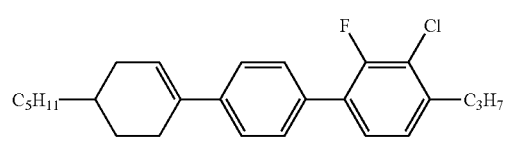 |
| 124 | 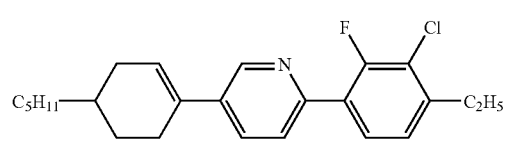 |

-continued
| No. | |
|---|---|
| 125 | 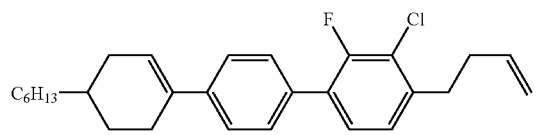 |
| 126 | 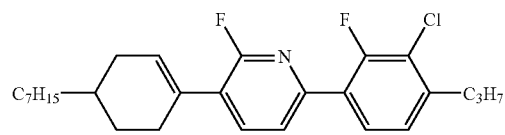 |
| 127 | 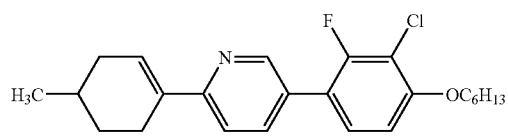 |
| 128 | 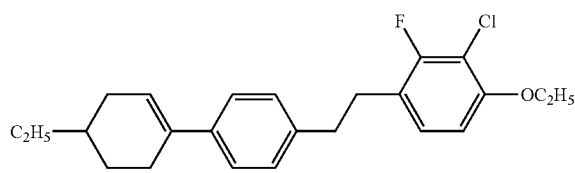 |
| 129 | 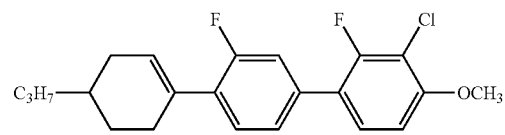 |
| 130 | 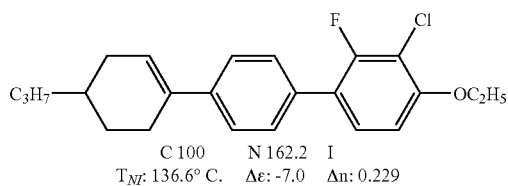 C 100  N 162.2  I<br>$T_{NI}$: 136.6° C.  Δε: −7.0  Δn: 0.229 |
| 131 | 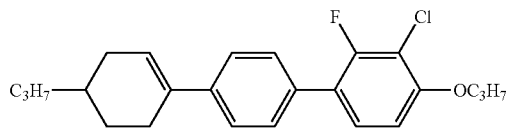 |
| 132 | 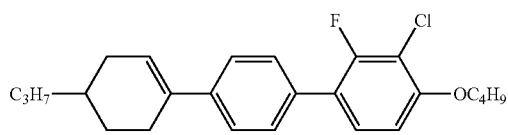 |
| 133 | 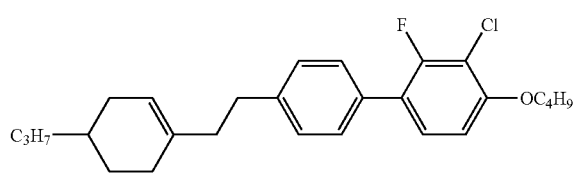 |
| 134 | 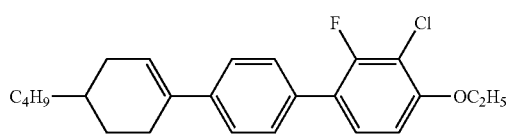 |

-continued
| No. | |
|---|---|
| 135 | 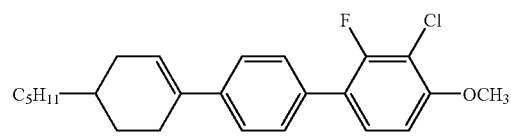 |
| 136 | 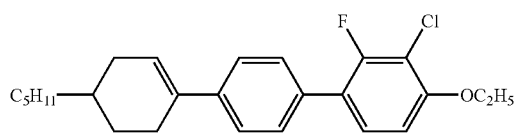 |
| 137 | 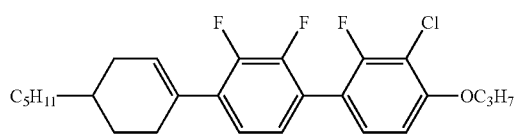 |
| 138 | 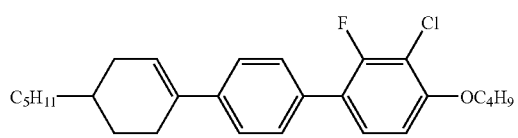 |
| 139 | 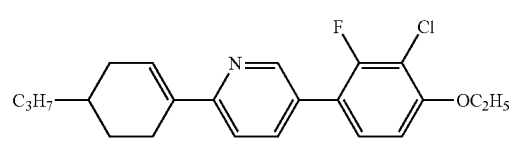 |
| 140 | 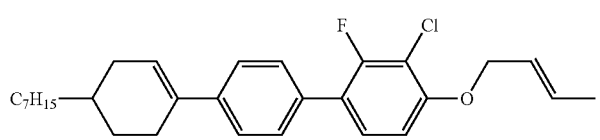 |
| 141 | 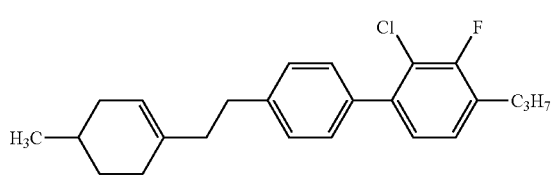 |
| 142 | 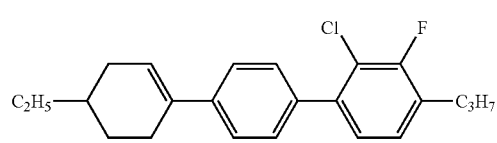 |
| 143 | 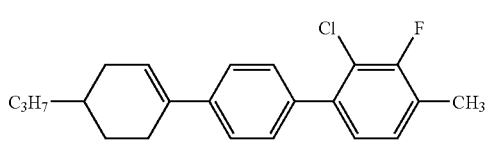 |
| 144 | 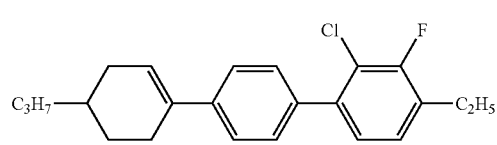 |

-continued
| No. | |
|---|---|
| 145 | 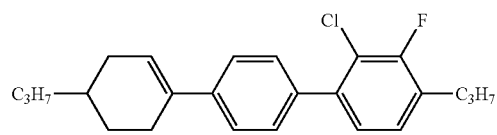 |
| 146 | 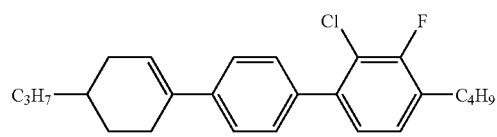 |
| 147 | 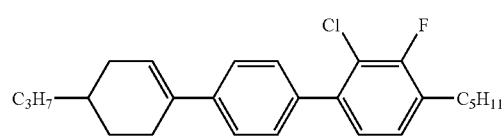 |
| 148 | 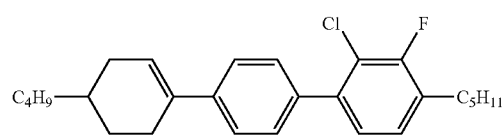 |
| 149 | 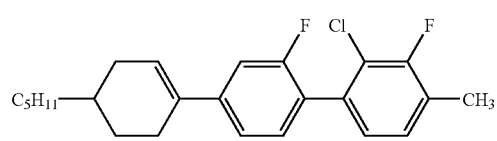 |
| 150 | 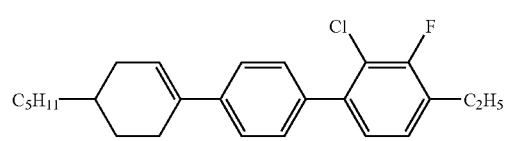 |
| 151 | 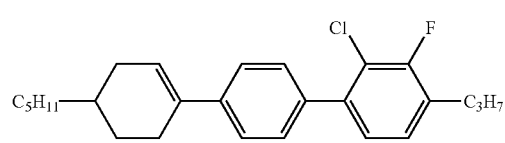 |
| 152 | 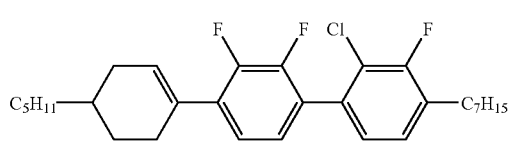 |
| 153 | 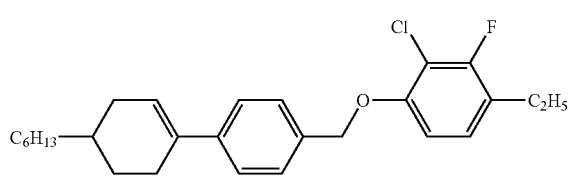 |
| 154 | 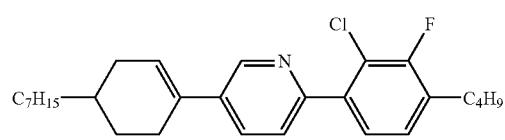 |

| No. | |
|---|---|
| 155 | 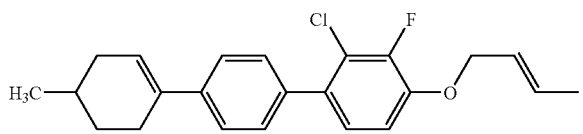 |
| 156 | 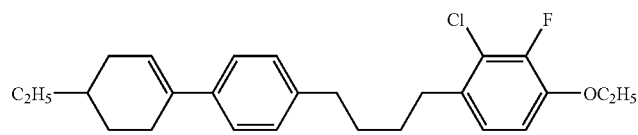 |
| 157 | 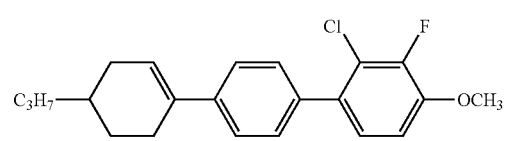 |
| 158 | 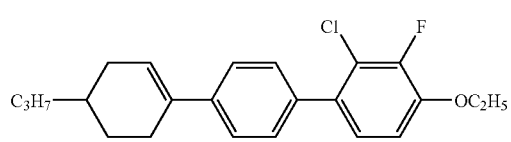 |
| 159 | 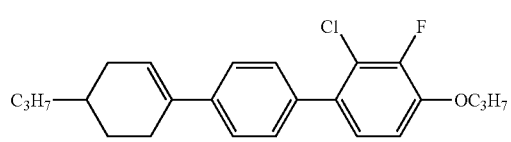 |
| 160 | 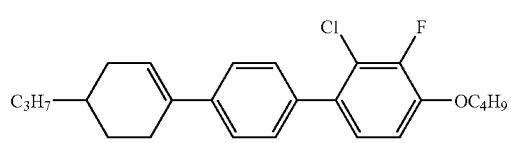 |
| 161 | 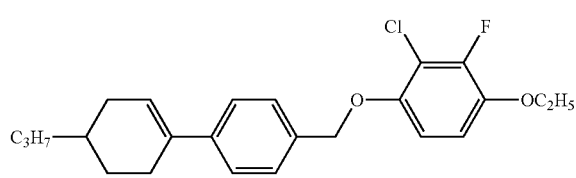 |
| 162 | 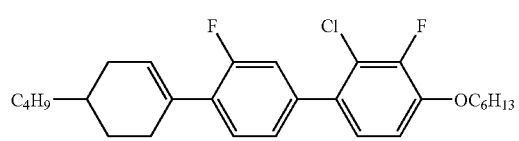 |
| 163 | 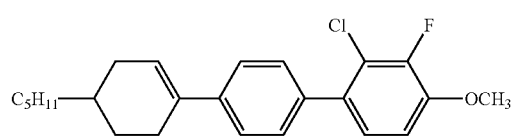 |
| 164 | 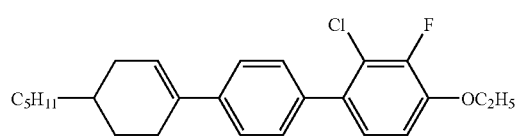 |

-continued
| No. | |
|---|---|
| 165 | 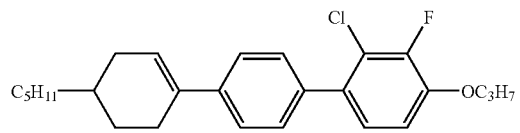 |
| 166 | 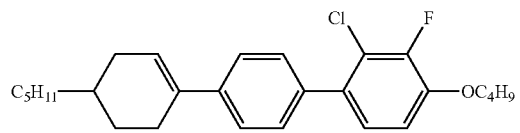 |
| 167 | 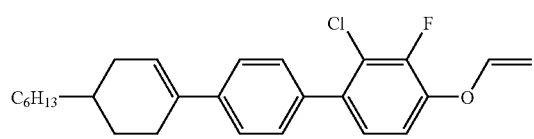 |
| 168 | 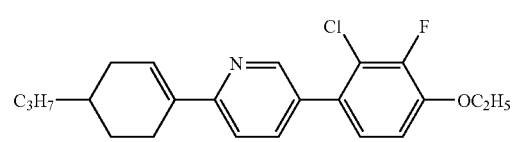 |
| 169 | 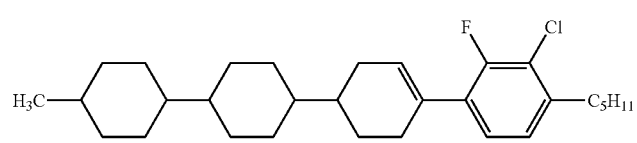 |
| 170 | 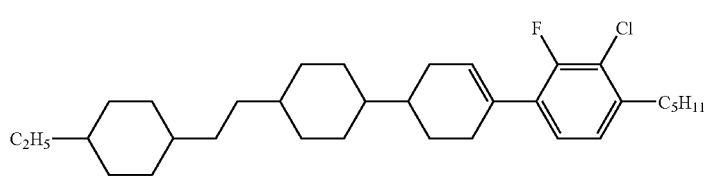 |
| 171 | 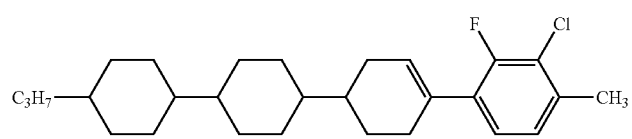 |
| 172 | 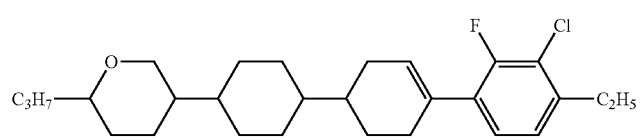 |
| 173 | 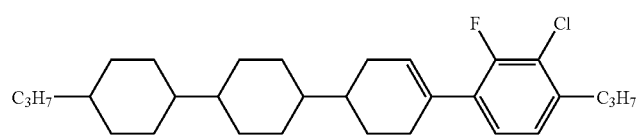 |
| 174 | 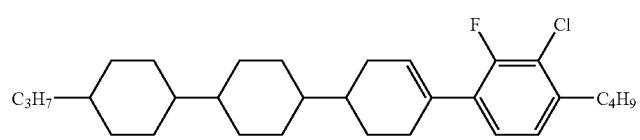 |
| 175 | 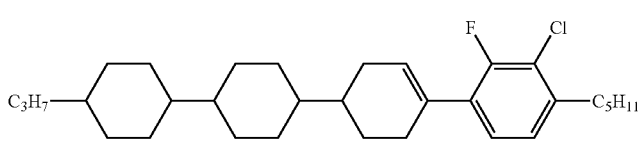 |

| No. | |
|---|---|
| 176 | 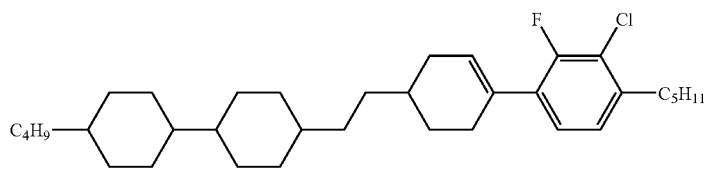 |
| 177 | 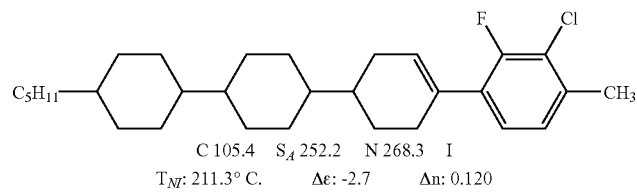
C 105.4  S$_A$ 252.2  N 268.3  I
T$_{NI}$: 211.3° C.  Δε: -2.7  Δn: 0.120 |
| 178 | 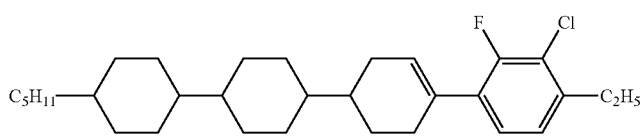 |
| 179 | 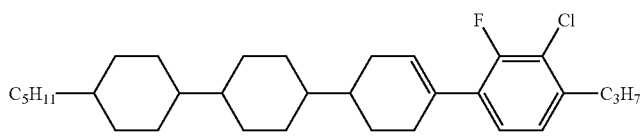 |
| 180 | 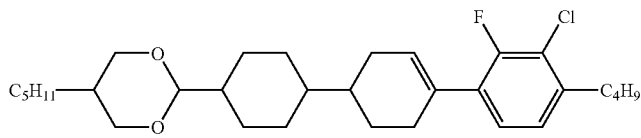 |
| 181 | 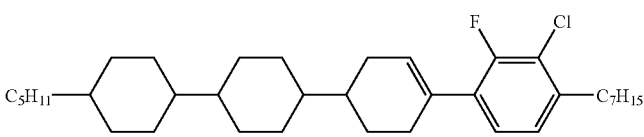 |
| 182 | 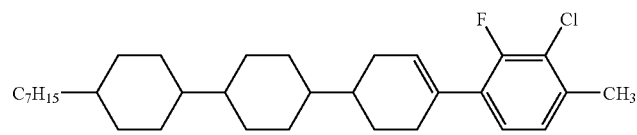 |
| 183 | 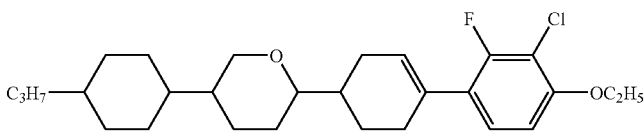 |
| 184 | 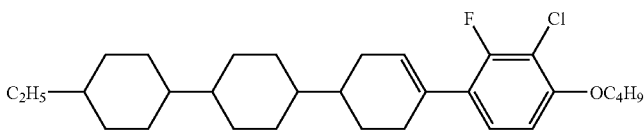 |
| 185 | 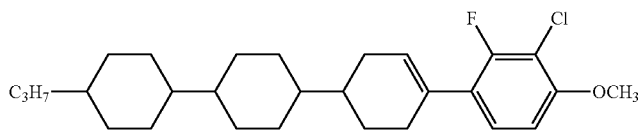 |

-continued
| No. | |
|---|---|
| 186 | 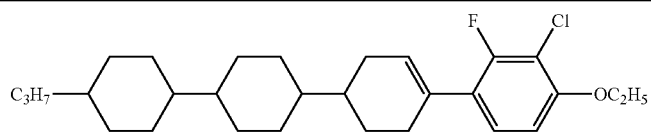 |
| 187 | 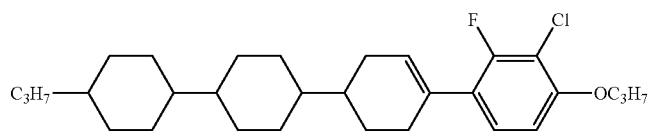 |
| 188 | 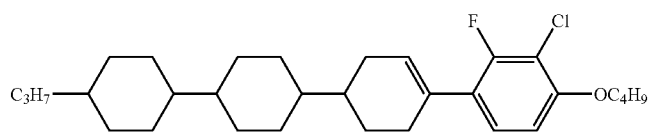 |
| 189 | 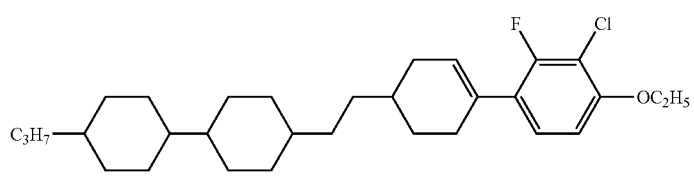 |
| 190 | 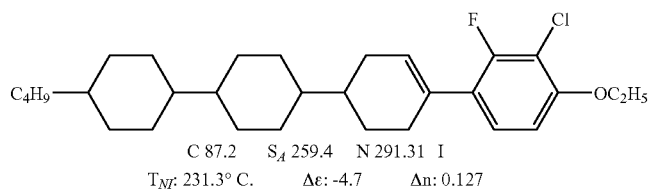<br>C 87.2  S$_A$ 259.4  N 291.31  I<br>T$_{NI}$: 231.3° C.  Δε: -4.7  Δn: 0.127 |
| 191 | 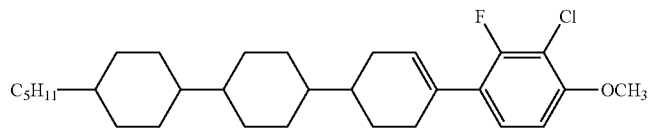 |
| 192 | 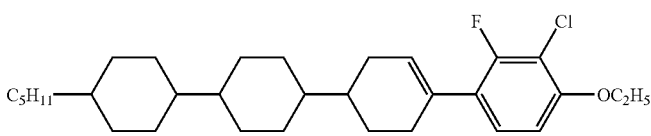 |
| 193 | 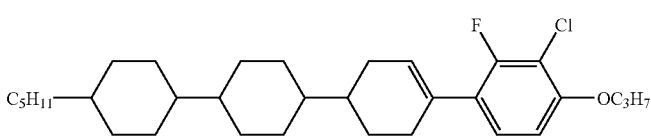 |
| 194 | 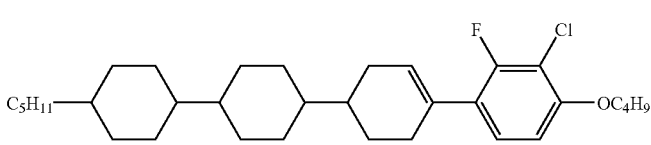 |
| 195 | 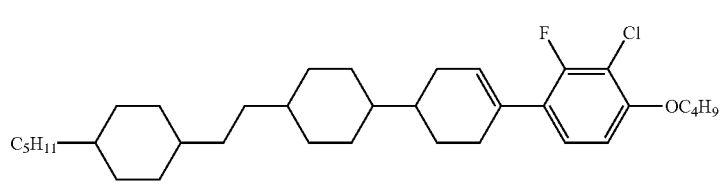 |

-continued
| No. | |
|---|---|
| 196 | 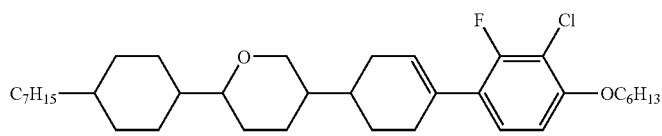 |
| 197 | 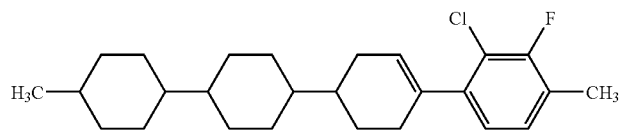 |
| 198 | 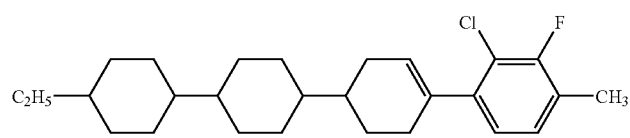 |
| 199 | 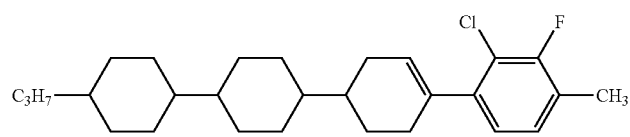 |
| 200 | 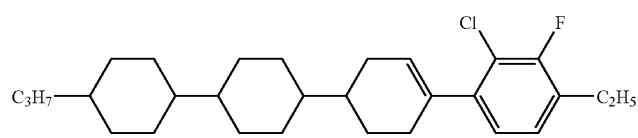 |
| 201 | 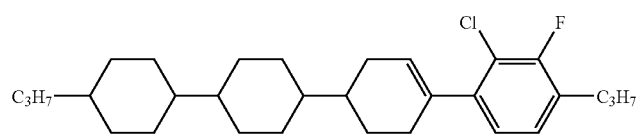 |
| 202 | 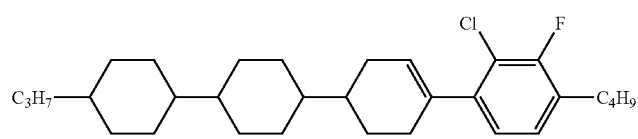 |
| 203 | 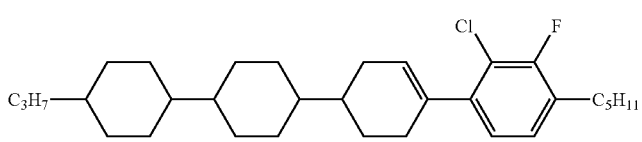 |
| 204 | 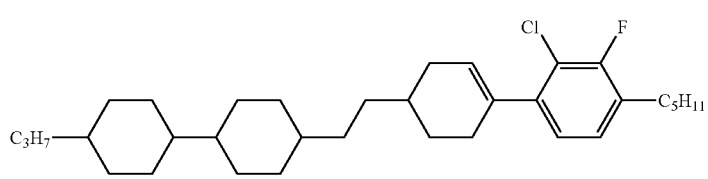 |
| 205 | 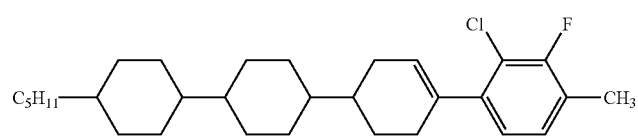 |

-continued
| No. | |
|---|---|
| 206 | 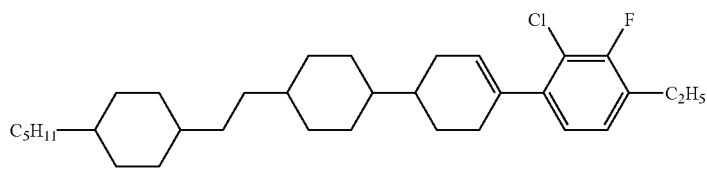 |
| 207 | 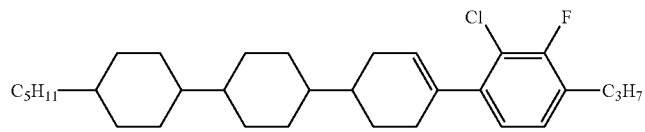 |
| 208 | 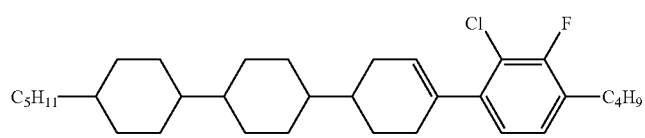 |
| 209 | 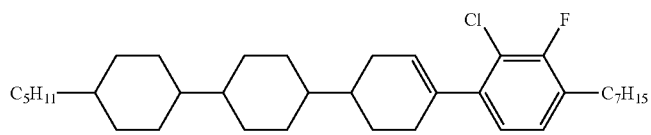 |
| 210 | 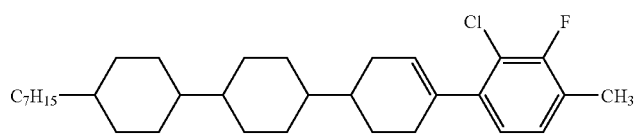 |
| 211 | 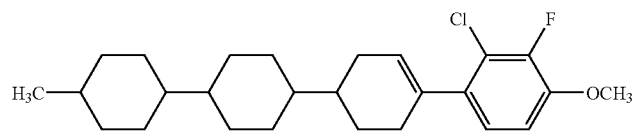 |
| 212 | 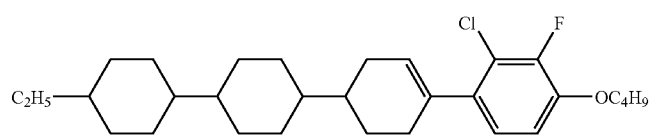 |
| 213 | 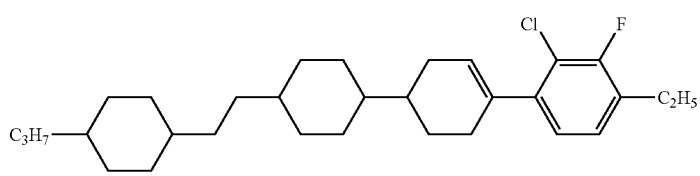 |
| 214 | 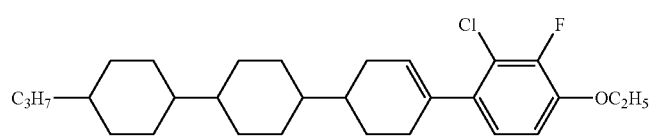 |
| 215 | 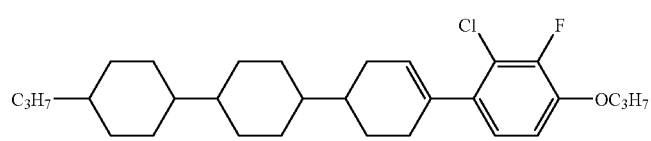 |

-continued
| No. | |
|---|---|
| 216 | 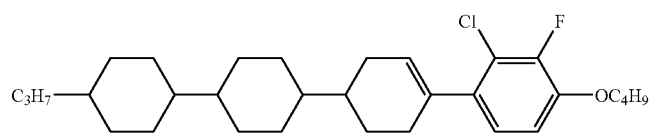 |
| 217 | 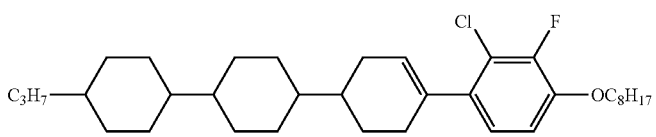 |
| 218 | 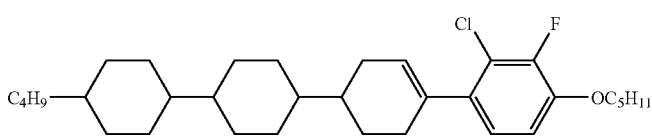 |
| 219 | 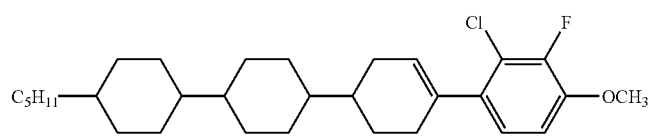 |
| 220 | 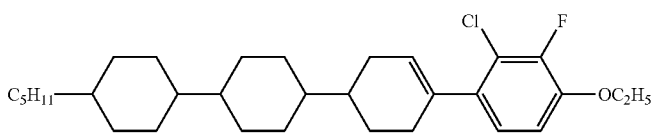 |
| 221 | 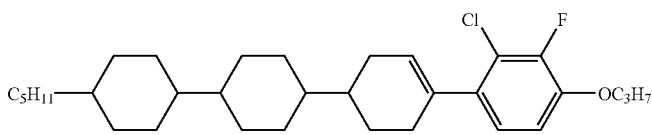 |
| 222 | 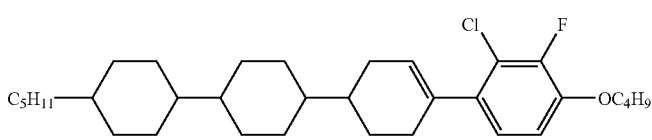 |
| 223 | 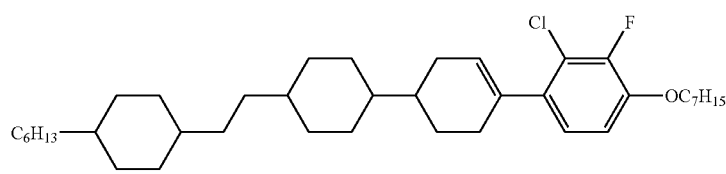 |
| 224 | 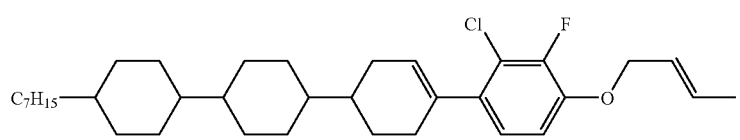 |
| 225 | 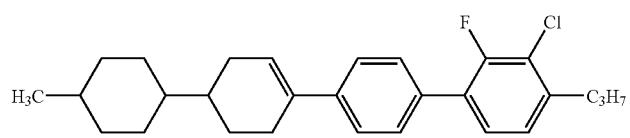 |

-continued
| No. | |
|---|---|
| 226 | 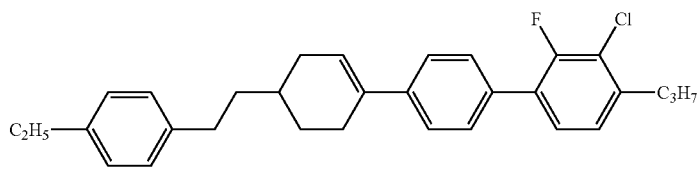 |
| 227 | 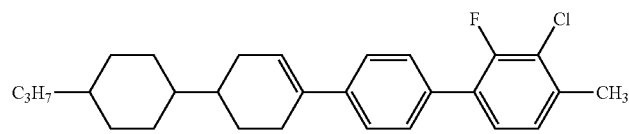 |
| 228 | 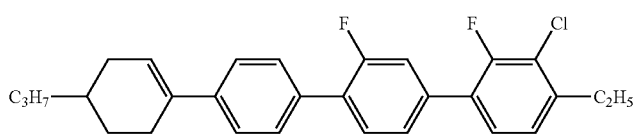 |
| 229 | 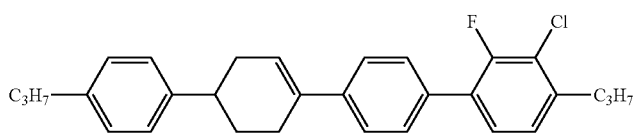 |
| 230 | 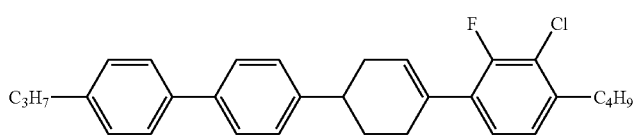 |
| 231 | 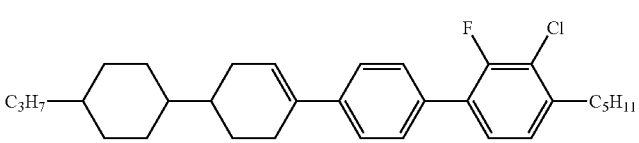 |
| 232 | 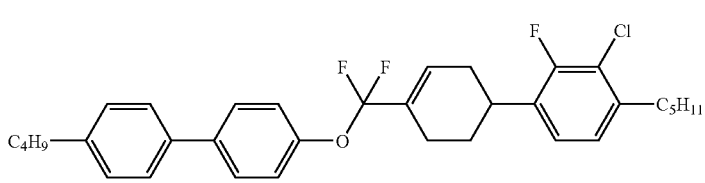 |
| 233 | 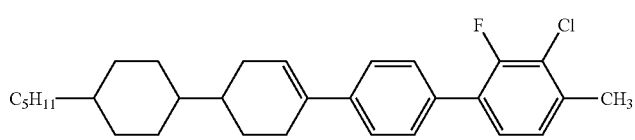 |
| 234 | 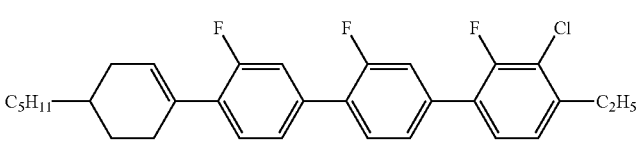 |
| 235 | 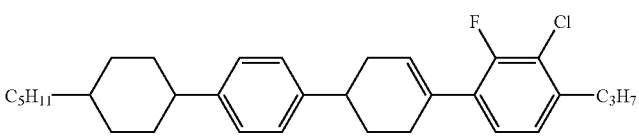 |

| No. | |
|---|---|
| 236 | 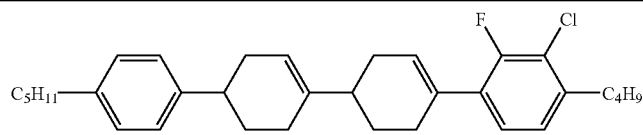 |
| 237 | 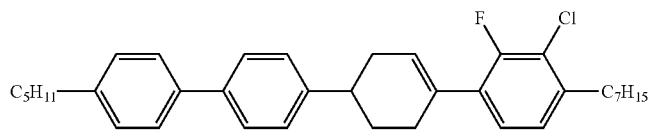 |
| 238 | 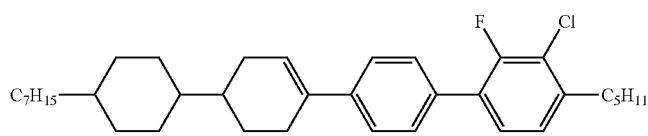 |
| 239 | 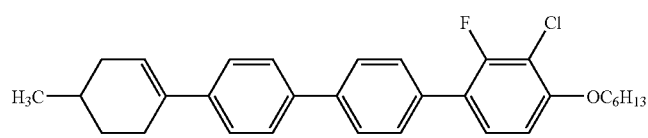 |
| 240 | 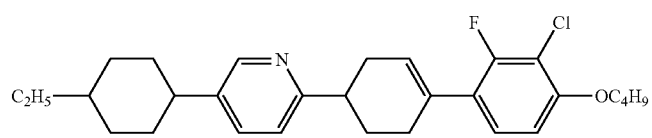 |
| 241 | 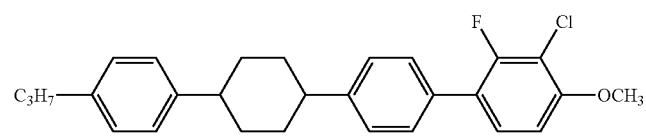 |
| 242 | 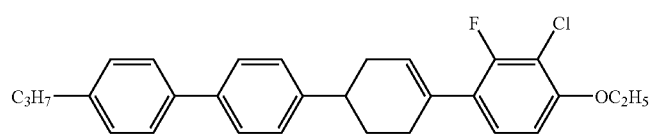 |
| 243 | 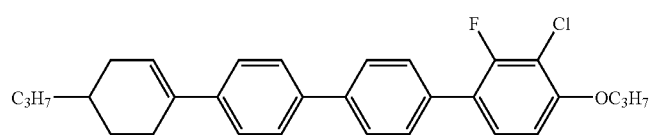 |
| 244 | 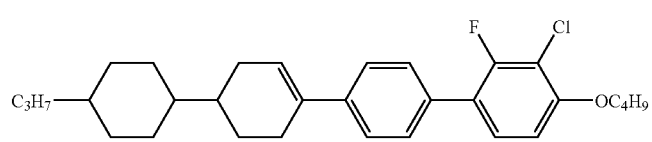 |
| 245 | 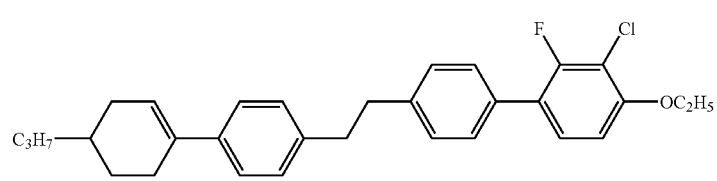 |
| 246 | 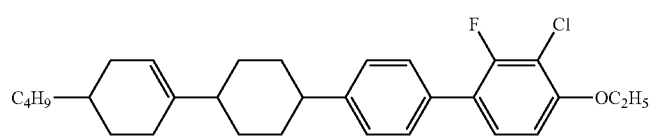 |

-continued
| No. | |
|---|---|
| 247 | 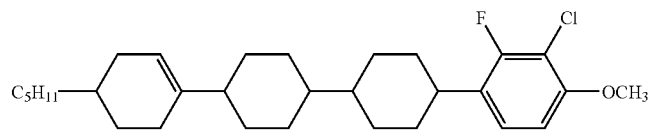 |
| 248 | 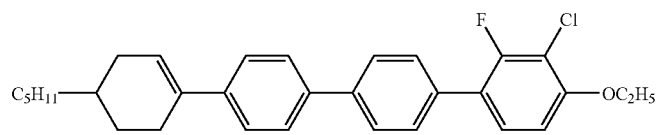 |
| 249 | 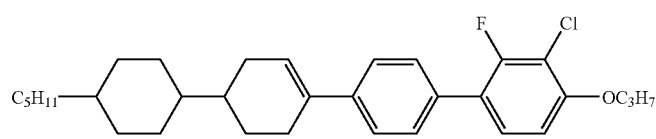 |
| 250 | 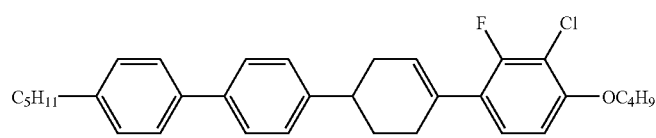 |
| 251 | 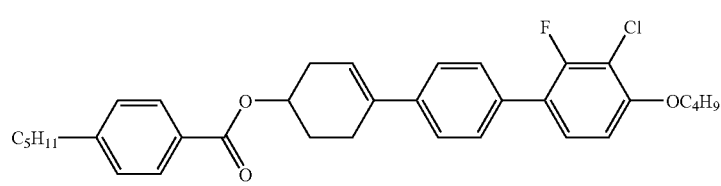 |
| 252 | 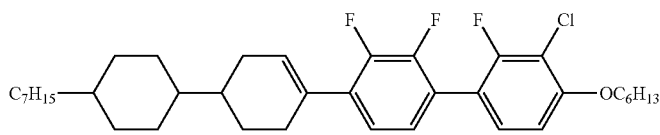 |
| 253 | 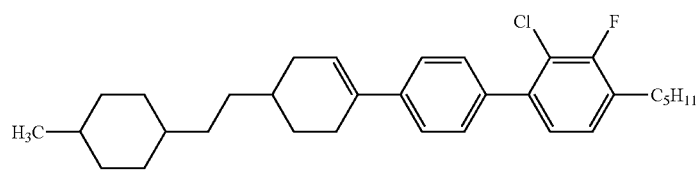 |
| 254 | 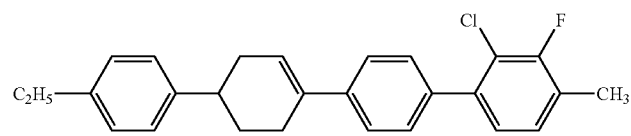 |
| 255 | 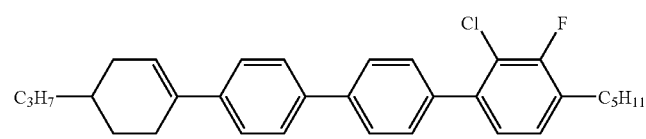 |
| 256 | 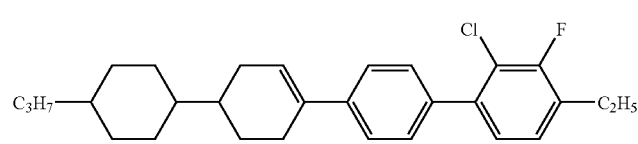 |

-continued

| No. | |
|---|---|
| 257 | C₃H₇–(pyridine)–C₆H₄–C₆H₁₀–C₆H₂(Cl)(F)–C₃H₇ |
| 258 | C₃H₇–C₆H₁₀–C₆H₄–C₆H₁₀–C₆H₂(Cl)(F)–C₄H₉ |
| 259 | C₃H₇–C₆H₁₀–C₆H₂(F)(F)–CH₂CH₂–C₆H₁₀–C₆H₂(Cl)(F)–C₅H₁₁ |
| 260 | C₄H₉–C₆H₁₀–C₆H₁₀–C₆H₄–C₆H₂(Cl)(F)–C₅H₁₁ |
| 261 | C₅H₁₁–C₆H₁₀–C₆H₁₀–C₆H₄–C₆H₂(Cl)(F)–CH₃ |
| 262 | C₅H₁₁–C₆H₁₀–C₆H₄–C₆H₄–C₆H₂(Cl)(F)–C₄H₉ |
| 263 | C₅H₁₁–C₆H₁₀–C₆H₄–C₆H₁₀–C₆H₂(Cl)(F)–C₃H₇ |
| 264 | C₅H₁₁–C₆H₄–C₆H₄–C₆H₁₀–C₆H₂(Cl)(F)–C₂H₅ |
| 265 | C₅H₁₁–C₆H₄–C₆H₃(F)–C₆H₁₀–C₆H₂(Cl)(F)–CH₃ |
| 266 | C₇H₁₅–C₆H₁₀–C₆H₄–C₆H₄–C₆H₂(Cl)(F)–C₅H₁₁ |

-continued
| No. | |
|---|---|
| 267 | 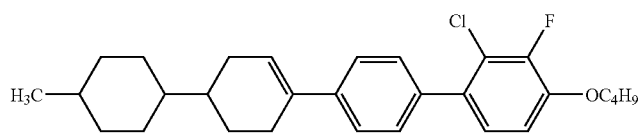 |
| 268 | 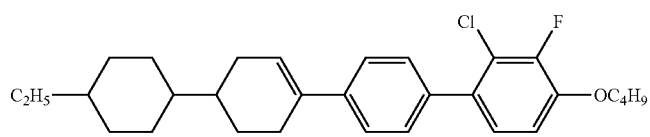 |
| 269 | 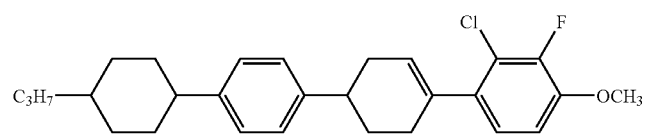 |
| 270 | 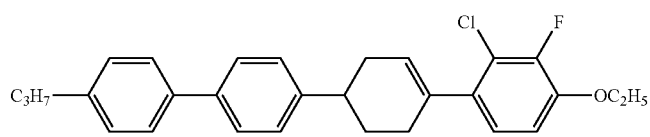 |
| 271 | 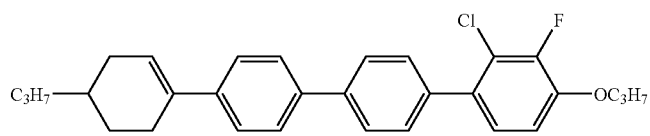 |
| 272 | 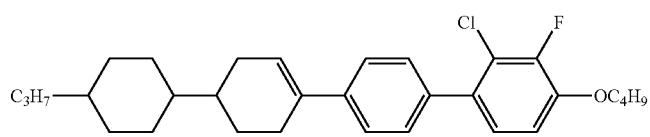 |
| 273 | 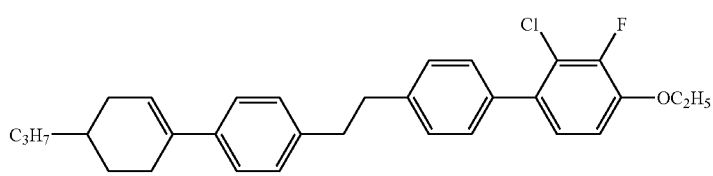 |
| 274 | 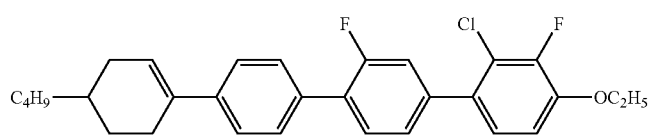 |
| 275 | 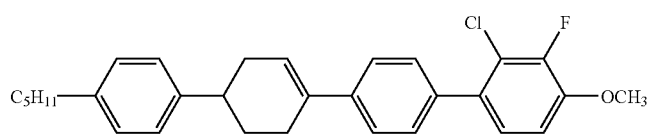 |
| 276 | 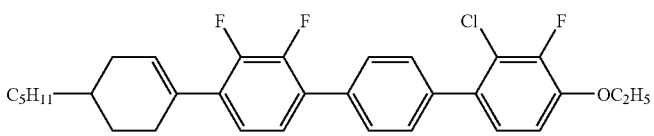 |

-continued
| No. | |
|---|---|
| 277 | 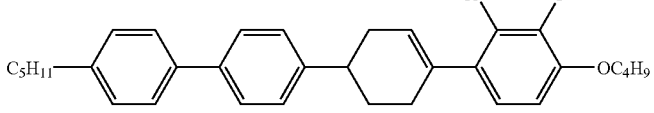 |
| 278 | 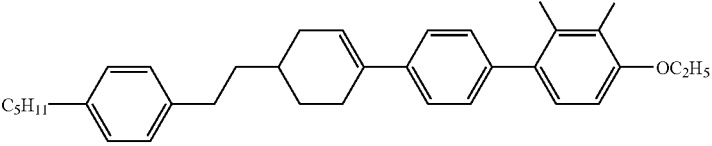 |
| 279 | 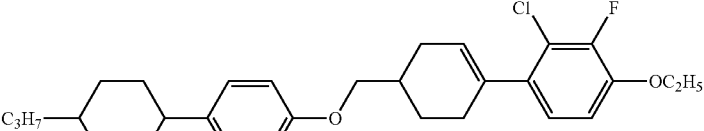 |
| 280 | 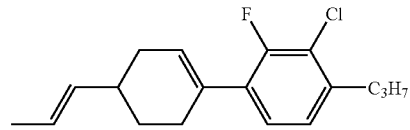 |
| 281 | 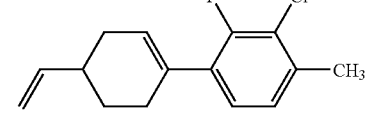 |
| 282 | 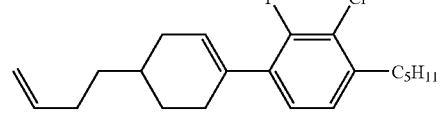 |
| 283 | 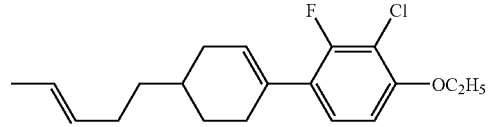 |
| 284 | 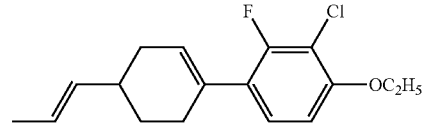 |
| 285 | |
| 286 | 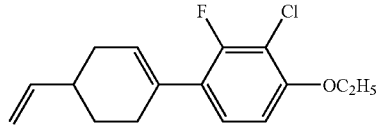 |
$C_1$ 14.5   $C_2$ 29.4   I
$T_{NI}$: -28.7° C.   Δε: -4.7   Δn: 0.084

-continued
| No. | |
|---|---|
| 287 | 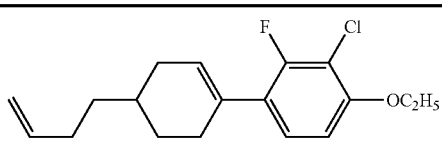 |
| 288 | 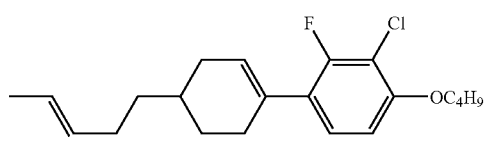 |
| 289 | 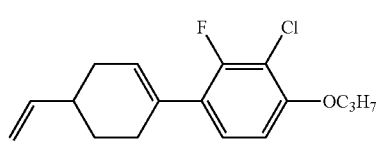 |
| 290 | 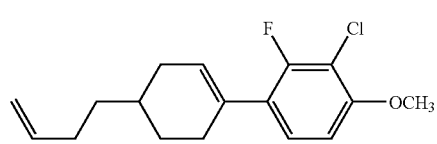 |
| 291 | 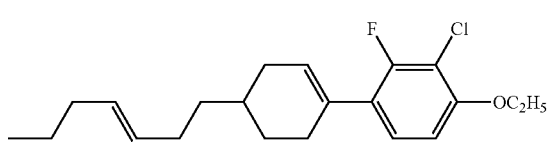 |
| 292 | 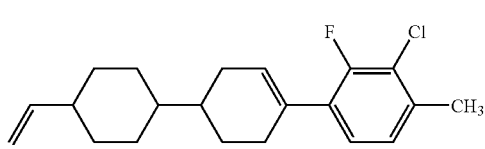 |
| 293 | 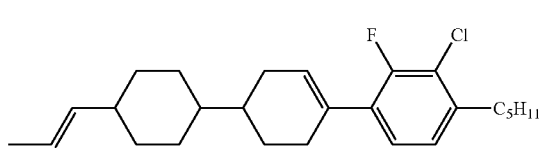 |
| 294 | 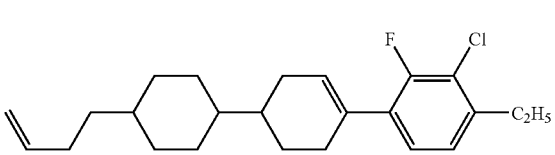 |
| 295 | 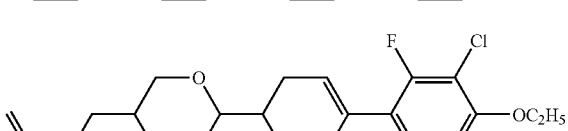 |
| 296 | 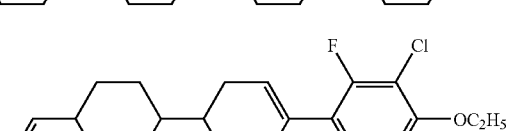 |
| 297 | 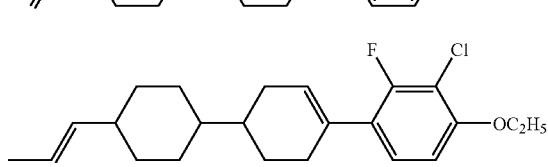 |

|No.||
|---|---|
|298|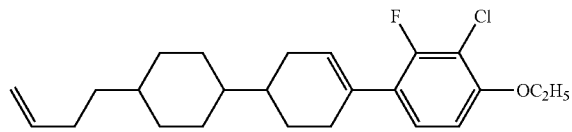|
|299|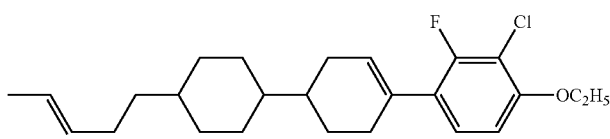|
|300|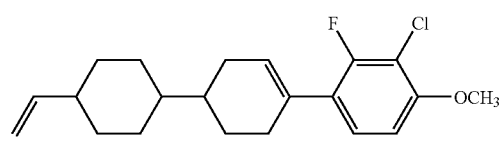|
|301|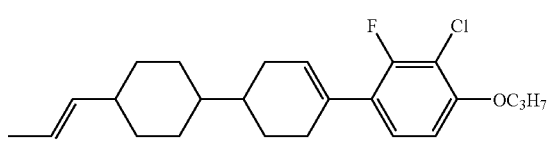|
|302|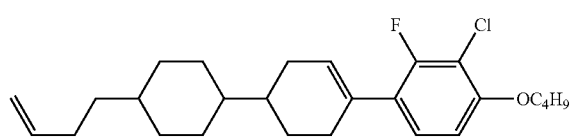|
|303|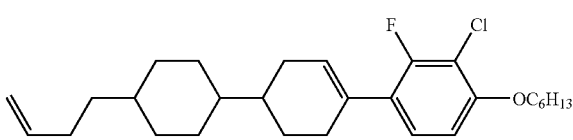|
|304|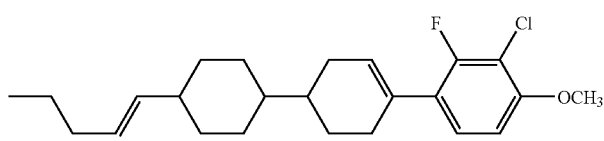|
|305|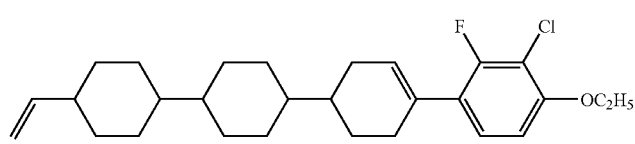|
|306|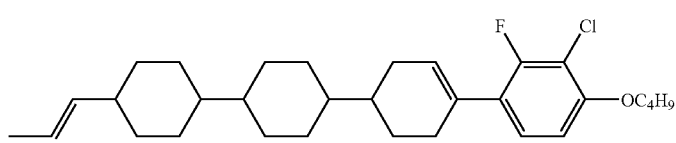|
|307|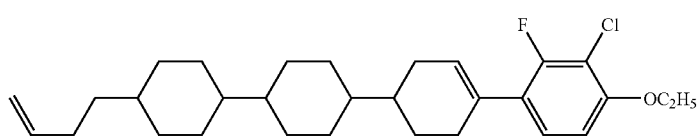|

-continued
| No. | |
|---|---|
| 308 | 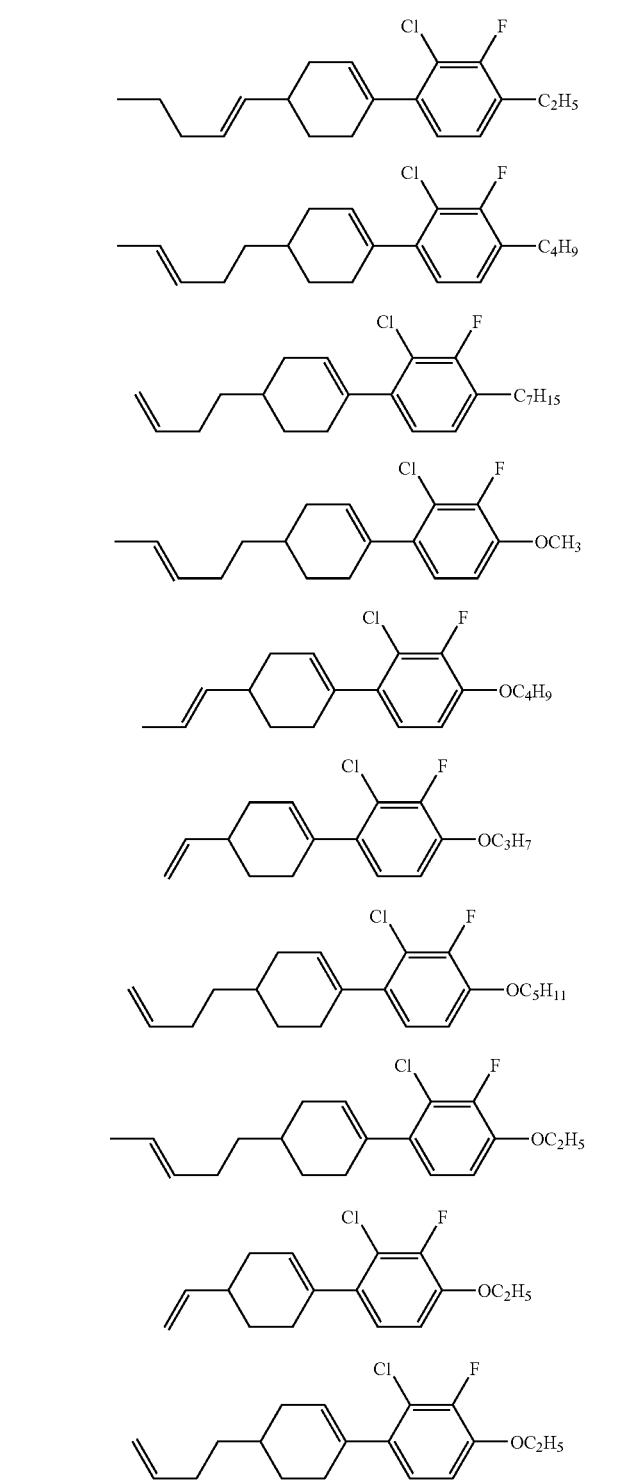 |
| 309 | 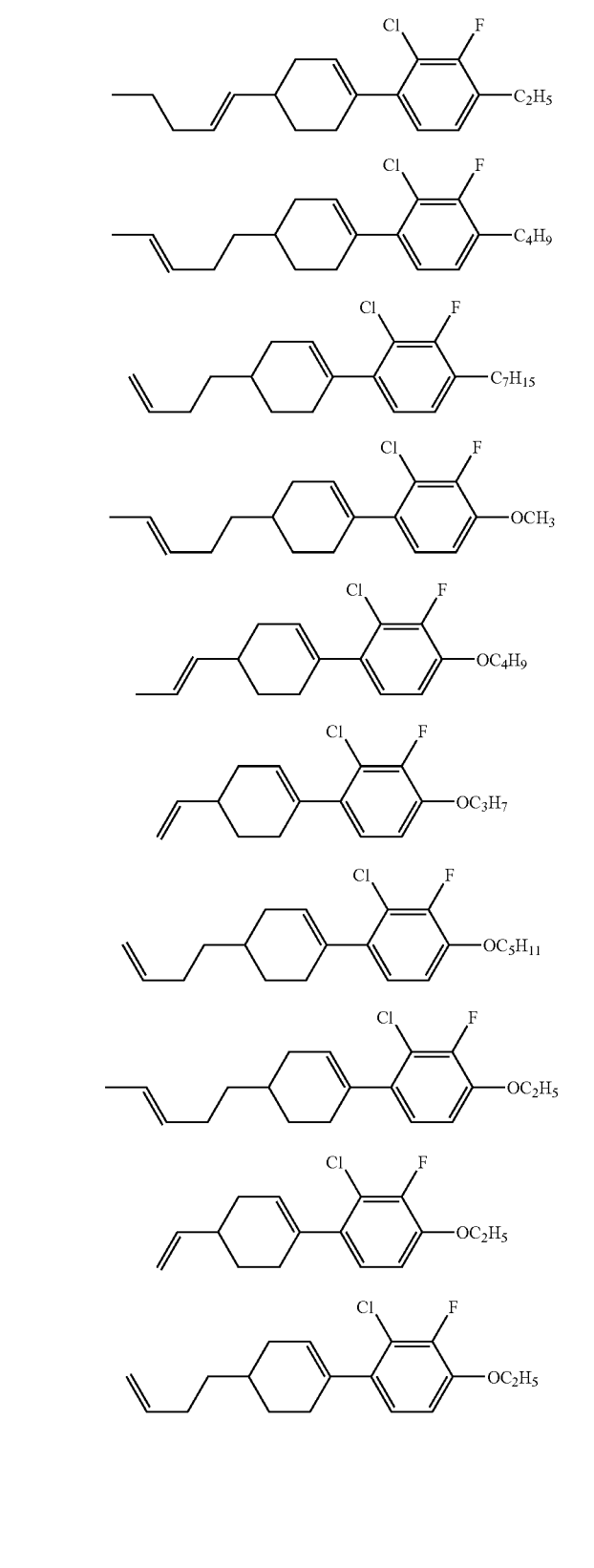 |
| 310 | 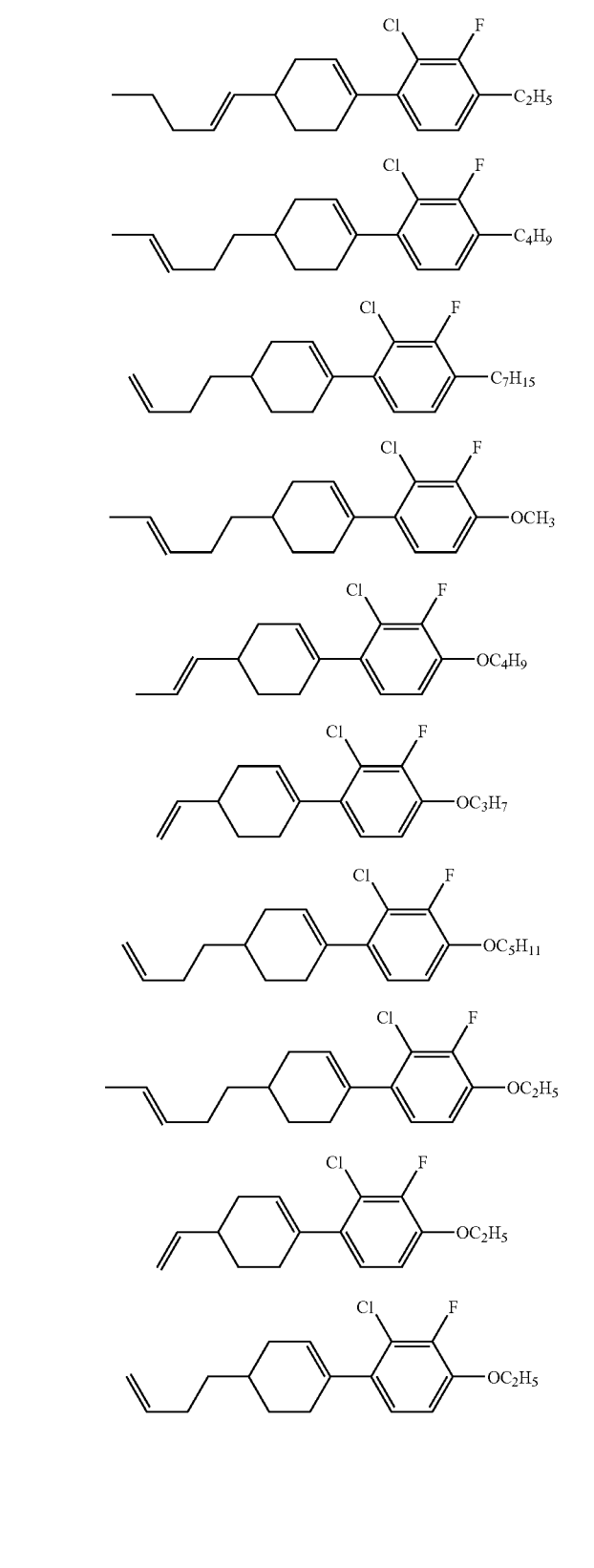 |
| 311 | 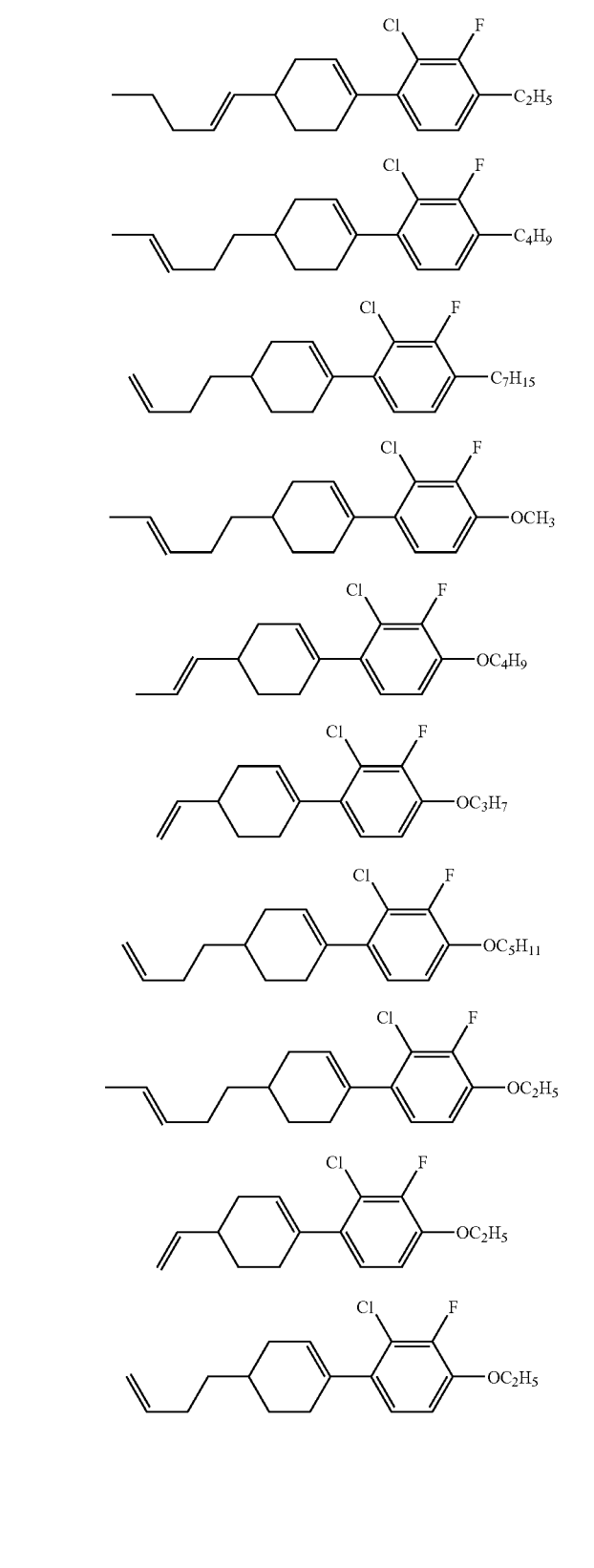 |
| 312 | 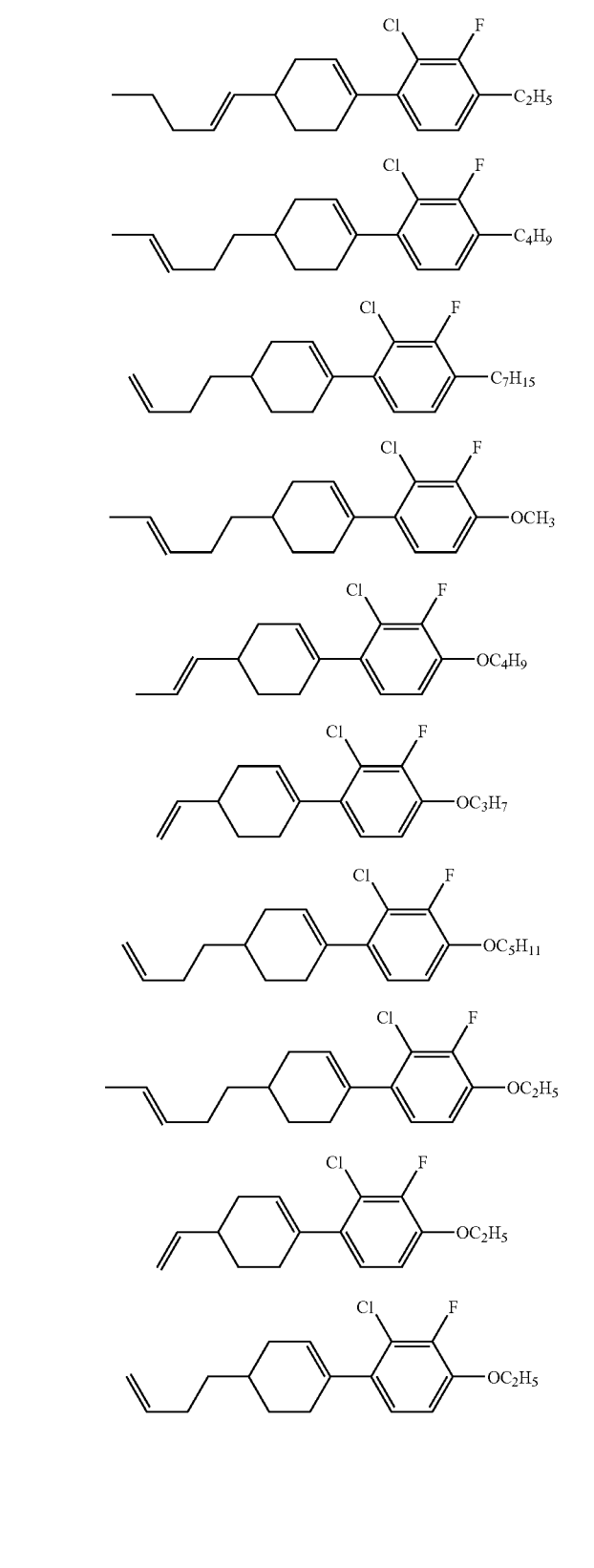 |
| 313 | 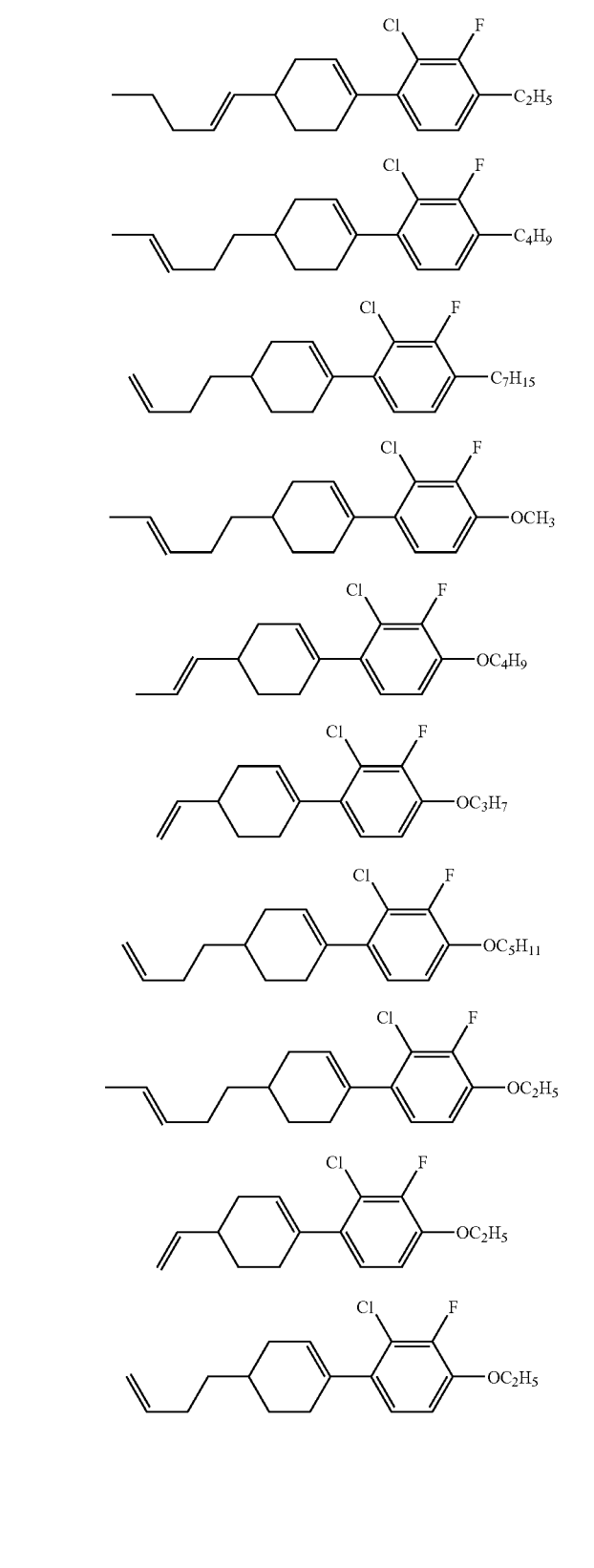 |
| 314 | 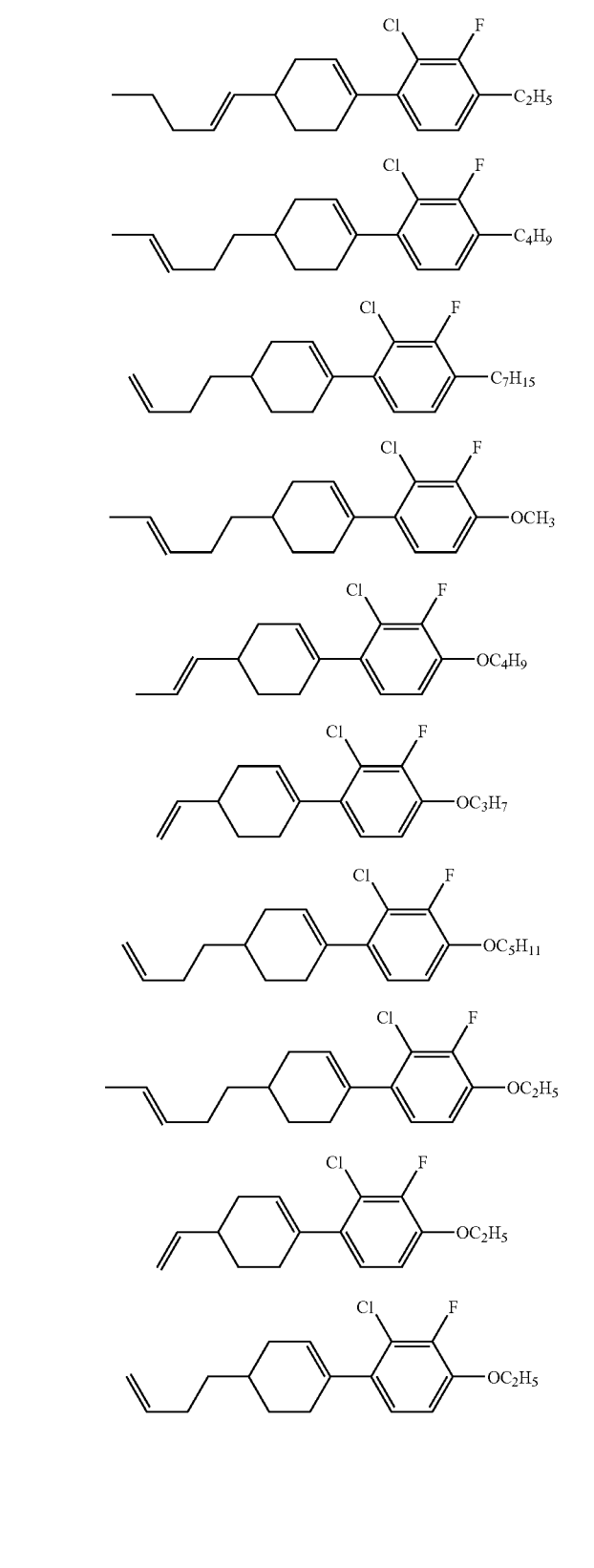 |
| 315 | 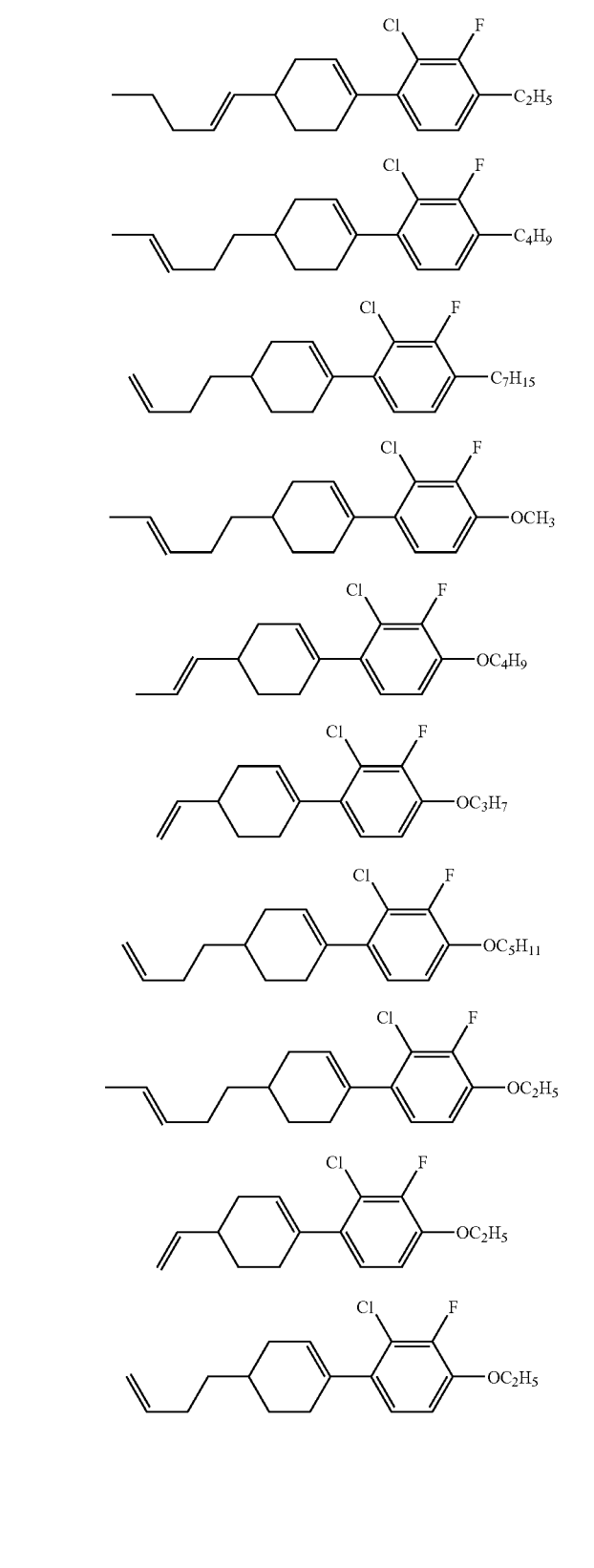 |
| 316 | 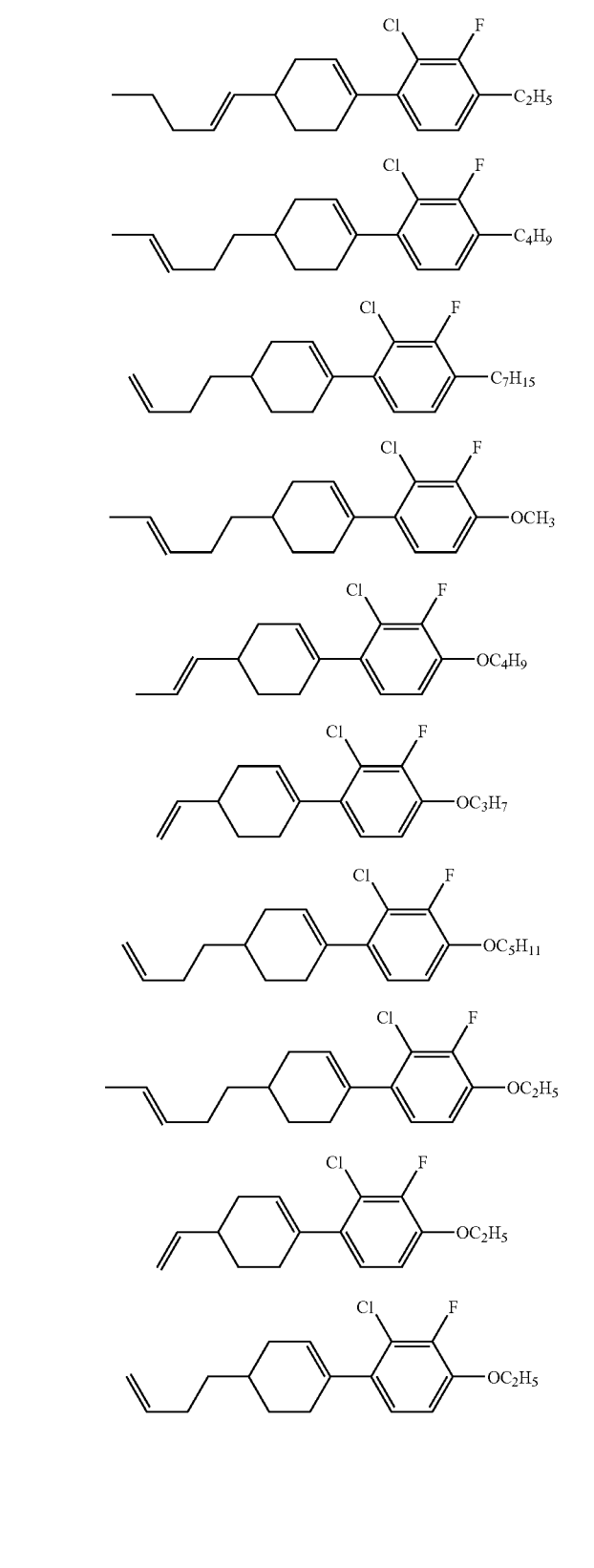 |
| 317 | 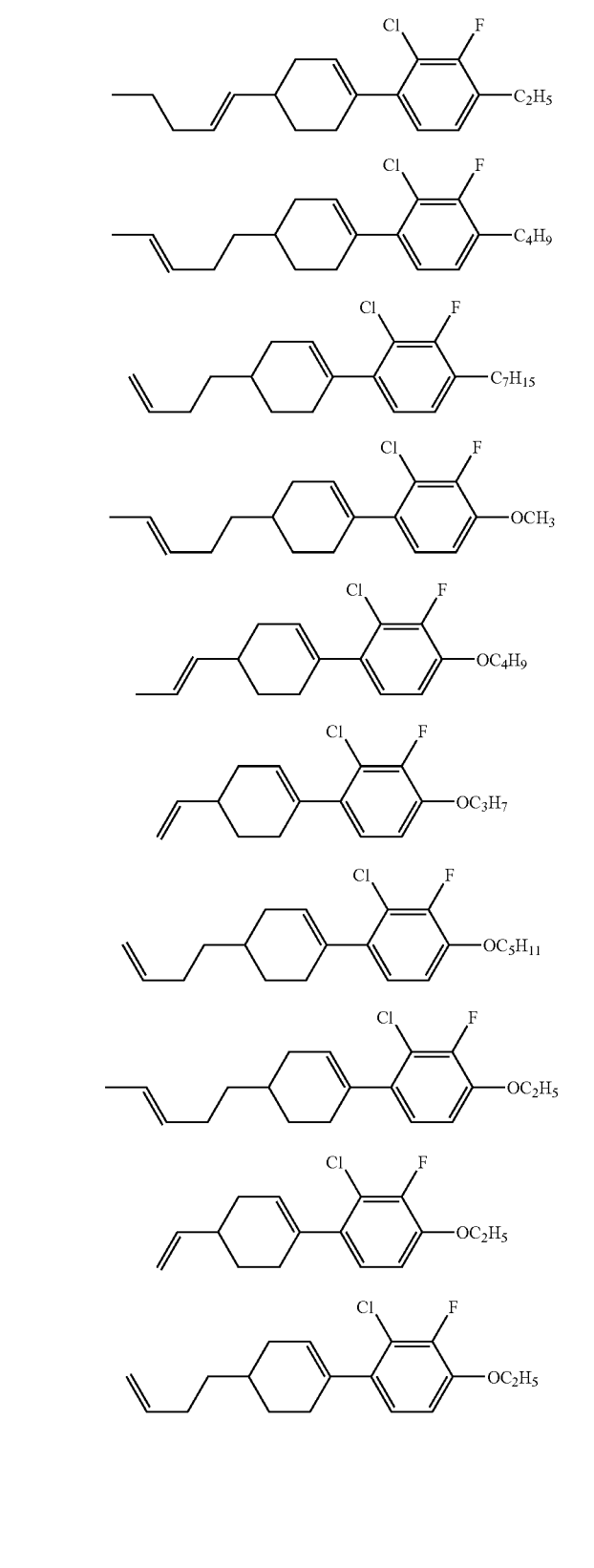 |
| 318 | 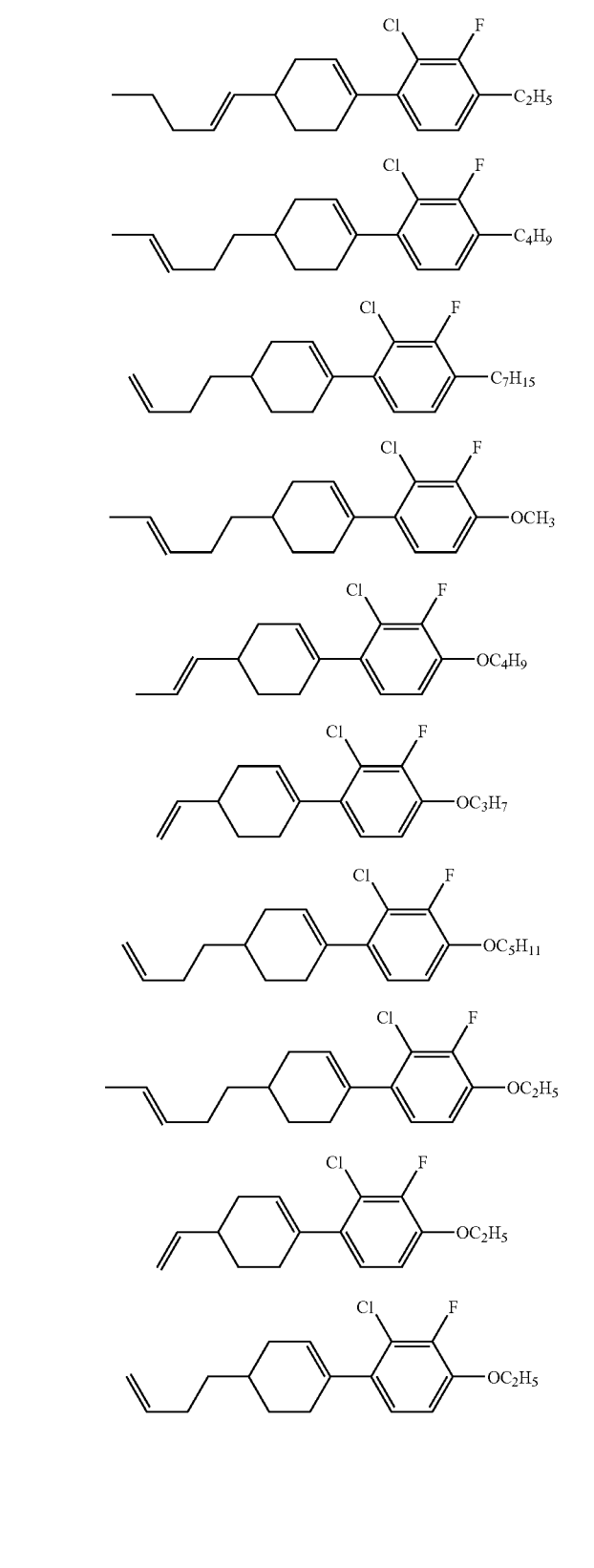 |

-continued
| No. | |
|---|---|
| 319 | 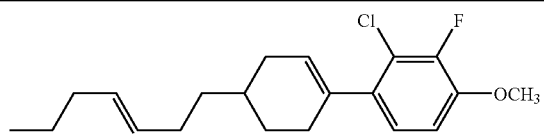 |
| 320 | 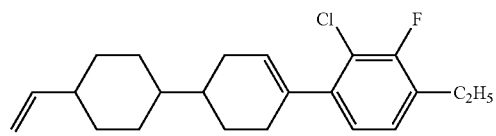 |
| 321 | 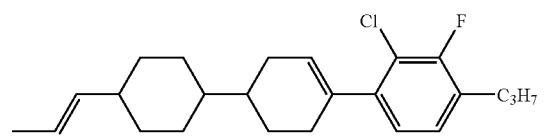 |
| 322 | 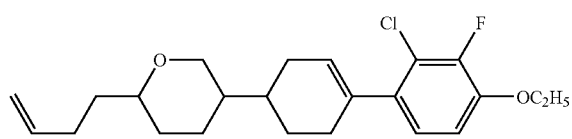 |
| 323 | 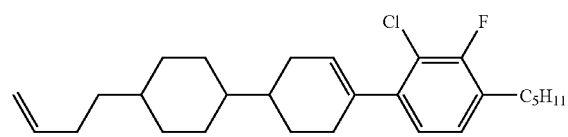 |
| 324 | 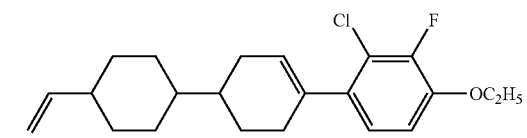 |
| 325 | 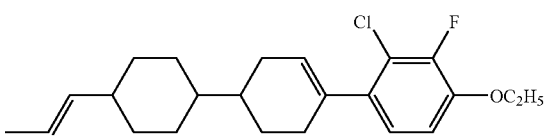 |
| 326 | 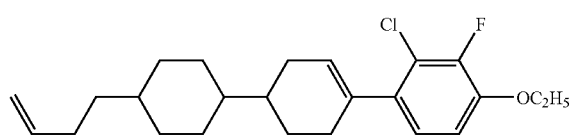 |
| 327 | 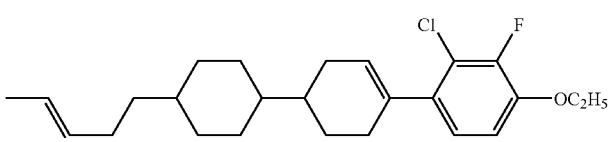 |
| 328 | 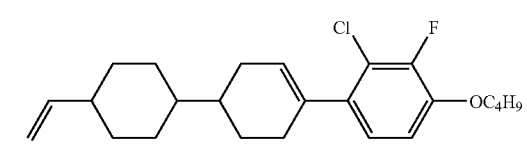 |
| 329 | 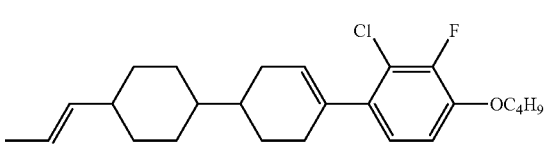 |

-continued
| No. | |
|---|---|
| 330 | 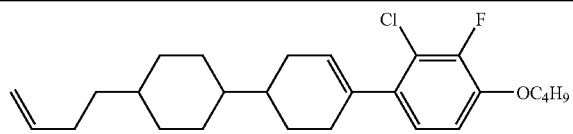 |
| 331 | 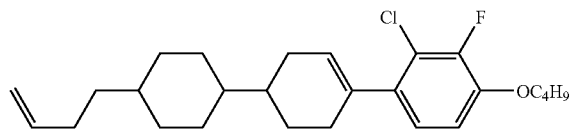 |
| 332 | 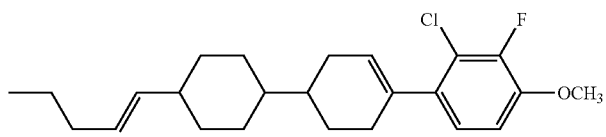 |
| 333 | 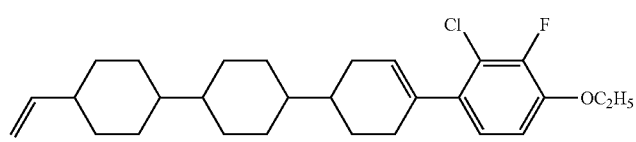 |
| 334 | 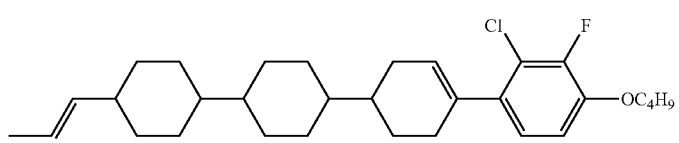 |
| 335 | 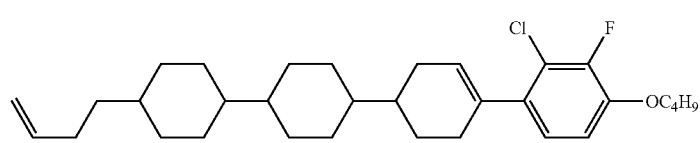 |
| 336 | 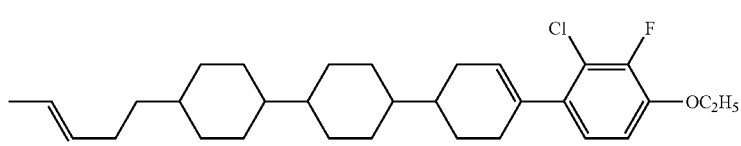 |
| 337 | 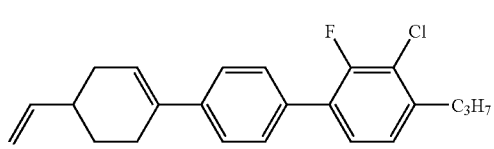 |
| 338 | 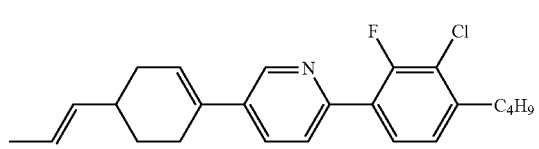 |
| 339 | 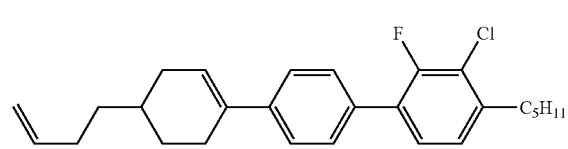 |
| 340 | 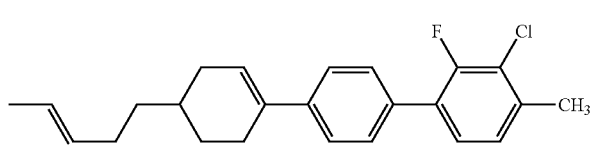 |

| No. | |
|---|---|
| 341 | 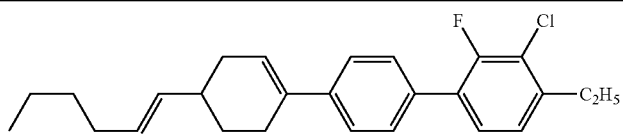 |
| 342 | 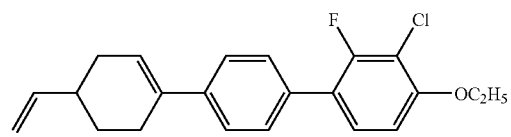 |
| 343 | 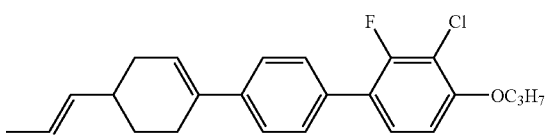 |
| 344 | 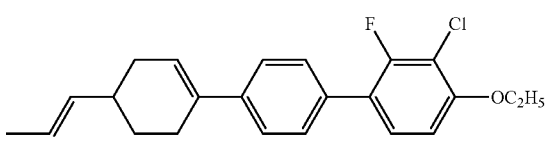 |
| 345 | 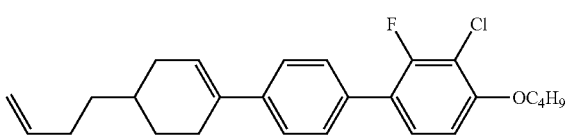 |
| 346 | 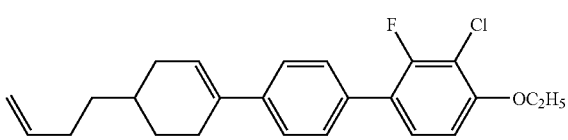 |
| 347 | 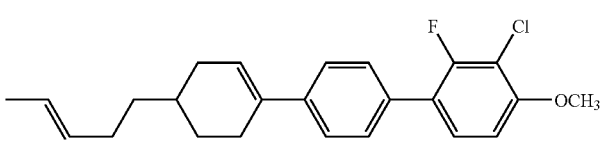 |
| 348 | 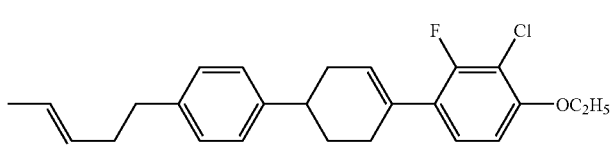 |
| 349 | 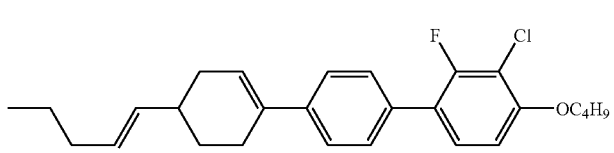 |
| 350 | 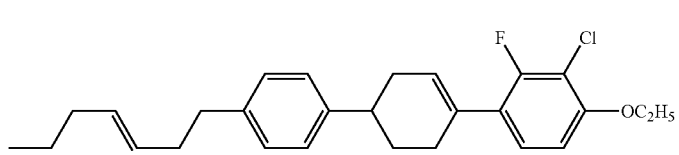 |
| 351 | 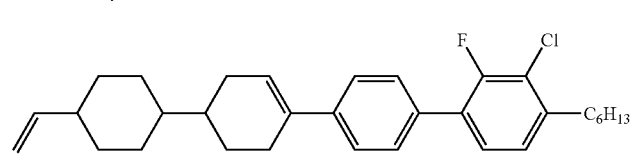 |

-continued
| No. | |
|---|---|
| 352 | 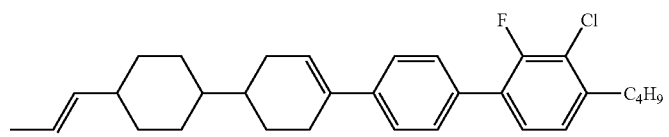 |
| 353 | 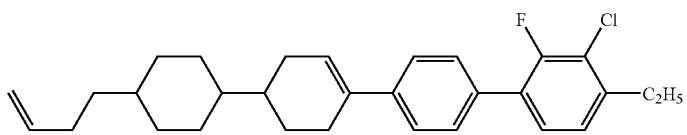 |
| 354 | 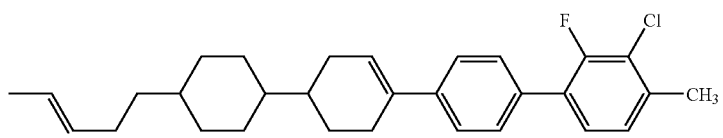 |
| 355 | 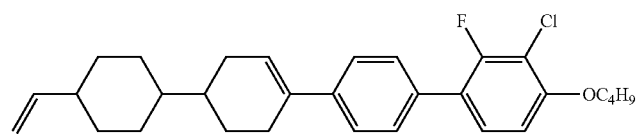 |
| 356 | 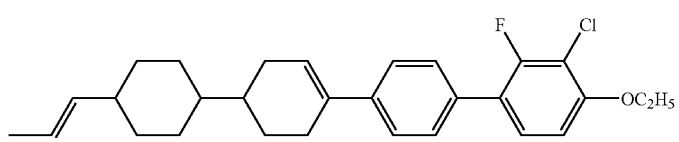 |
| 357 | 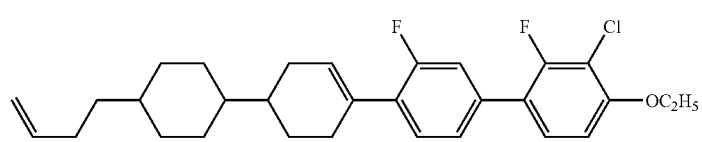 |
| 358 | 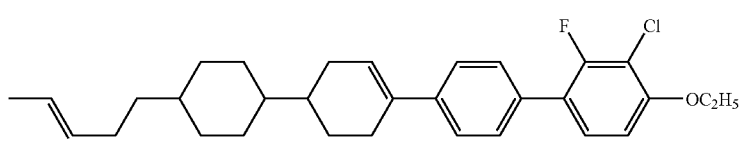 |
| 359 | 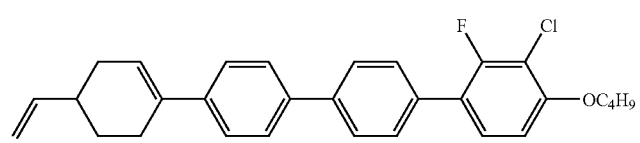 |
| 360 | 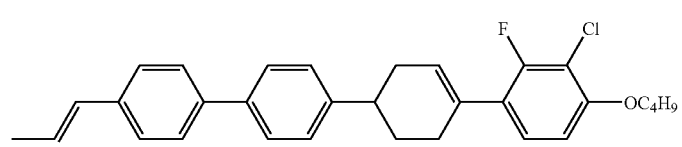 |
| 361 | 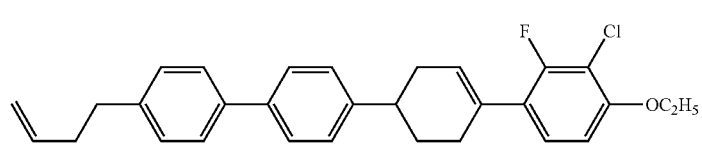 |
| 362 | 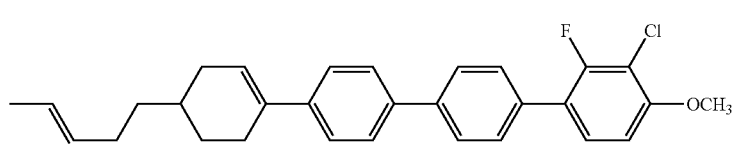 |

-continued
| No. | |
|---|---|
| 363 | 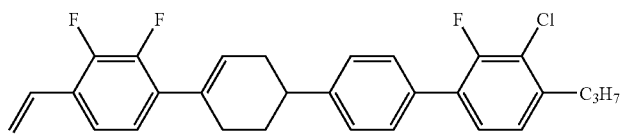 |
| 364 | 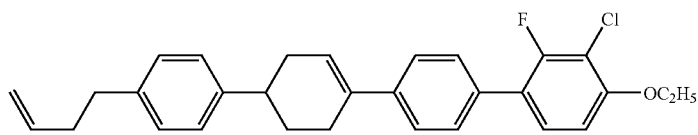 |
| 365 | 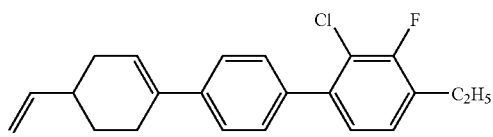 |
| 366 | 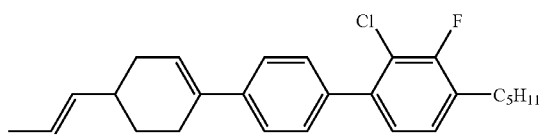 |
| 367 | 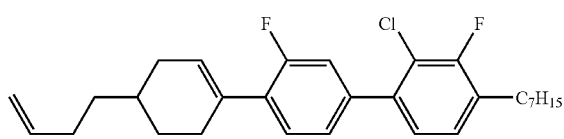 |
| 368 | 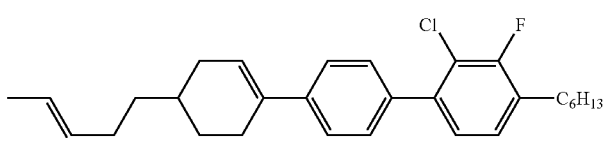 |
| 369 | 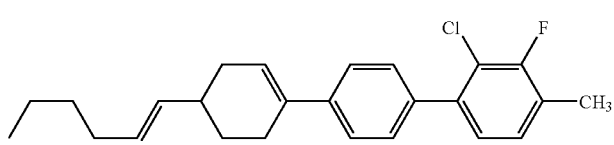 |
| 370 | 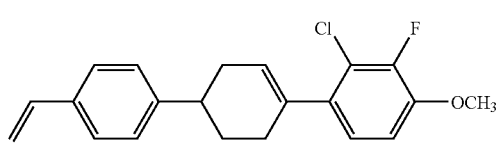 |
| 371 | 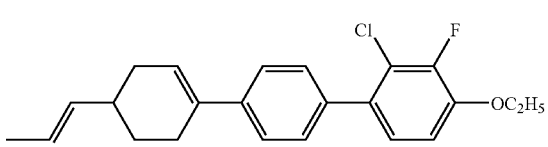 |
| 372 | 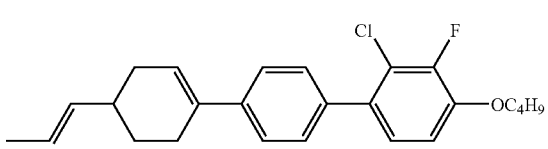 |
| 373 | 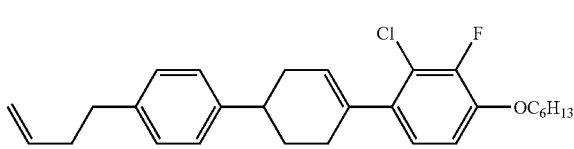 |

| No. | |
|---|---|
| 374 | 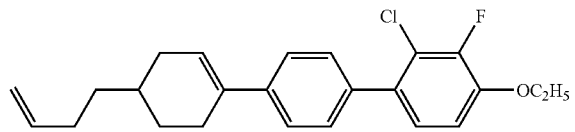 |
| 375 | 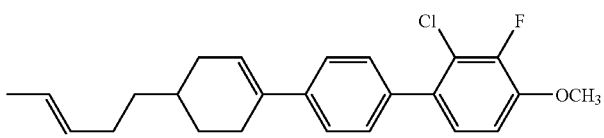 |
| 376 | 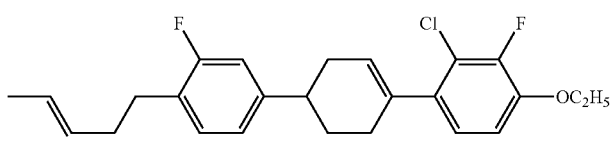 |
| 377 | 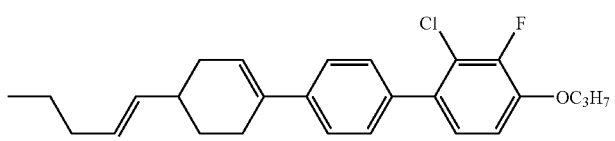 |
| 378 | 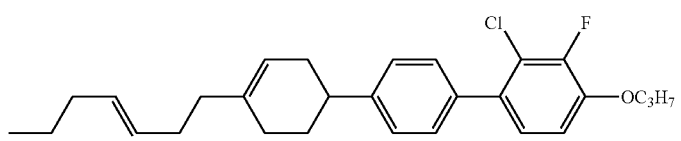 |
| 379 | 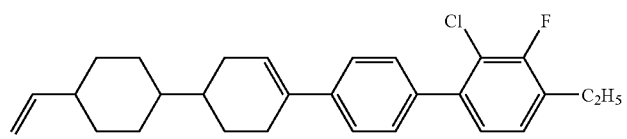 |
| 380 | 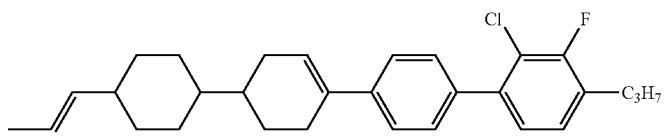 |
| 381 | 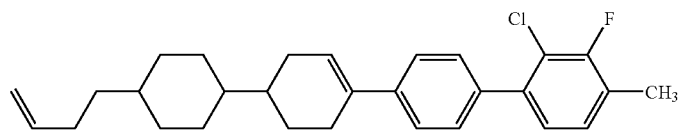 |
| 382 | 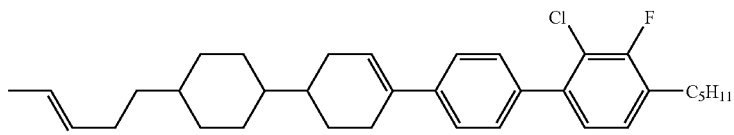 |
| 383 | 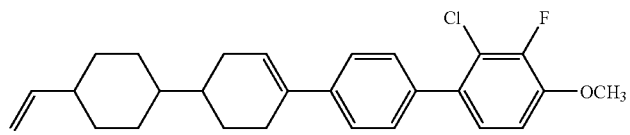 |

| No. |
|---|
| 384 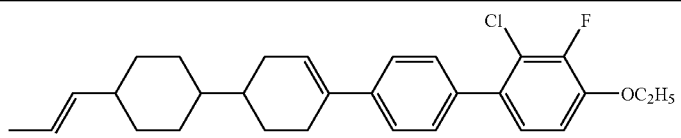 |
| 385 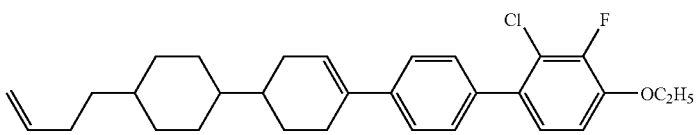 |
| 386 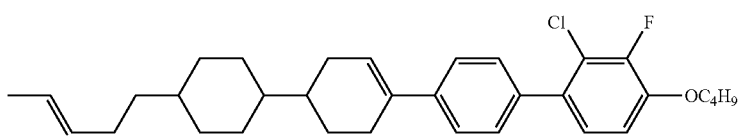 |
| 387 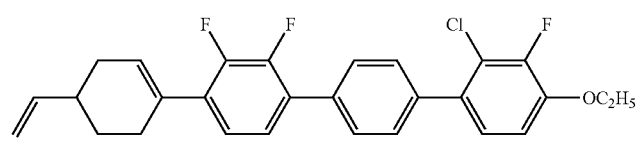 |
| 388 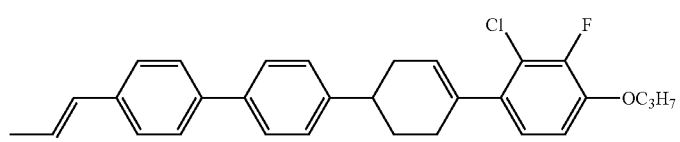 |
| 389 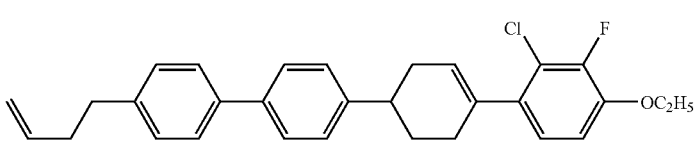 |
| 390 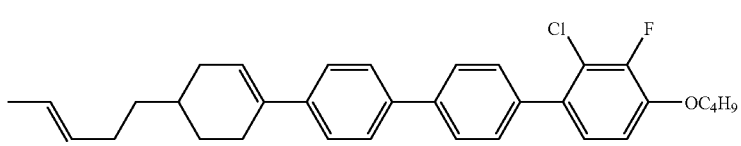 |
| 391 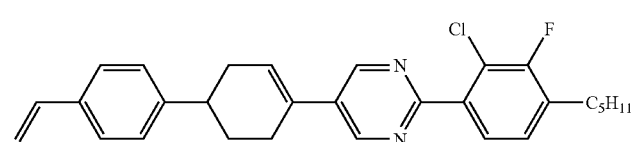 |
| 392 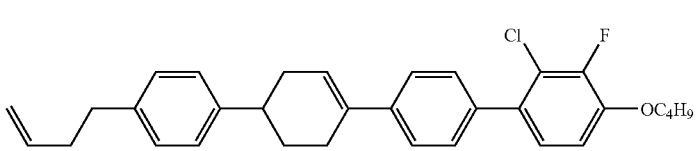 |
| 393 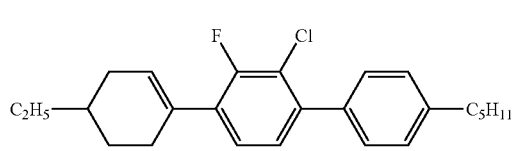 |
| 394 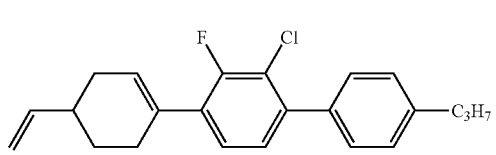 |

-continued
| No. | |
|---|---|
| 395 | 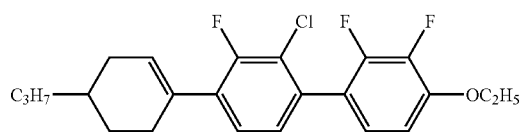 |
| 396 | 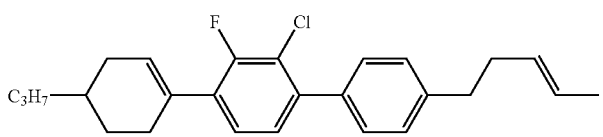 |
| 397 | 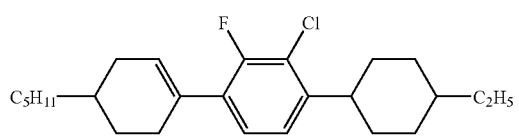 |
| 398 | 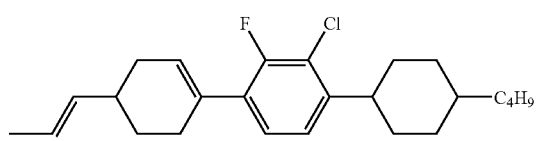 |
| 399 | 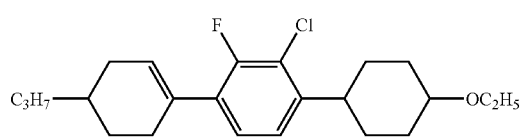 |
| 400 | 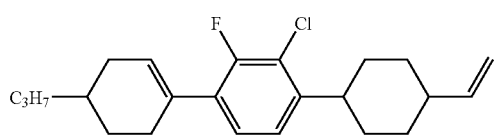 |
| 401 | 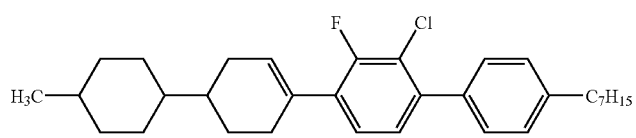 |
| 402 | 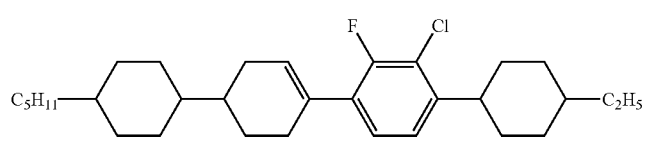 |
| 403 | 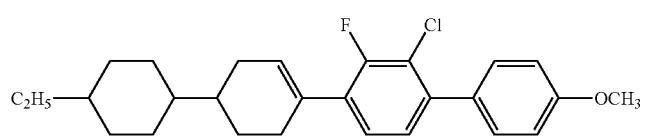 |
| 404 | 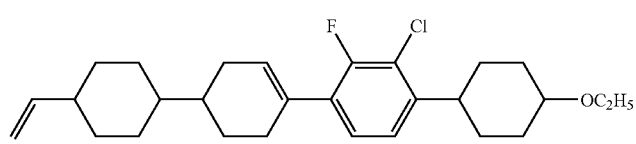 |
| 405 | 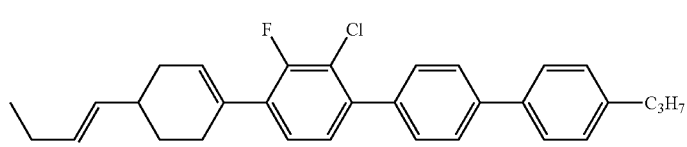 |

| No. |  |
|---|---|
| 406 | 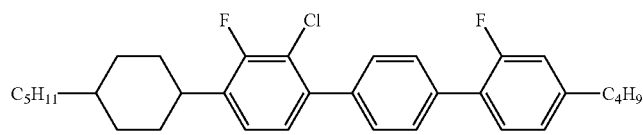 |
| 407 | 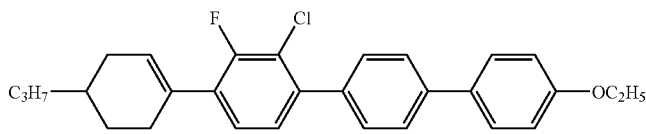 |
| 408 | 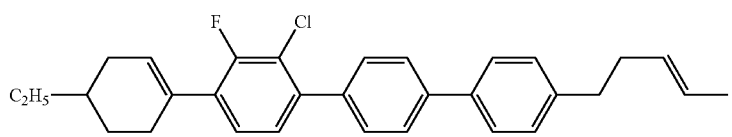 |
| 409 | 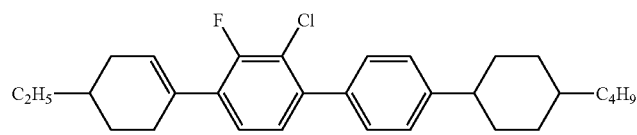 |
| 410 | 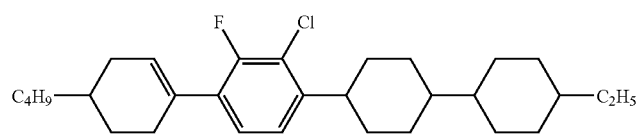 |
| 411 | 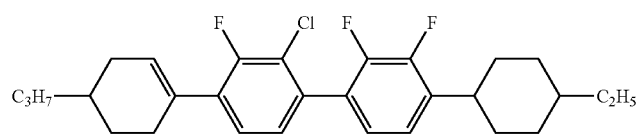 |
| 412 | 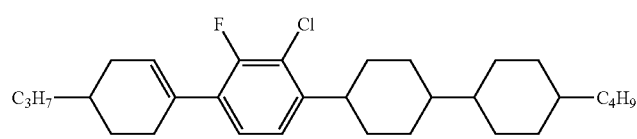 |
| 413 | 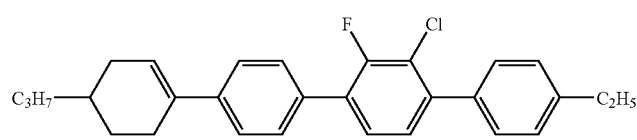 |
| 414 | 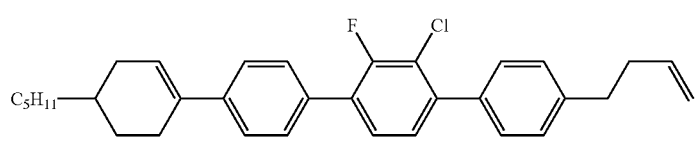 |
| 415 | 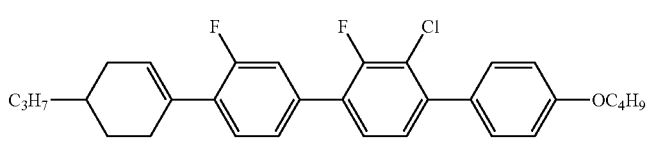 |
| 416 | 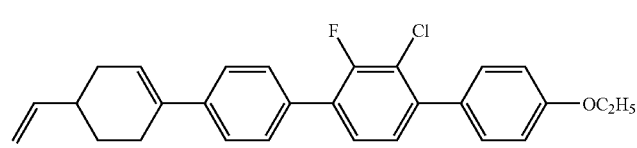 |

-continued
| No. | |
|---|---|
| 417 | 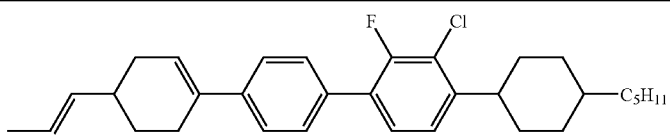 |
| 418 | 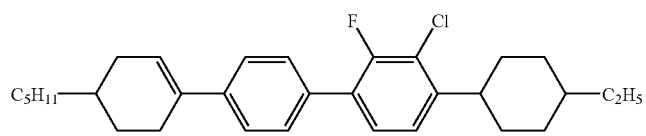 |
| 419 | 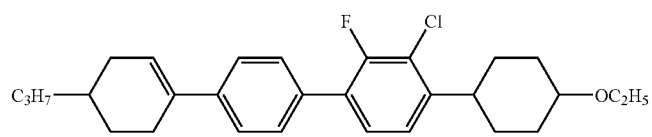 |
| 420 | 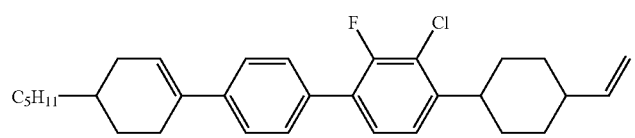 |
| 421 | 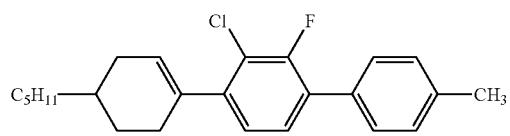 |
| 422 | 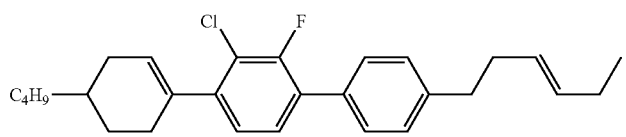 |
| 423 | 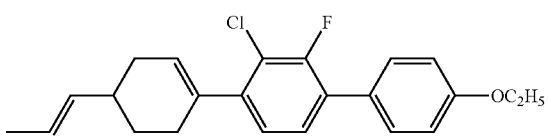 |
| 424 | 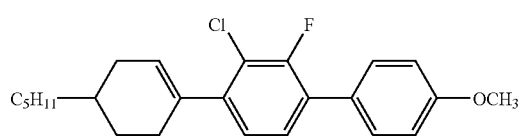 |
| 425 | 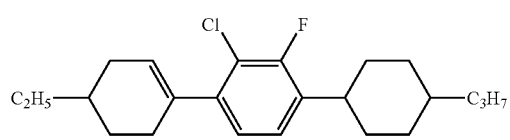 |
| 426 | 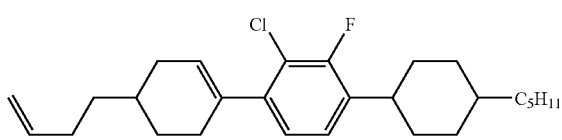 |
| 427 | 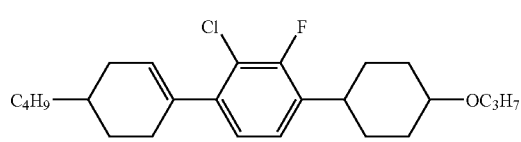 |

-continued
| No. |
|---|
| 428 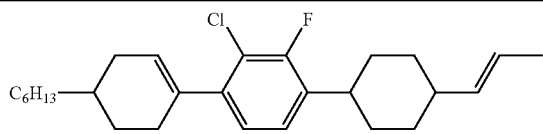 |
| 429 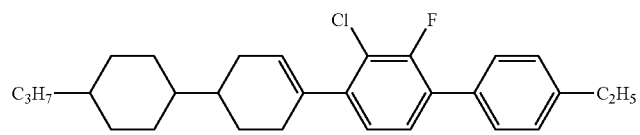 |
| 430 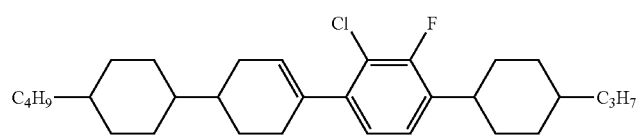 |
| 431 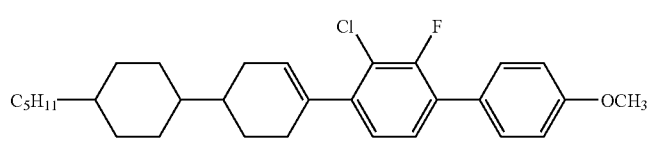 |
| 432 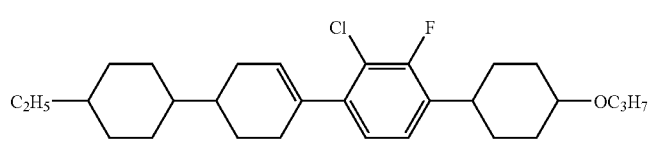 |
| 433 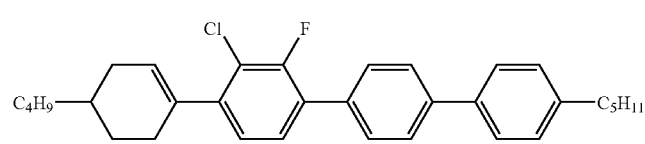 |
| 434 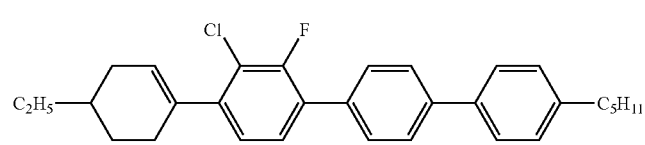 |
| 435 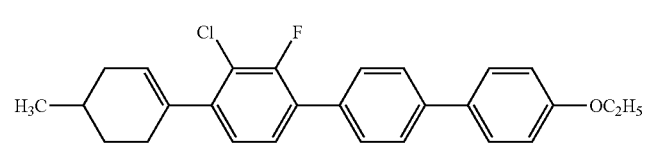 |
| 436 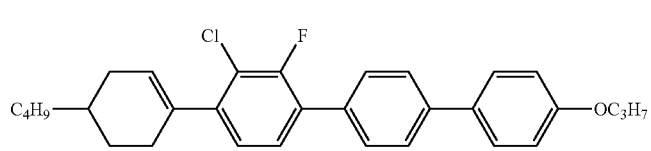 |
| 437 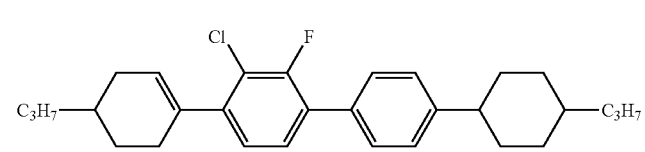 |
| 438 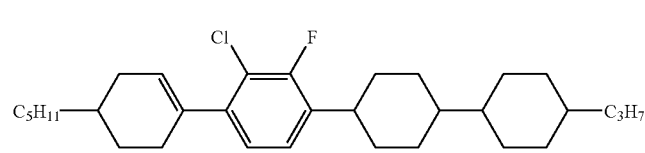 |

| No. | |
|---|---|
| 439 |  |
| 440 | 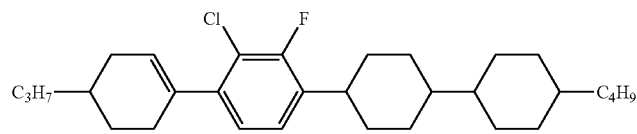 |
| 441 | 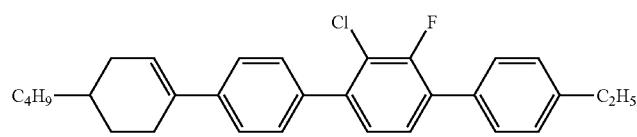 |
| 442 | 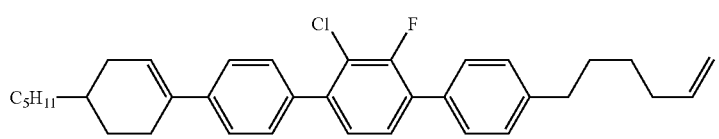 |
| 443 | 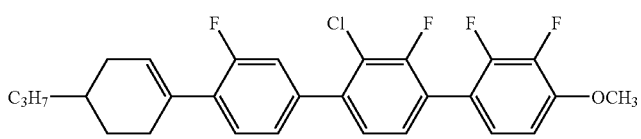 |
| 444 | 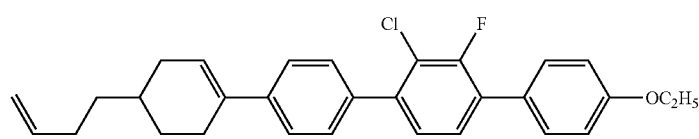 |
| 445 | 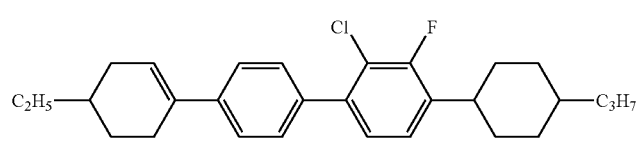 |
| 446 | 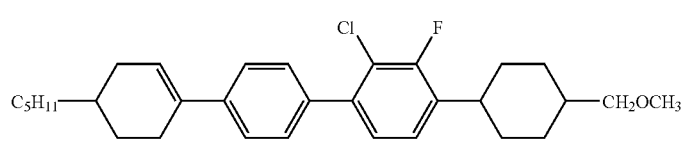 |
| 447 | 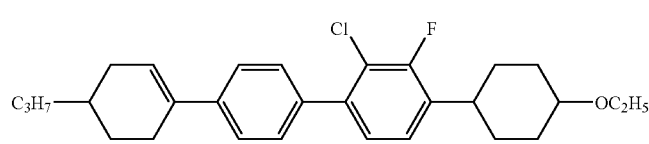 |
| 448 | 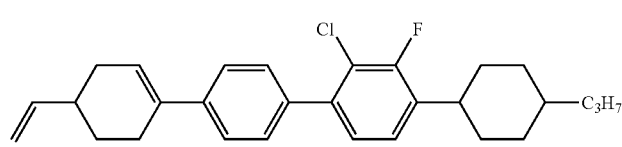 |
| 449 | 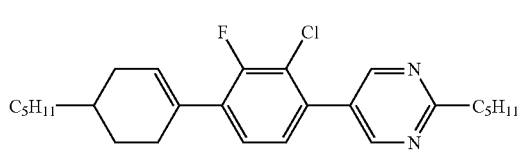 |

| No. | |
|---|---|
| 450 | 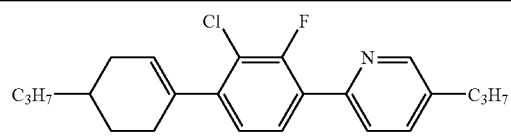 |
| 451 | 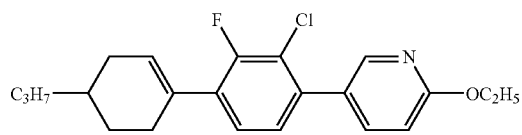 |
| 452 | 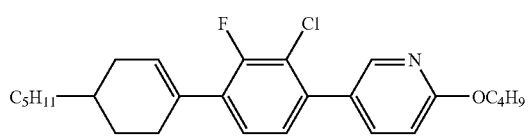 |
| 453 | 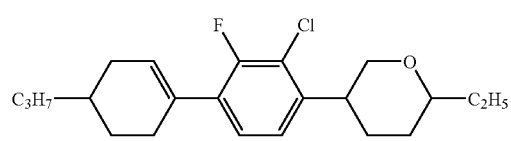 |
| 454 | 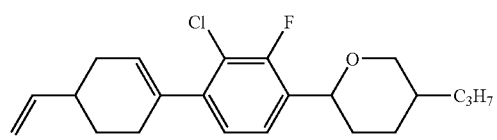 |
| 455 | 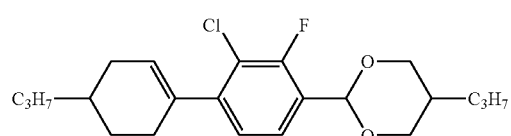 |
| 456 | 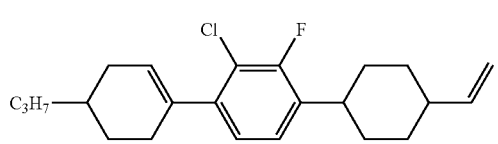 |
| 457 | 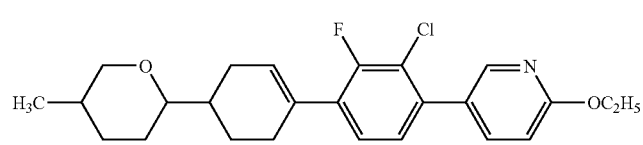 |
| 458 | 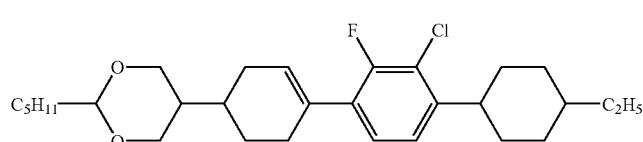 |
| 459 | 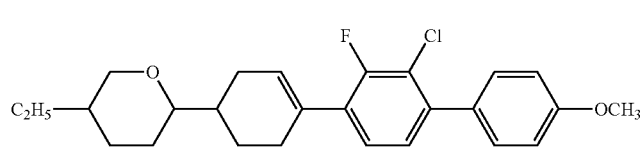 |
| 460 | 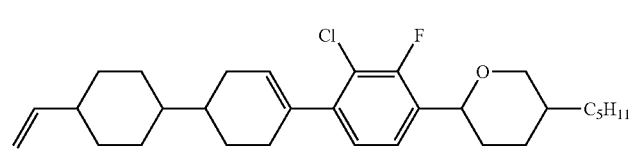 |

|  |
| --- |
| -continued |
| No. |
461
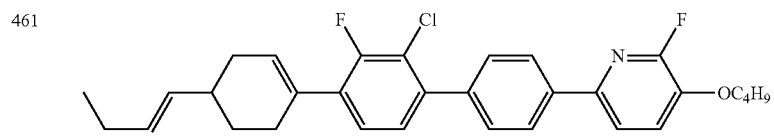
462
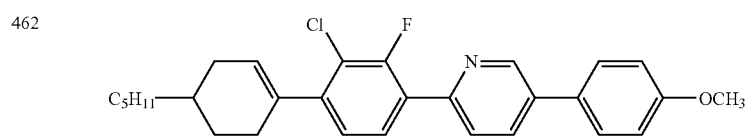
463
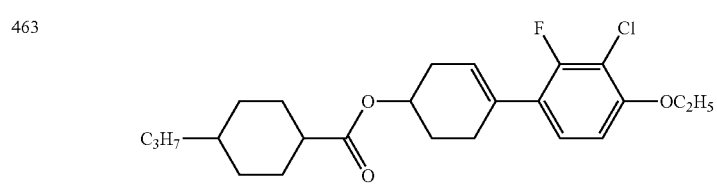
464
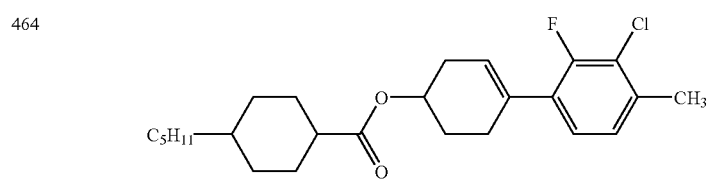
465
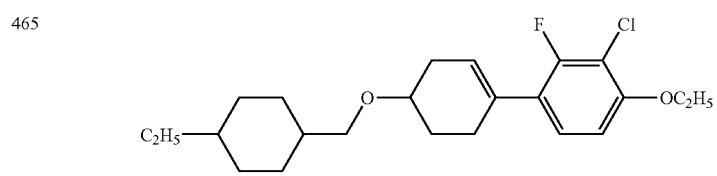
466
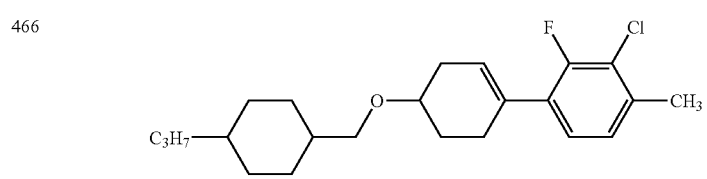
467
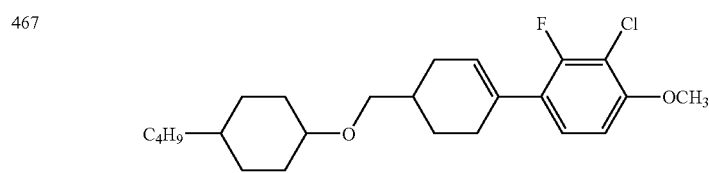
468
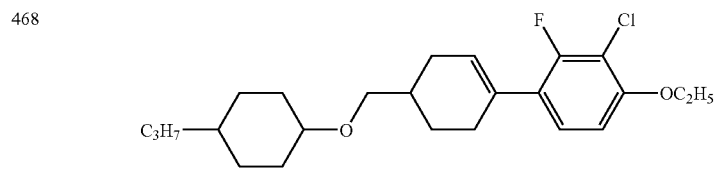
469
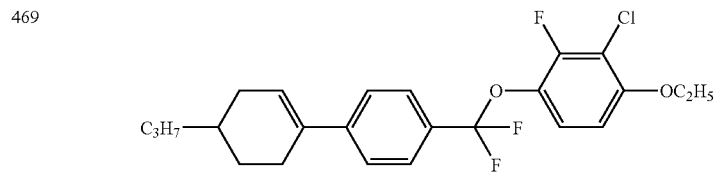

-continued
| No. | |
|---|---|
| 470 | 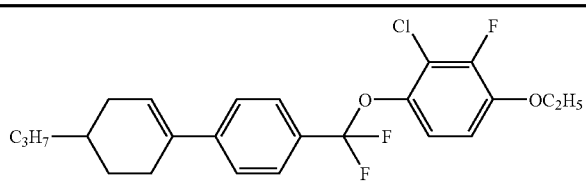 |
| 471 | 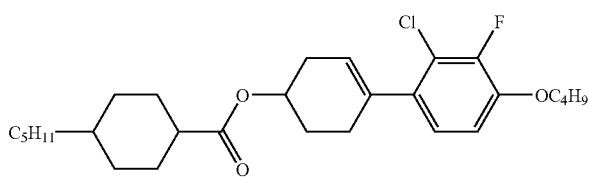 |
| 472 | 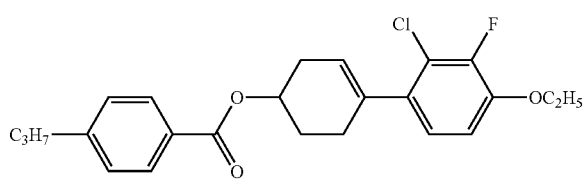 |
| 473 | 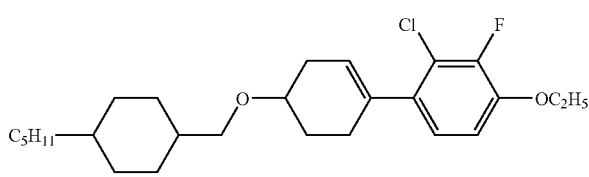 |
| 474 | 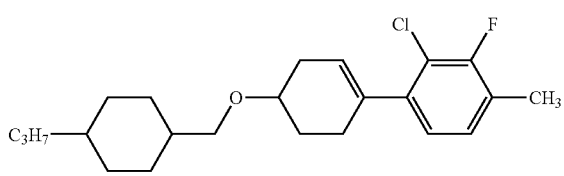 |
| 475 | 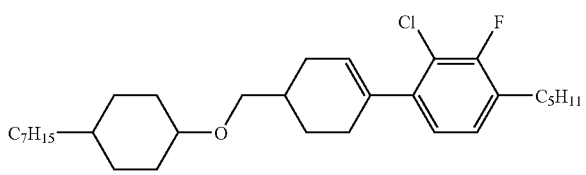 |
| 476 | 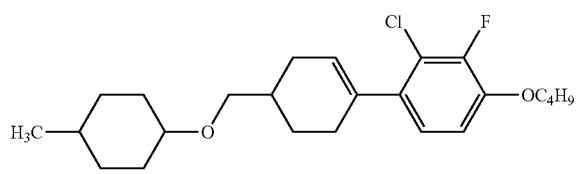 |
Comparative Example 1
As a comparative example, trans-4-(3-chloro-4-ethoxy-2-fluorophenyl)-trans-4'-propylbicyclohexyl (E) was synthesized, in which hydrogen at the 2-position of the benzene ring was replaced by fluorine, hydrogen at the 3-position was replaced by chlorine, and no cyclohexenylene group existed.
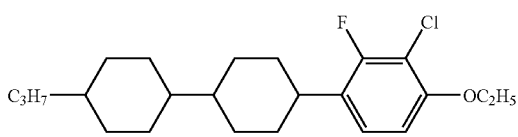
(E)

The five compounds described for the base mixtures (i-i) were mixed to prepare base mixtures (i-i) having a nematic phase. The base mixtures (i-i) had the following properties:

| | |
|---|---|
| Maximum Temperature ($T_{NI}$) | 74.0° C. |
| Optical Anisotropy ($\Delta n$) | 0.087 |
| Dielectric Anisotropy ($\Delta \epsilon$) | −1.3 |
| Viscosity ($\eta_{20}$) | 18.9 mPa·s |

A liquid crystal composition (ii) containing 85% by weight of the base mixtures (i-i) and 15% by weight of trans-4-(3-chloro-4-ethoxy-2-difluorophenyl)-trans-4'-propylbicyclohexyl (E) thus synthesized was prepared. The resulting liquid crystal composition (ii) was measured for properties, and the extrapolated values of the properties of the comparative compound (E) were calculated by extrapolating the measured values. The values thus obtained were as follows:

| | |
|---|---|
| Maximum Temperature ($T_{NI}$) | 146.5° C. |
| Optical Anisotropy ($\Delta n$) | 0.108 |
| Dielectric Anisotropy ($\Delta \epsilon$) | −5.5 |
| Viscosity ($\eta$) | 70.8 mPa·s |

The four compounds described for the base mixtures (i-ii) were mixed to prepare base mixtures (i-ii) having a nematic phase. The base mixtures (i-i) had the following current value after irradiation of ultraviolet light: Ultraviolet current (Juv) =0.64 µA.

A liquid crystal composition (iii) containing 85% by weight of the base mixtures (i-ii) and 15% by weight of trans-4-(3-chloro-4-ethoxy-2-difluorophenyl)-trans-4'-propylbicyclohexyl (E) thus synthesized was prepared. The resulting liquid crystal composition (iii) was measured for ultraviolet current (Juv): Ultraviolet current (Juv)=10.38 µA.

Comparative Example 2

As a comparative example, 2-chloro-1-ethoxy-3-fluoro-4-(trans-4-propylcyclohexyl)benzene (F) was synthesized, in which hydrogen at the 2-position of the benzene ring was replaced by fluorine, hydrogen at the 3-position was replaced by chlorine, and no cyclohexenylene group existed.

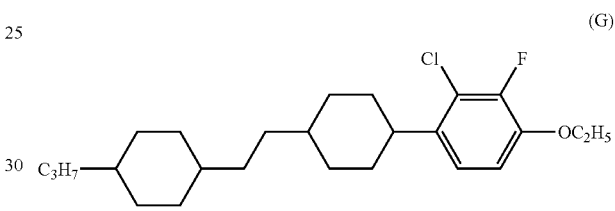

(F)

A liquid crystal composition (iv) containing 85% by weight of the base mixtures (i-i) and 15% by weight of 2-chloro-1-ethoxy-3-fluoro-4-(trans-4-propylcyclohexyl) benzene (F) thus synthesized was prepared. The resulting liquid crystal composition (iv) was measured for properties, and the extrapolated values of the properties of the comparative compound (F) were calculated by extrapolating the measured values. The values thus obtained were as follows:

| | |
|---|---|
| Maximum Temperature ($T_{NI}$) | 0.6° C. |
| Optical Anisotropy ($\Delta n$) | 0.065 |
| Dielectric Anisotropy ($\Delta \epsilon$) | −5.3 |
| Viscosity ($\eta$) | 51.0 mPa·s |

A liquid crystal composition (v) containing 85% by weight of the base mixtures (i-ii) and 15% by weight of 2-chloro-1-ethoxy-3-fluoro-4-(trans-4-propylcyclohexyl)benzene (F) thus synthesized was prepared. The resulting liquid crystal composition (v) was measured for ultraviolet current (Juv): Ultraviolet current (Juv)=11.83 µA.

Comparative Example 3

As a comparative example, 2-chloro-4-ethoxy-3-fluoro-1-(4-(2-(trans-4-propylcyclohexyl)ethyl)cyclohexyl)benzene (G) was synthesized, in which hydrogen at the 2-position of the benzene ring was replaced by chlorine, hydrogen at the 3-position was replaced by fluorine, and no cyclohexenylene group existed.

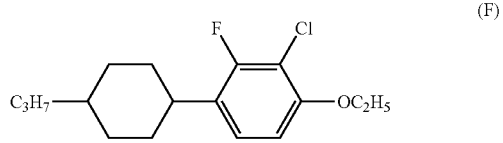

(G)

A liquid crystal composition (vi) containing 85% by weight of the base mixtures (i-i) and 15% by weight of 2-chloro-4-ethoxy-3-fluoro-1-(4-(2-(trans-4-propylcyclohexyl)ethyl)cyclohexyl)benzene (G) thus synthesized, and a liquid crystal composition (vii) containing 90% by weight of the base mixtures (i-i) and 10% by weight of 2-chloro-4-ethoxy-3-fluoro-1-(4-(2-(trans-4-propylcyclohexyl)ethyl) cyclohexyl)benzene (G) thus synthesized were prepared. The liquid crystal compositions (vi) and (vii) were stored in a freezer at −10° C. for 30 days. The liquid crystal composition (vi) suffered deposition of crystals, and the liquid crystal composition (vii) maintained a nematic phase.

Example 8

Properties of Liquid Crystal Compound (No. 74)

A liquid crystal composition (viii) containing 85% by weight of the base mixtures (i-i) and 15% by weight of 4-(3-chloro-4-ethoxy-2-fluorophenyl)-trans-4'-propylbicyclohexyl-3-ene (No. 74) obtained in Example 2 was prepared. The resulting liquid crystal composition (viii) was measured for properties, and the extrapolated values of the properties of the liquid crystal compound (No. 74) were calculated by extrapolating the measured values. The values thus obtained were as follows:

| | |
|---|---|
| Maximum Temperature ($T_{NI}$) | 145.6° C. |
| Optical Anisotropy ($\Delta n$) | 0.127 |
| Dielectric Anisotropy ($\Delta \epsilon$) | −5.1 |
| Viscosity ($\eta$) | 63.5 mPa·s |

It was understood from the results that the liquid crystal compound (No. 74) had a high maximum temperature ($T_{NI}$), a large optical anisotropy (Δn) and a negatively large dielectric anisotropy (Δε).

It was also understood that the liquid crystal compound (No. 74) had a maximum temperature of a nematic phase ($T_{NI}$) that was equivalent to the comparative compound (E), but had a larger optical anisotropy (Δn) and a smaller viscosity (η) than the comparative compound (E).

A liquid crystal composition (ix) containing 85% by weight of the base mixtures (i-ii) and 15% by weight of 4-(3-chloro-4-ethoxy-2-fluorophenyl)-trans-4'-propylbicyclohexyl-3-ene (No. 74) obtained in Example 2 was prepared. The resulting liquid crystal composition (ix) was measured for ultraviolet current (Juv): Ultraviolet current (Juv)=2.04 μA It was understood that the liquid crystal compound (No. 74) had a smaller ultraviolet current (Juv) than Comparative Example 1 and thus was excellent in resistance to light.

Example 9

Properties of Liquid Crystal Compound (No. 18)

A liquid crystal composition (x) containing 85% by weight of the base mixtures (i-i) and 15% by weight of 2-chloro-1-ethoxy-3-fluoro-4-(4-propylcyclohexa-1-enyl)benzene (No. 18) obtained in Example 7 was prepared. The resulting liquid crystal composition (x) was measured for properties, and the extrapolated values of the properties of the liquid crystal compound (No. 18) were calculated by extrapolating the measured values. The values thus obtained were as follows:

| | |
|---|---|
| Maximum Temperature ($T_{NI}$) | −1.4° C. |
| Optical Anisotropy (Δn) | 0.087 |
| Dielectric Anisotropy (Δε) | −5.3 |
| Viscosity (η) | 47.7 mPa·s |

It was understood from the results that the liquid crystal compound (No. 18) had a negatively large dielectric anisotropy (Δε).

It was also understood that the liquid crystal compound (No. 18) had a maximum temperature of a nematic phase ($T_{NI}$) that was equivalent to the comparative compound (F), but had a larger optical anisotropy (Δn) and a smaller viscosity (η) than the comparative compound (F).

A liquid crystal composition (xi) containing 85% by weight of the base mixtures (i-ii) and 15% by weight of 2-chloro-1-ethoxy-3-fluoro-4-(4-propylcyclohexa-1-enyl) benzene (No. 18) obtained in Example 6 was prepared. The resulting liquid crystal composition (xi) was measured for ultraviolet current (Juv): Ultraviolet current (Juv)=1.54 μA.

It was understood that the liquid crystal compound (No. 18) had a smaller ultraviolet current (Juv) than the comparative compound (F) and thus was excellent in resistance to light.

Example 10

Low Temperature Compatibility of Liquid Crystal Compound (No. 103)

A liquid crystal composition (xii) containing 85% by weight of the base mixtures (i-i) and 15% by weight of 2-chloro-4-ethoxy-3-fluoro-1-(4-(2-(trans-4-propylcyclohexyl)-2-ethyl)-cyclohexa-1-enyl) benzene (No. 103) obtained in Example 3 was prepared. The liquid crystal composition (xii) was stored in a freezer at −10° C. for 30 days, and the liquid crystal composition (xii) maintained a nematic phase.

It was understood that the liquid crystal compound (No. 103) was excellent in low temperature compatibility as compared to the comparative compound (G).

Examples of Liquid Crystal Composition

The invention will be explained in detail by way of Examples. The compounds used in the Examples are expressed by the symbols according to the definition in Table 1. In Table 1, the configuration of 1,4-cyclohexylene is trans. The ratios (percentages) of the liquid crystal compounds are percentages by weight (% by weight) based on total weight of the liquid crystal composition. The characteristics of the composition are shown at the last of the Examples.

The numbers next to the liquid crystal compounds used in the Examples correspond to the number of the liquid crystal compounds used as the first to third components of the invention. The symbol (-) means a liquid crystal compound that does not correspond to the components but means other compounds.

A method of description of compounds using symbols is shown below.

TABLE 1

Method of Description of Compound using Symbols.
R—($A_1$)—$Z_1$—...—$Z_n$—($A_n$)—R'

| 1) Left Terminal Group R— | Symbol |
|---|---|
| $C_nH_{2n+1}$— | n- |
| $C_nH_{2n+1}O$— | nO- |
| $C_mH_{2m+1}OC_nH_{2n}$— | mOn- |
| $CH_2$=CH— | V- |
| $C_nH_{2n+1}CH$=CH— | nV- |
| $CH_2$=CH—$C_nH_{2n}$— | Vn- |

| 2) Ring Structure —$A_n$— | Symbol |
|---|---|
| 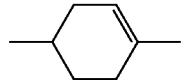 | Ch |
| 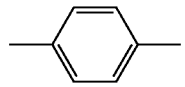 | B |
| 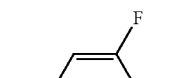 | B(3F) |
| 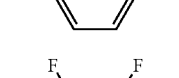 | B(2F,3F) |
|  | B(2F,3Cl) |

TABLE 1-continued

Method of Description of Compound using Symbols.
R—(A$_1$)—Z$_1$— ... —Z$_n$—(A$_n$)—R'

| | Symbol |
|---|---|
| 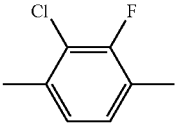 | B(2Cl,3F) |
| 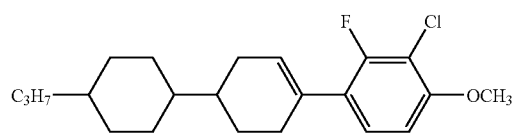 | H |

| 3) Bonding group —Z$_n$— | Symbol |
|---|---|
| —C$_2$H$_4$— | 2 |
| —CH$_2$O— | 10 |
| —OCH$_2$— | 01 |
| —COO— | E |
| —OCO— | Er |
| —CF$_2$O— | CF$_2$O |
| —OCF$_2$C$_2$H$_4$— | OCF$_2$2 |

| 4) Right Terminal Group —R' | Symbol |
|---|---|
| —C$_n$H$_{2n+1}$ | -n |
| —OC$_n$H$_{2n+1}$ | -On |
| —C$_n$H$_{2n}$OC$_m$H$_{2m+1}$ | -nOm |
| —CH=CH$_2$ | -V |
| —CH=CHC$_n$H$_{2n+1}$ | -Vn |

5) Example of Description

Example 1 3-HChB(2F,3Cl)-O1

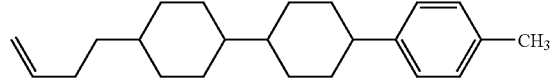

Example 2 V2-HBB-1

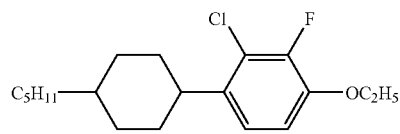

Example 3 5-HB(2Cl,3F)-O2

Measurement of the characteristics was carried out according to the following methods. Most methods are described in the Standard of Electric Industries Association of Japan, EIAJ•ED-2521 A or those with some modifications.

(1) Maximum Temperature of a Nematic Phase (NI; ° C.): A sample was placed on a hot plate in a melting point measuring apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

(2) Minimum Temperature of a Nematic Phase (Tc; ° C.): A sample having a nematic phase was stored in a freezer at temperatures of 0° C., −10° C., −20° C., −30° C. and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

(3) Optical Anisotropy (Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. A refractive index (n∥) where the direction of a polarized light was parallel to that of the rubbing and a refractive index (n⊥) where the direction of a polarized light was perpendicular to that of the rubbing were measured. A value of optical anisotropy (Δn) was calculated from the equation: (Δn)=(n∥)−(n⊥).

(4) Viscosity (η; measured at 20° C.; mPa·s): A viscosity was measured by means of an E-type viscometer.

(5) Dielectric Anisotropy (Δ∈; measured at 25° C.): A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A VA device having a distance (cell gap) of 20 μm was fabricated with two glass substrates. A polyimide orientation film was prepared on a glass substrate in the same manner. The resulting orientation film on the glass substrate was subjected to a rubbing treatment, and then a TN device having a distance between two glass substrates of 9 μm and a twist angle of 80° was fabricated. A sample (a liquid crystal composition or a mixture of a liquid crystal composition and base mixtures) was charged in the VA device, and sine waves (0.5 V, 1 kHz) were applied to the device to measure a dielectric constant (∈∥) in the major axis direction of the liquid crystal molecule. A sample (a liquid crystal composition or a mixture of a liquid crystal compound and base mixtures) was charged in the TN device, and sine waves (0.5 V, 1 kHz) were applied to the device to measure a dielectric constant (∈⊥) in the minor axis direction of the liquid crystal molecule. A value of a dielectric anisotropy was calculated from the equation: Δ∈=∈∥−∈⊥.

(6) Voltage Holding Ratio (VHR; measured at 25° C. and 100° C.; %): A sample was charged to a cell having a polyimide orientation film and a distance (cell gap) between two glass substrate of 6 μm to fabricate a TN device. The TN device was applied and charged with pulse voltage (60 microseconds at 5 V). The waveform of the voltage applied to the TN device was observed with cathode ray oscilloscope, and an area between the voltage curve and the horizontal axis in a unit cycle (16.7 milliseconds) was obtained. The area was similarly obtained from the waveform of the voltage applied after removing the TN device. The value of a voltage holding ratio (%) was calculated from the equation: (voltage holding ratio)=(area with TN device)/(area without TN device).

The voltage holding ratio thus obtained is expressed as "VHR-1." The TN device was then heated to 100° C. for 250 hours. The TN device was cooled to 25° C., and then the voltage holding ratio was measured in the same manner as above. The voltage holding ratio obtained after conducting the heating test is expressed as "VHR-2." The heating test is an accelerating test used as a test corresponding to a long-term durability test of a TN device.

Comparative Example 4

The following composition was prepared as a comparative example. The basis of the selection of the composition as a comparative example is that the composition contains the compound (2-1), the compound (3-7), the compound (3-29) and the compound (3-33). The composition had the following characteristics.

| | | |
|---|---|---|
| 3-HH-4 | (2-1) | 12% |
| 3-HH—V | (2-1) | 24% |
| 3-HB(2F,3Cl)—O2 | (3-7) | 15% |
| 5-HB(2F,3Cl)—O2 | (3-7) | 14% |
| 3-HHB(2F,3Cl)—O2 | (3-29) | 5% |
| 4-HHB(2F,3Cl)—O2 | (3-29) | 5% |
| 5-HHB(2F,3Cl)—O2 | (3-29) | 5% |
| 3-HBB(2F,3Cl)—O2 | (3-33) | 10% |
| 5-HBB(2F,3Cl)—O2 | (3-33) | 10% |

NI=69.9° C.; Tc≦−10° C.; Δn=0.081; η=32.3 mPa·s; Δ∈=−2.8.

Example 11

The composition of Example 11 had a negatively large dielectric anisotropy and a large optical anisotropy as compared to the composition of Comparative Example 4.

| | | |
|---|---|---|
| 3-HChB(2F,3Cl)—O2 | (No. 74) | 5% |
| 4-HChB(2F,3Cl)—O2 | (No. 78) | 5% |
| 5-HChB(2F,3Cl)—O2 | (No. 80) | 5% |
| 3-HH-4 | (2-1) | 12% |
| 3-HH—V | (2-1) | 24% |
| 3-HB(2F,3Cl)—O2 | (3-7) | 15% |
| 5-HB(2F,3Cl)—O2 | (3-7) | 14% |
| 3-HBB(2F,3Cl)—O2 | (3-33) | 10% |
| 5-HBB(2F,3Cl)—O2 | (3-33) | 10% |

NI=70.7° C.; Δn=0.084; η=33.7 mPa·s; Δ∈=−3.0.

Example 12

The composition of Example 12 had a negatively large dielectric anisotropy and a large optical anisotropy as compared to the composition of Comparative Example 4.

| | | |
|---|---|---|
| 3-HChB(2F,3Cl)—O2 | (No. 74) | 6% |
| 4-HChB(2F,3Cl)—O2 | (No. 78) | 6% |
| 5-HChB(2F,3Cl)—O2 | (No. 80) | 6% |
| 3-ChB(2F,3Cl)—O2 | (No. 18) | 15% |
| 5-ChB(2F,3Cl)—O2 | (No. 23) | 14% |
| 3-HH-4 | (2-1) | 12% |
| 3-HH—V | (2-1) | 21% |
| 3-HBB(2F,3Cl)—O2 | (3-33) | 10% |
| 5-HBB(2F,3Cl)—O2 | (3-33) | 10% |

NI=68.3° C.; Δn=0.088; η=32.8 mPa·s; Δ∈=−3.2.

Example 13

The composition of Example 13 had a negatively large dielectric anisotropy, a large optical anisotropy and a low minimum temperature of a nematic phase, as compared to the composition of Comparative Example 4.

| | | |
|---|---|---|
| 4-HChB(2F,3Cl)—O2 | (No. 78) | 5% |
| 5-HChB(2F,3Cl)—O2 | (No. 80) | 5% |
| 3-ChB(2F,3Cl)—O2 | (No. 18) | 10% |
| 5-ChB(2F,3Cl)—O2 | (No. 23) | 14% |
| 3-HChB(2Cl,3F)—O2 | (No. 102) | 5% |
| 3-ChB(2Cl,3F)—O2 | (No. 46) | 5% |
| 3-HH-4 | (2-1) | 12% |
| 3-HH—V | (2-1) | 24% |
| 3-HBB(2F,3Cl)—O2 | (3-33) | 10% |
| 5-HBB(2F,3Cl)—O2 | (3-33) | 10% |

NI=65.8° C.; Tc≦−20° C.; Δn=0.083; η=33.0 mPa·s; Δ∈=−3.1.

Example 14

| | | |
|---|---|---|
| 3-HChB(2F,3Cl)—O2 | (No. 74) | 4% |
| 4-HChB(2F,3Cl)—O2 | (No. 78) | 4% |
| 5-HChB(2F,3Cl)—O2 | (No. 80) | 4% |
| 3-HH—V | (2-1) | 16% |
| 3-HH—V1 | (2-1) | 8% |
| V-HHB-1 | (2-25) | 2% |
| 3-H2B(2F,3F)—O2 | (3-3) | 19% |
| 5-H2B(2F,3F)—O2 | (3-3) | 19% |
| 3-HBB(2F,3Cl)—O2 | (3-33) | 12% |
| 5-HBB(2F,3Cl)—O2 | (3-33) | 12% |

NI=71.6° C.; Δn=0.096; η=24.8 mPa·s; Δ∈=−3.6.

Example 15

| | | |
|---|---|---|
| 3-HChB(2F,3Cl)—O2 | (No. 74) | 5% |
| 5-HChB(2F,3Cl)—O2 | (No. 80) | 5% |
| 3-ChB(2F,3Cl)—O2 | (No. 18) | 10% |
| 5-ChB(2F,3Cl)—O2 | (No. 23) | 10% |
| 3-HH-4 | (2-1) | 10% |
| 3-HB—O2 | (2-4) | 20% |
| 5-HB(2F,3F)—O2 | (3-1) | 10% |
| 2-HHB(2F,3F)-1 | (3-19) | 5% |
| 3-HHB(2F,3F)—O2 | (3-19) | 15% |
| 5-HHB(2F,3F)—O2 | (3-19) | 10% |

NI=74.5° C.; Tc≦−20° C.; Δn=0.089; η=28.7 mPa·s; Δ∈=−3.9.

Example 16

| | | |
|---|---|---|
| 3-HChB(2F,3Cl)—O2 | (No. 74) | 5% |
| 4-HChB(2F,3Cl)—O2 | (No. 78) | 5% |
| 5-HChB(2F,3Cl)—O2 | (No. 80) | 5% |
| 3-ChB(2F,3Cl)—O2 | (No. 18) | 7% |
| 5-ChB(2F,3Cl)—O2 | (No. 23) | 8% |
| 3-ChBB(2F,3Cl)—O2 | (No. 130) | 5% |
| 3-HChB(2Cl,3F)—O2 | (No. 102) | 5% |
| 3-ChB(2Cl,3F)—O2 | (No. 46) | 5% |
| 3-ChBB(2Cl,3F)—O2 | (No. 158) | 8% |
| 3-HH—V | (2-1) | 10% |
| 2-H2H-3 | (2-2) | 5% |
| 3-HB—O2 | (2-4) | 5% |
| 3-HHB-1 | (2-25) | 5% |
| V-HHB-1 | (2-25) | 5% |
| 3-HBB-2 | (2-35) | 4% |
| 2-BB(3F)B-3 | (2-44) | 5% |
| V2-BB(3F)B-1 | (2-44) | 5% |
| 5-HBB(3F)B-2 | (2-73) | 3% |

NI=89.5° C.; Δn=0.128; η=34.6 mPa·s; Δ∈=−3.0.

Example 17

| | | |
|---|---|---|
| 3-HChB(2F,3Cl)—O2 | (No. 74) | 5% |
| 3-ChB(2F,3Cl)—O2 | (No. 18) | 10% |
| 5-ChB(2F,3Cl)—O2 | (No. 23) | 10% |
| 5-ChBB(2F,3Cl)—O2 | (No. 136) | 5% |
| 3-HChB(2Cl,3F)—O2 | (No. 102) | 5% |
| 5-HChB(2Cl,3F)—O2 | (No. 108) | 5% |
| 3-ChB(2Cl,3F)—O2 | (No. 46) | 10% |
| 3-ChBB(2Cl,3F)—O2 | (No. 158) | 5% |
| 3-HH-5 | (2-1) | 9% |
| 3-HH—V1 | (2-1) | 10% |
| 3-HH—O1 | (2-1) | 5% |
| 3-HHB—O1 | (2-25) | 5% |
| 2-BBB(2F)-3 | (2-43) | 5% |
| 3-HHEH-3 | (2-46) | 3% |
| 3-HHEH-5 | (2-46) | 3% |
| 3-HHEBH-3 | (2-74) | 5% |

NI=84.3° C.; Δn=0.099; η=34.5 mPa·s; ΔЄ=−3.0.

Example 18

| | | |
|---|---|---|
| 3-HChB(2F,3Cl)—O2 | (No. 74) | 5% |
| 3-ChB(2F,3Cl)—O2 | (No. 18) | 8% |
| 3-ChBB(2F,3Cl)—O2 | (No. 130) | 5% |
| 3-HChB(2Cl,3F)—O2 | (No. 102) | 5% |
| 3-ChB(2Cl,3F)—O2 | (No. 46) | 7% |
| 3-HH—V1 | (2-1) | 10% |
| V-HHB-1 | (2-25) | 10% |
| 5-HBB(3F)B-3 | (2-73) | 5% |
| 3-HHEBH-5 | (2-74) | 5% |
| 3-HB(2F,3F)—O2 | (3-1) | 10% |
| 3-H2B(2F,3F)—O2 | (3-3) | 10% |
| 3-HHB(2F,3F)—O2 | (3-19) | 5% |
| 3-HH2B(2F,3F)—O2 | (3-20) | 5% |
| 2-HBB(2F,3F)—O2 | (3-23) | 5% |
| 2-BB(2F,3F)B-3 | (3-27) | 5% |

NI=93.6° C.; Δn=0.115; η=31.4 mPa·s; ΔЄ=−3.6.

Example 19

| | | |
|---|---|---|
| 5-HChB(2F,3Cl)—O2 | (No. 80) | 5% |
| 3-ChB(2F,3Cl)—O2 | (No. 18) | 10% |
| 5-ChB(2F,3Cl)—O2 | (No. 23) | 10% |
| 3-ChBB(2F,3Cl)—O2 | (No. 130) | 5% |
| 5-HChB(2Cl,3F)—O2 | (No. 108) | 5% |
| 3-ChB(2Cl,3F)—O2 | (No. 46) | 10% |
| 3-ChBB(2Cl,3F)—O2 | (No. 158) | 5% |
| 3-HH—V1 | (2-1) | 5% |
| 3-HHB-1 | (2-25) | 10% |
| 2-BB(3F)B-3 | (2-44) | 5% |
| 5-HBB(3F)B-2 | (2-73) | 5% |
| 3-HB(2F,3Cl)—O2 | (3-7) | 10% |
| 5-HB(2F,3Cl)—O2 | (3-7) | 5% |
| 3-HHB(2F,3Cl)—O2 | (3-29) | 5% |
| 3-HBB(2F,3Cl)—O2 | (3-33) | 5% |

NI=78.3° C.; Δn=0.119; η=46.6 mPa·s; ΔЄ=−4.1.

Example 20

| | | |
|---|---|---|
| 5-HChB(2F,3Cl)—O2 | (No. 80) | 7% |
| 3-ChB(2F,3Cl)—O2 | (No. 18) | 10% |
| 3-ChBB(2F,3Cl)—O2 | (No. 130) | 5% |
| 3-HChB(2Cl,3F)—O2 | (No. 102) | 5% |
| 3-ChB(2Cl,3F)—O2 | (No. 46) | 10% |
| 5-ChBB(2Cl,3F)—O2 | (No. 164) | 5% |
| 3-HBB-2 | (2-35) | 10% |
| 2-BBB(2F)-3 | (2-43) | 5% |
| 2-BB(3F)B-3 | (2-44) | 5% |
| 5-HBB(3F)B-2 | (2-73) | 5% |
| 3-HHEBH-5 | (2-74) | 7% |
| 3-HB(2Cl,3F)—O2 | (3-13) | 7% |
| 5-HB(2Cl,3F)—O2 | (3-13) | 7% |
| 3-HHB(2Cl,3F)—O2 | (3-39) | 5% |
| 3-HBB(2Cl,3F)—O2 | (3-43) | 7% |

NI=99.6° C.; Δn=0.136; η=48.3 mPa·s; ΔЄ=−3.5.

Example 21

| | | |
|---|---|---|
| 3-HChB(2F,3Cl)—O2 | (No. 74) | 5% |
| 5-ChB(2F,3Cl)—O2 | (No. 23) | 10% |
| 3-ChBB(2F,3Cl)—O2 | (No. 130) | 5% |
| 3-HChB(2Cl,3F)—O2 | (No. 102) | 5% |
| 3-ChB(2Cl,3F)—O2 | (No. 46) | 5% |
| 3-ChBB(2Cl,3F)—O2 | (No. 158) | 5% |
| 5-HH—V | (2-1) | 5% |
| 5-HBB(3F)B-2 | (2-73) | 5% |
| 3-HHEBH-3 | (2-74) | 5% |
| 3-H2B(2F,3F)—O2 | (3-3) | 10% |
| 3-HB(2F,3Cl)—O2 | (3-7) | 10% |
| 3-HB(2Cl,3F)—O2 | (3-13) | 10% |
| 3-HHB(2F,3Cl)—O2 | (3-29) | 5% |
| 3-HHB(2Cl,3F)—O2 | (3-39) | 5% |
| 3-HBB(2F,3Cl)—O2 | (3-33) | 5% |
| 5-HBB(2F,3Cl)—O2 | (3-33) | 5% |

NI=82.6° C.; Δn=0.109; η=49.4 mPa·s; ΔЄ=−4.6.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal compound comprising a compound selected from a group of compounds represented by formula (a):

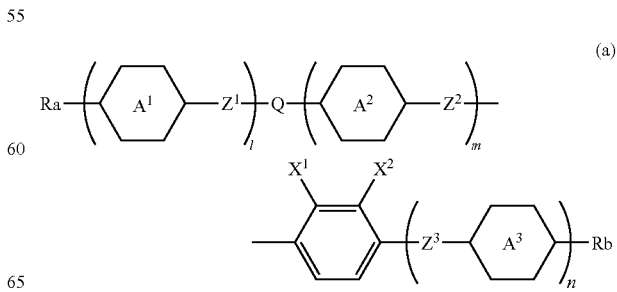

wherein Ra and Rb are each independently linear alkyl having 1 to 10 carbons, linear alkoxy having 1 to 9 carbons, linear alkoxyalkyl having 2 to 9 carbons, linear alkenyl having 2 to 10 carbons, linear alkenyloxy having 2 to 9 carbons;

ring $A^1$, ring $A^2$ and ring $A^3$ are each independently trans-1,4-cyclohexylene or 1,4-phenylene;

$Z^1$, $Z^2$ and $Z^3$ are each independently a single bond or —$(CH_2)_2$—;

l, m and n are each independently 0, 1 or 2, provided that l+m+n is 0, 1, 2 or 3; one of $X^1$ and $X^2$ is fluorine, and the other is chlorine;

Q is

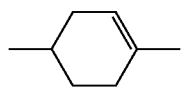

and atoms comprising the compound each may be an isotope thereof.

2. A liquid crystal compound selected from a group of compounds represented by formula (a-1):

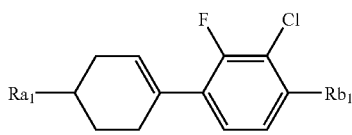

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons.

3. A liquid crystal compound selected from a group of compounds represented by formula (b-1):

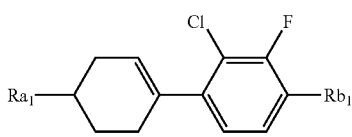

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons.

4. A liquid crystal compound selected from a group of compounds represented by formula (a-2):

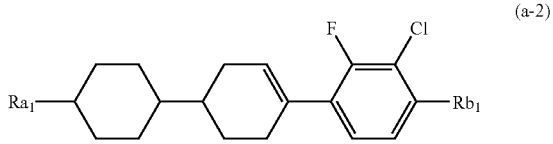

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons.

5. A liquid crystal compound selected from a group of compounds represented by formula (b-2):

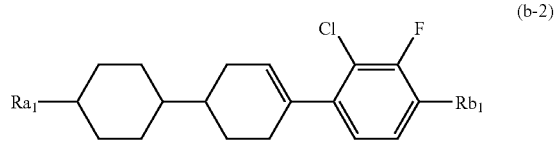

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons.

6. A liquid crystal composition comprising at least one compound selected from a group of the compounds according to claim 1.

7. A liquid crystal composition having a negative dielectric anisotropy and comprising two components, wherein the first component is at least one compound selected from a group of the compounds according to claim 1, and the second component is at least one compound selected from a group of compounds represented by formulae (e-1) to (e-3):

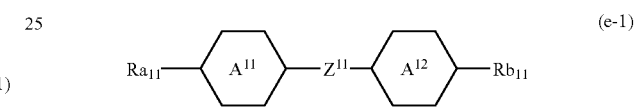

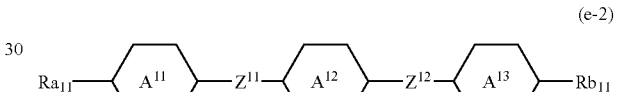

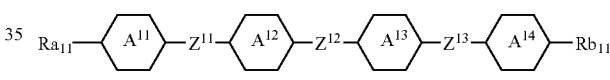

wherein $Ra_{11}$ and $Rb_{11}$ are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons;

ring $A^{11}$, ring $A^{12}$, ring $A^{13}$ and ring $A^{14}$ are each independently trans-1,4-cyclohexylene, trans-1,3-dioxane-2,5-diyl, trans-tetrahydropyran-2,5-diyl, 1,4-phenylene, 2-fluoro-1,4-phenylene or pyridine-2,5-diyl; and $Z^{11}$, $Z^{12}$ and $Z^{13}$ are each independently a single bond, —$CH_2$—$CH_2$—, —CH=CH—, —C≡C—, —COO— or —$CH_2O$—.

8. A liquid crystal composition having a negative dielectric anisotropy and comprising two components, wherein the first component is at least one compound selected from a group of compounds represented by formulae (a-1), (a-2), (b-1) and (b-2), and the second component is at least one compound selected from a group of compounds represented by formulae (e-1) to (e-3):

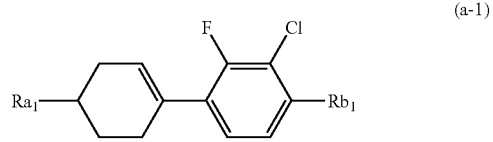

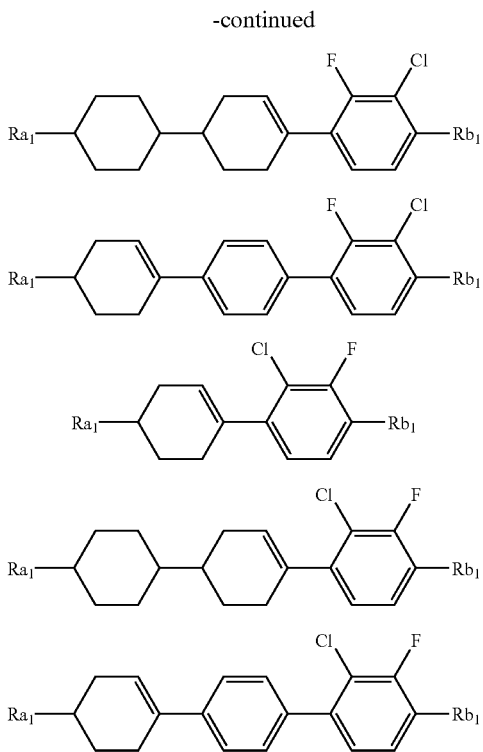

(a-2)
(a-3)
(b-1)
(b-2)
(b-3)

wherein $Ra_1$ is linear alkyl having 1 to 10 carbons or linear alkenyl having 2 to 10 carbons, and $Rb_1$ is linear alkyl having 1 to 10 carbons or linear alkoxy having 1 to 9 carbons,

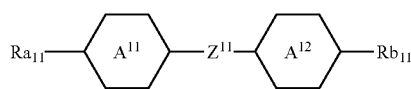

(e-1)

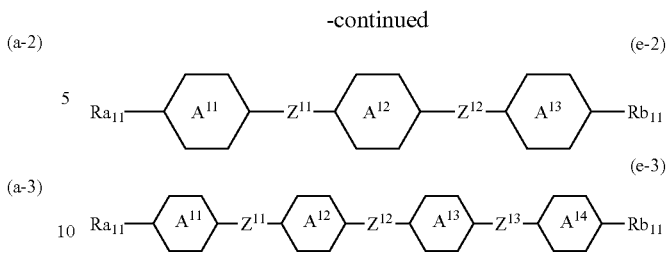

(e-2)
(e-3)

wherein $Ra_{11}$ and $Rb_{11}$ are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons;

ring $A^{11}$, ring $A^{12}$, ring $A^{13}$ and ring $A^{14}$ are each independently trans-1,4-cyclohexylene, trans-1,3-dioxane-2,5-diyl, trans-tetrahydropyran-2,5-diyl, 1,4-phenylene, 2-fluoro-1,4-phenylene or pyridine-2,5-diyl; and $Z^{11}$, $Z^{12}$ and $Z^{13}$ are each independently a single bond, —$CH_2$—$CH_2$—, —CH=CH—, —C≡C—, —COO— or —$CH_2O$—.

9. The liquid crystal composition according to claim 8, wherein the ratio of the first component is from approximately 30 to approximately 85% by weight, and the ratio of the second component is from approximately 15 to approximately 70% by weight, based on the total weight of the liquid crystal composition.

10. The liquid crystal composition according to claim 8, wherein the liquid crystal composition further comprises, in addition to the first component and the second component, at least one compound selected from a group of compounds represented by formulae (g-1), (g-2), (g-3) and (g-4) as a third component:

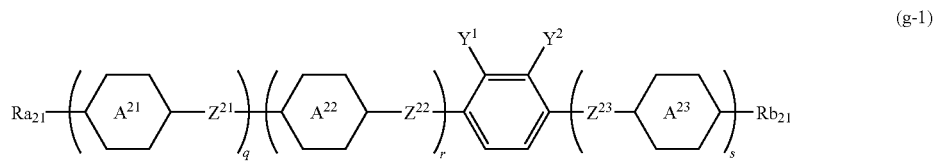

(g-1)

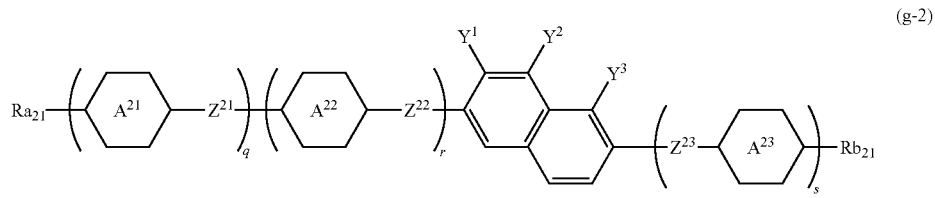

(g-2)

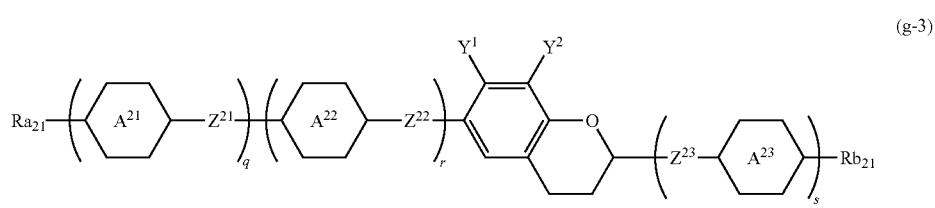

(g-3)

-continued (g-4)
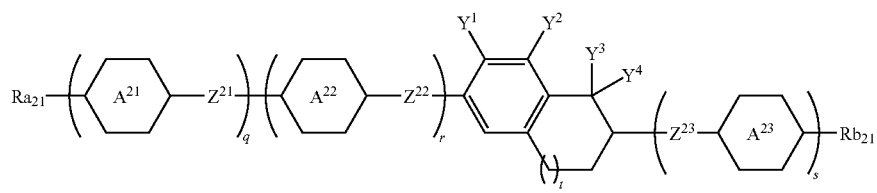

wherein
$Ra_{21}$ and $Rb_{21}$ are each independently hydrogen, alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons;

ring $A^{21}$, ring $A^{22}$ and ring $A^{23}$ are each independently trans-1,4-cyclohexylene, trans-1,3-dioxane-2,5-diyl, trans-tetrahydropyran-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, 6-fluoropyridine -2,5-diyl or pyridazine-2,5-diyl;

$Z^{21}$, $Z^{22}$ and $Z^{23}$ are each independently a single bond, —$CH_2$—$CH_2$—, —CH═CH—, —C≡C—, —$OCF_2$—, —$CF_2O$—, —$OCF_2CH_2CH_2$—, —$CH_2CH_2CF_2O$—, —COO—, —OCO—, —$OCH_2$— or —$CH_2O$—;

$Y^1$, $Y^2$, $Y^3$ and $Y^4$ are each independently fluorine or chlorine;

q, r and s are each independently 0, 1 or 2, provided that q+r+s is 1, 2 or 3; and t is 0, 1 or 2.

11. The liquid crystal composition according to claim 10, wherein the third component is at least one compound selected from a group of compounds represented by formulae (h-1), (h-2), (h-3), (h-4) and (h-5):

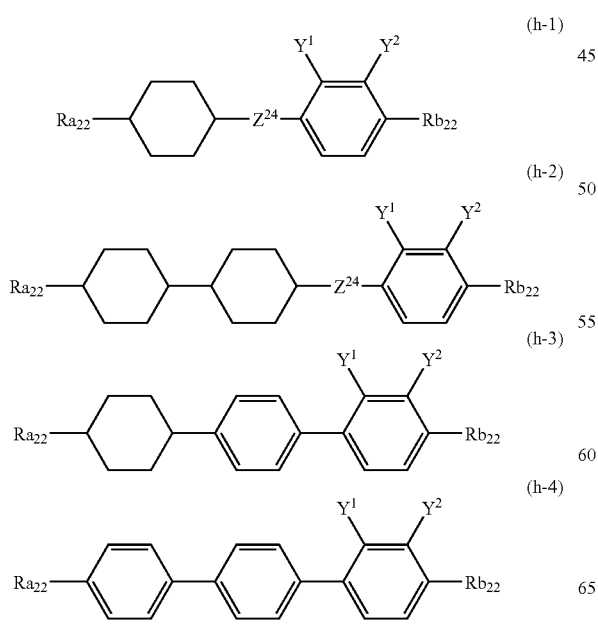

-continued (h-5)
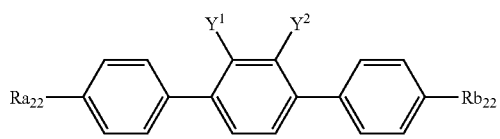

wherein
$Ra_{22}$ is linear alkyl having 1 to 8 carbons or linear alkenyl having 2 to 8 carbons;

$Rb_{22}$ is linear alkyl having 1 to 8 carbons, linear alkenyl having 2 to 8 carbons or alkoxy having 1 to 7 carbons;

$Z^{24}$ is a single bond or —$CH_2CH_2$—; and both $Y^1$ and $Y^2$ are fluorine, or one of $Y^1$ and $Y^2$ is fluorine, and the other is chlorine.

12. A liquid crystal composition having a negative dielectric anisotropy and comprising three components, wherein the first component is at least one compound selected from the group of compounds represented by formulae (a-1) to (a-3) and formulae (b-1) to (b-3), (a-1)
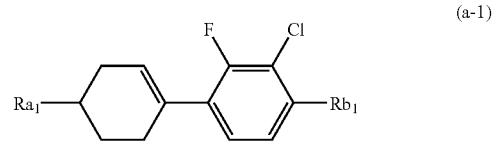

(a-2)
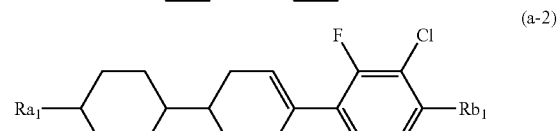

(a-3)
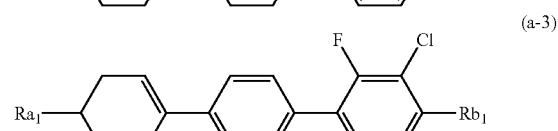

(b-1)
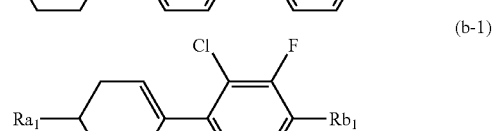

(b-2)
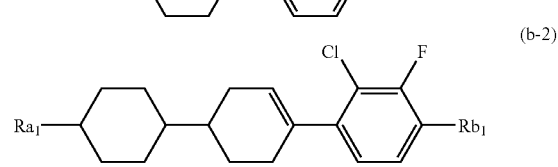

-continued

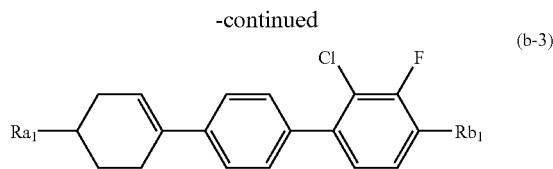
(b-3)

wherein Ra$_1$ is linear alkyl having 1 to 10 carbons or linear alkenyl having 2 to 10 carbons, and Rb$_1$ is linear alkyl having 1 to 10 carbons or linear alkoxy having 1 to 9 carbons;

the second component is at least one compound selected from the group of compounds represented by formulae (e-1), (e-2) and (e-3):

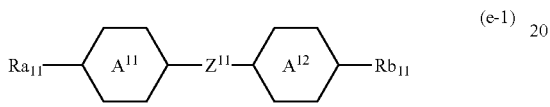
(e-1)

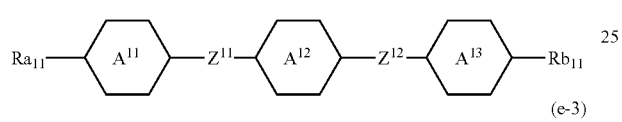
(e-2)

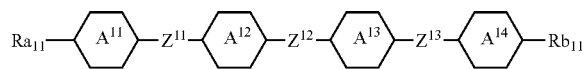
(e-3)

wherein Ra$_{11}$ and Rb$_{11}$ are each independently alkyl having 1 to 10 carbons, alkoxy having 1 to 9 carbons, alkoxyalkyl having 2 to 9 carbons, alkenyl having 2 to 10 carbons, alkenyloxy having 2 to 9 carbons, fluoroalkyl having 1 to 10 carbons or fluoroalkoxy having 1 to 9 carbons; ring A$^{11}$, ring A$^{12}$, ring A$^{13}$ and ring A$^{14}$ are each independently trans-1,4-cyclohexylene, trans-1,3-dioxane-2,5-diyl, trans-tetrahydropyran-2,5-diyl, 1,4-phenylene, 2-fluoro-1 4-phenylene or pyridine-2,5-diyl; and Z$^{11}$, Z$^{12}$ and Z$^{13}$ are each independently a single bond, —CH$_2$—CH$_2$—, —CH=CH—, —C≡C—, —COO— or —CH$_2$O—; and the third component is at least one compound selected from the group of compounds represented by formulae (h-1), (h-2), (h-3), (h-4) and (h-5)

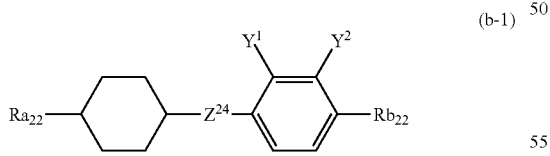
(b-1)

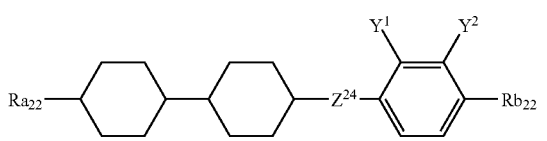
(b-2)

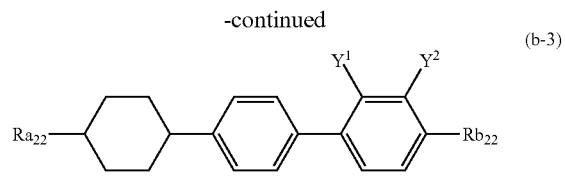
(b-3)

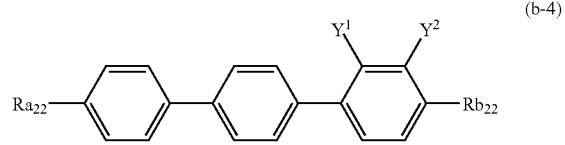
(b-4)

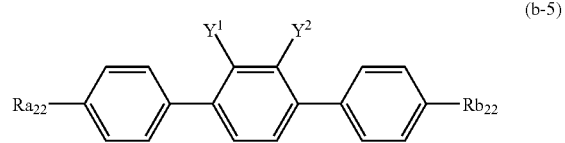
(b-5)

wherein
Ra$_{22}$ is linear alkyl having 1 to 8 carbons or linear alkenyl having 2 to 8 carbons;
Rb$_{22}$ is linear alkyl having 1 to 8 carbons, linear alkenyl having 2 to 8 carbons or alkoxy having 1 to 7 carbons;
Z$^{24}$ is a single bond or —CH$_2$CH$_2$—; and
Both Y$^1$ and Y$^2$ are fluorine, or one of Y$^1$ and Y$^2$ is fluorine, and the other is chlorine.

13. The liquid crystal composition according claim 12, wherein the ratio of the first component is from approximately 10% to approximately 80% by weight, the ratio of the second component is from approximately 10% to approximately 80% by weight, and the ratio of the third component is from approximately 10% to approximately 80% by weight, based on the total weight of the liquid crystal composition.

14. The liquid crystal composition according to claim 12, wherein the liquid crystal composition further comprises an antioxidant and/or an ultraviolet light absorbent.

15. The liquid crystal composition according to claim 14, wherein the liquid crystal composition further comprises an antioxidant represented by formula (I):

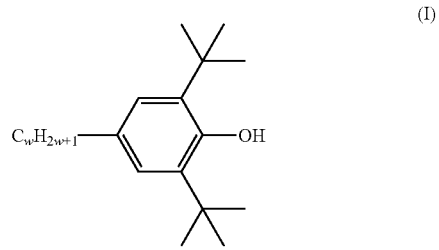
(I)

wherein w is an integer of 1 to 15.

16. A liquid display device that includes the liquid crystal composition according to claim 6.

17. The liquid crystal display device according to claim 16, wherein the liquid crystal display device has an operation mode of a VA mode or an IPS mode, and has a driving mode of an active matrix mode.

* * * * *